United States Patent [19]

David

[11] Patent Number: 4,830,618

[45] Date of Patent: May 16, 1989

[54] ELECTRONIC SPELLING MACHINE

[75] Inventor: Morton E. David; James H. Simons, both of New York, N.Y.; Peter N. Yianilos, Fort Lauderdale, Fla.

[73] Assignee: Franklin Computer Corporation, Mt. Holly, N.J.

[21] Appl. No.: 112,829

[22] Filed: Oct. 23, 1987

[51] Int. Cl.$^4$ .............................................. G09B 19/00
[52] U.S. Cl. .................................... 434/169; 434/167; 364/419
[58] Field of Search .................. 434/167, 169; 364/419

[56] References Cited

U.S. PATENT DOCUMENTS

| | | | |
|---|---|---|---|
| 4,492,582 | 1/1985 | Chang et al. | 434/169 |
| 4,579,533 | 4/1986 | Anderson et al. | 434/169 |
| 4,590,560 | 5/1986 | Sato | 434/169 |
| 4,758,955 | 7/1988 | Chen | 364/419 |

Primary Examiner—Leo P. Picard
Attorney, Agent, or Firm—McAulay, Fields, Fisher, Goldstein & Nissen

[57] ABSTRACT

A hand held, self contained electronic spelling machine which has various pattern matching functions including the spelling validation function. Under user control, a spelling validation can be overridden and the normal spelling check routine provides the user with all possible words for which the valid input word might be deemed a misspelling. Under user control, a place indicia at one or more predetermined locations in an input word provides an exact matrix check of the input word against every word in the dictionary with the place indicia as variables. Under operator control, a prefix ending indicia permits a match of a given prefix against every word in the dictionary with the same set of initial letters. A single word is displayed at a time on a single line display. Scrolling keys permit the operator to scroll through the set of words found in each matching function.

5 Claims, 5 Drawing Sheets

ELECTRONIC SPELLING MACHINE

BACKGROUND OF THE INVENTION

This invention relates in general to an electronic spelling machine and, in particular, to a self-contained, hand held machine which provides various pattern matching functions in addition to a spelling validation function.

It is known to incorporate electronic spelling devices in word processing machines and to provide programs for validating spelling of input words. However, for practical widespread use by large numbers of individuals, an electronic speller has to have the convenience and accessability of a typical printed dictionary or printed spelling dictionary.

In order to provide this convenience, it is important that the electronic dictionary perform multiple functions, each one of which is at the control of the user.

Accordingly, it is the purpose of this invention to provide an electronic dictionary which permits the user to selectively call up functions that will permit spelling validation, matching up portions of words having missing letters to provide possible output for use in, for example, a cross word puzzle, and to provide the user with alternate spelling possibilities for validated words.

In order to provide all of these functions in a hand held, readily accessible convenient device, an appropriate trade off must be made between comprehensiveness and limited range, complexity and simplicity. More particularly, functions must be selected and limited in their applicability to provide the bulk of what a user is likely to want from a dictionary without requiring excessive capacity or programming.

It is also important that such a device be provided in a size and at a cost which will commend itself to large numbers of individuals.

Accordingly, it is a further object of this invention to provide the functions mentioned in a device which has the trade offs which provide a compact relatively inexpensive product.

BRIEF DESCRIPTION

This invention solves the problem of providing a compact, relatively inexpensive, readily usable spelling dictionary by providing an optimum mix of automatic functions and user input functions. Thus, an operator controls whether or not the particular automatic function is to be performed. To put it another way, an automatic search function is limited by parameters that are put in by the operator. Although this provides a less than comprehensive output, it makes it possible to provide the solution to most of the operator's needs or desires in a reasonable time frame with equipment which is compact, easy to use and relatively inexpensive.

Accordingly, any known compact electronic dictionary and search routine can be employed as the source for the speller of this invention. However, the speller of this invention provides essentially four functions.

A first function is the known function of taking an input word and running it through a predetermined standard search routine to validate that it is a valid word and, if not, run the word through a matching routine to provide alternate words that are likely correct spellings for the input word. In the context of this known function, what this invention does to is provide three other functions.

One such feature is an override function which overrides the validity confirmation when a valid word is input. The override forces the apparatus to go through the spelling check routine to provide the user with a word list consisting of other possible words for which the valid input might be deemed to be a misspelling. This override routine is at the control of the operator and is put into effect by the actuation of an appropriate key on the keyboard.

A second feature is a matrix check. The operator inputs a word with a predetermined number of letters in which a place indicia holds one or more of the letters as a variable. That input word is compared against each word in the memory having the same number of letters. Each such dictionary word which matches the non-variable characters provides a word list for the user. The operator controls which places in the input word are variable.

A third feature is a prefix check. Any series of letters followed by an appropriate indicia are matched against each word in the dictionary to provide to the user a word list consisting of each word which has the same set of initial letters as appear in the input prefix. The operator controls not only the letters in the input prefix, but by actuation of an appropriate indicia key determines whether or not this prefix match is to be effected.

All the above are provided in a compact hand held unit having a single line display screen that provides one word at a time from the set of words developed by any one of the above three features; the override feature, the matrix check and the prefix check. Scroll keys permit the operator to scroll through the set of words.

DESCRIPTION OF THE DRAWINGS

FIG. 2A shows the decisions and processing from pressing the Enter key to the display of the first word in a word list.

FIG. 2B illustrates the matrix check or cross word mode of building a word list. The question mark entered into the word creates the variable place.

DESCRIPTION OF THE PREFERRED EMBODIMENTS

Figure 1:
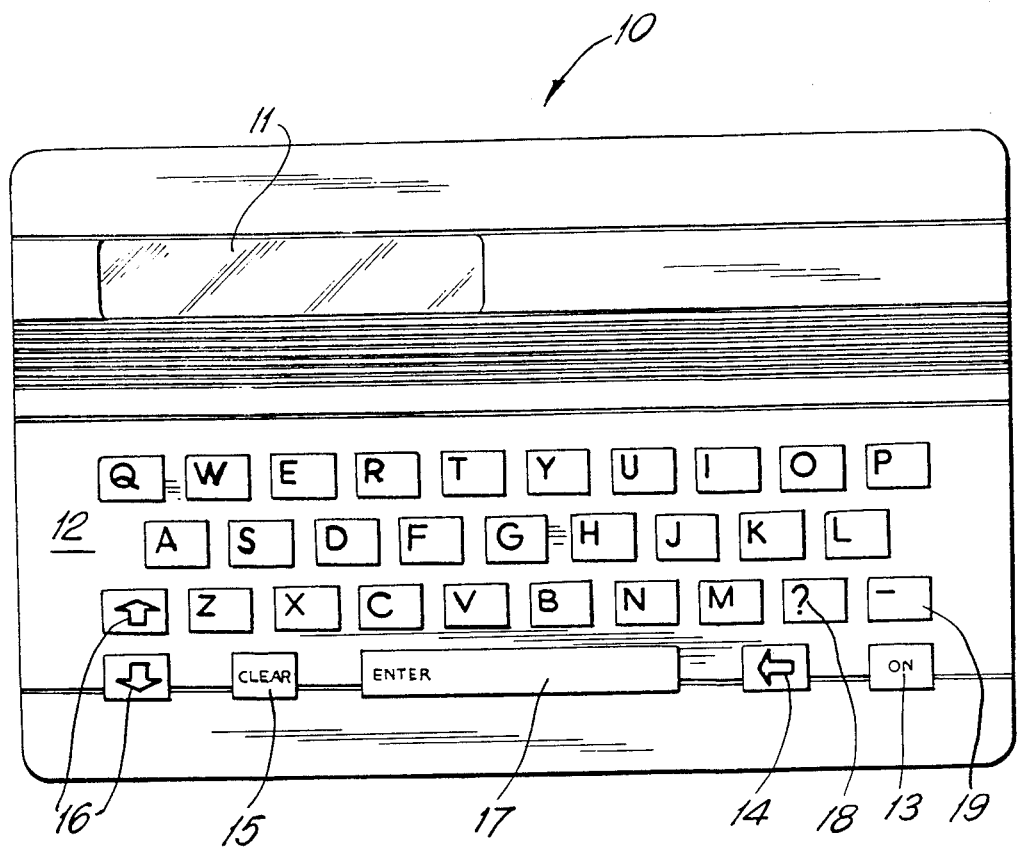
FIG. 1 is a perspective view of an embodiment of this invention.

As indicated in FIG. 1, the device of this invention is a self-contained, battery operated, readily portable, hand holdable device 10 having a one line LCD character display 11 and a keyboard 12. Because of the trade-offs incorporated in this invention, the keyboard 12 is very simple. It includes keys for the twenty-six letters of the alphabet. In addition, it has an on switch 13 which toggles on and off and a "backspace" key 14 which is a correction key that wipes out the least character entry to permit the user to make corrections in the user's entry. The clear key 15 clears the display and permits the user to initiate another input word. The two keys 16 are scroll keys permitting the user to scroll back and forth through a word list that has been developed by the device in response to an input word. The enter key 17 is a bar which the user actuates after an input word or input set of letters and indicia has been completed so that the device can perform the functions selected.

The key 18 is of a question mark "?" notation. It will be referred to herein as the cross word key 18 because its function is to hold a variable place in a word. This is particularly adapted for use with an entry from a cross word puzzle where there are one or more blanks in the entry. As used herein, this cross word key 18 actuates the matrix match or cross word mode. That is, if there is a "?" inserted at one or more places in the word, the cross word mode is put into effect.

The key 19 has a hyphen "-". This will be called the prefix key 19 herein because it is used to build a word list from the dictionary of all words having any given initial set of letters. That is, if the user puts in the initial letters "CREE" followed by the "-", the device will provide a selection list which will include words such as creek, creed, creep, and formatives of those terms, such as creeping and creeds.

Accordingly, the critical function keys on this device are the place indicia represented by the question mark of the cross word key 18 and the prefix ending indicia represented by the hyphen of the prefix key 19.

This keyboard structure interacts with the program within the device 10. This program is illustrated in FIGS. 2A through 2D.

Essentially, after the On key 13 has been actuated and a word with or without the cross word key or prefix key components, has been keyed in, and if the Enter key 17 is pressed (decision box 22) then the word list is initialize to empty is indicated by process box 24.

Figure 2A:
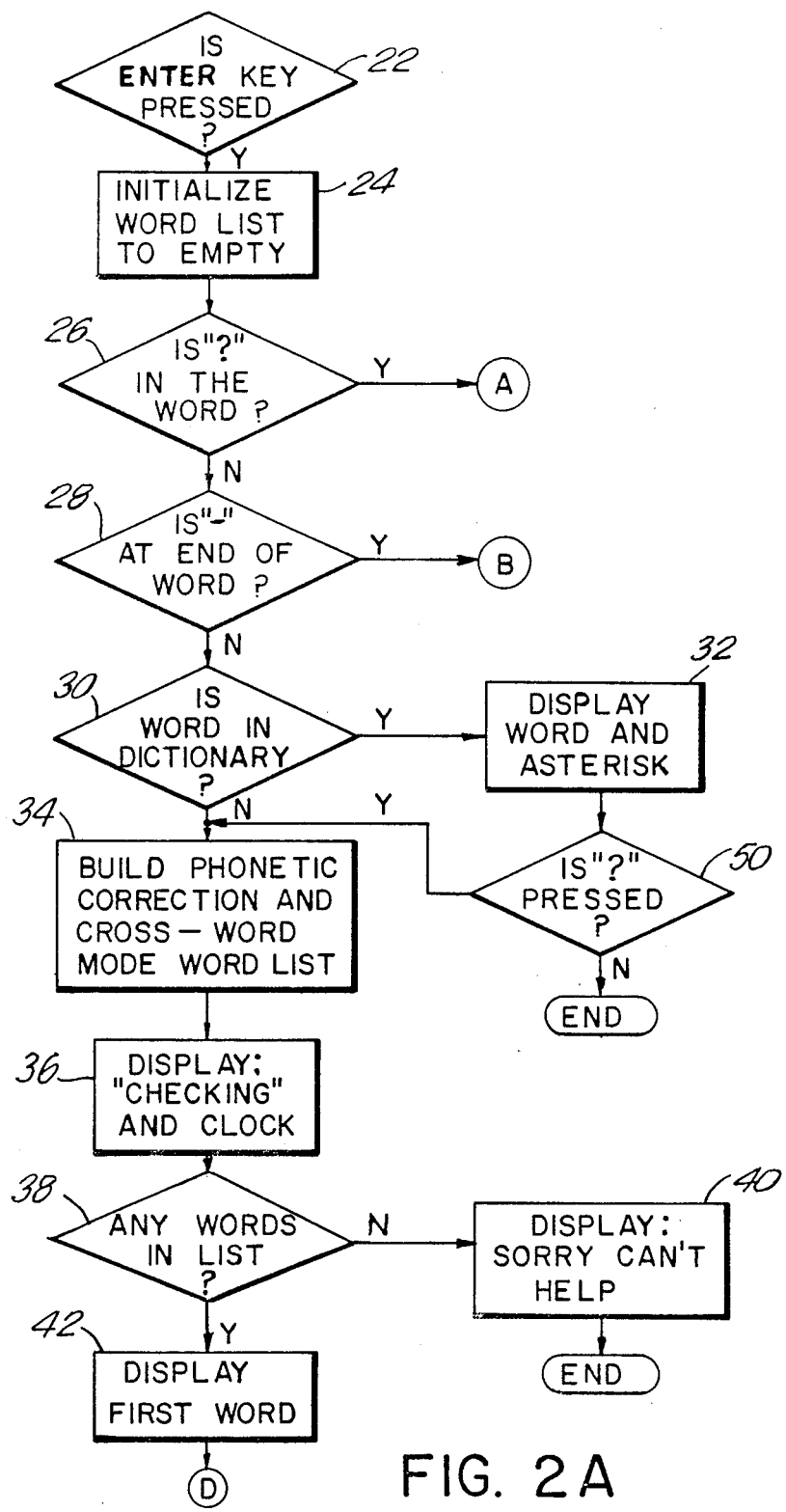
FIGS. 2A through 2B is a flow chart of the overall program operations incorporated in the FIG. 1 device.
Figure 2B:
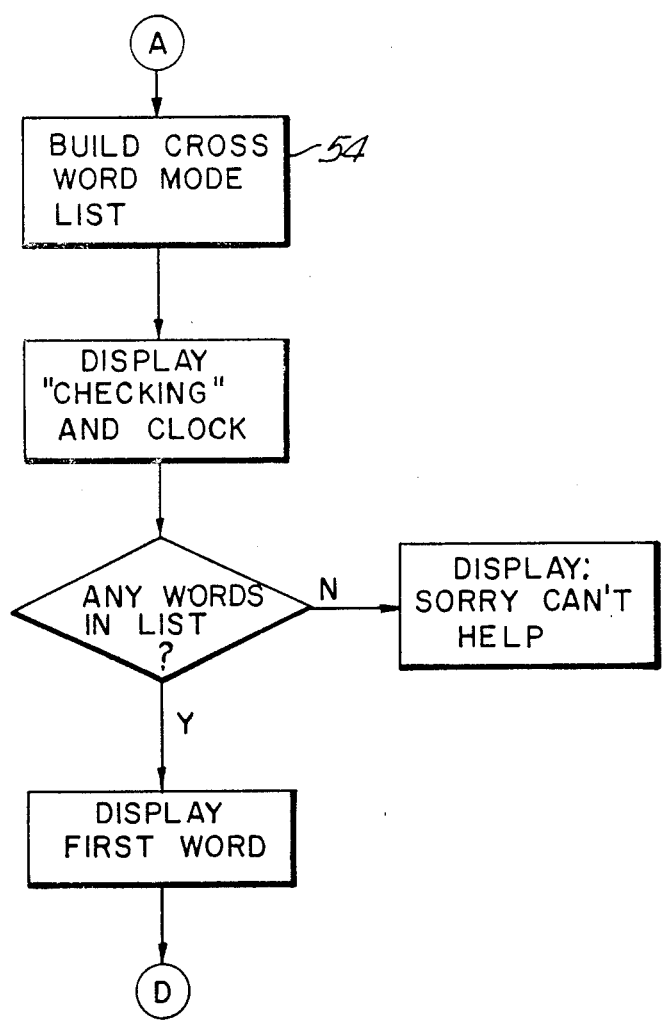
Figure 2C:
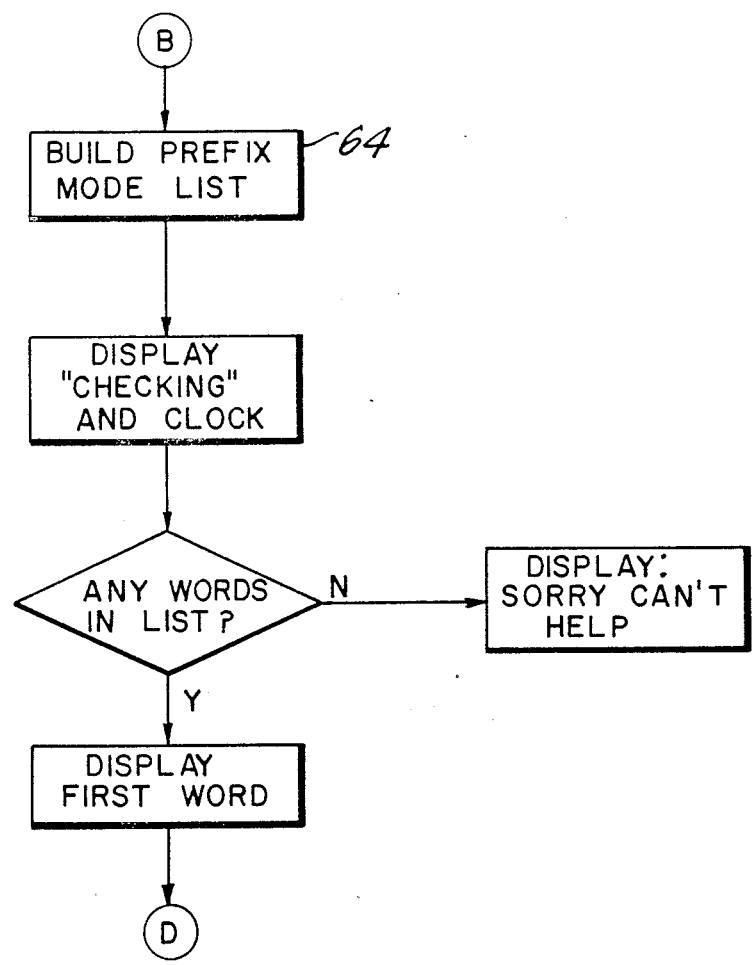
FIG. 2C shows the prefix mode of building a word list. A hyphen at the end of a set of letters enables this mode.

If a question mark indicia is in the word, the cross word mode word list indicated in FIG. 2B is developed. But as indicated at decision box 26, if the question mark is not in the word, then a determination is made as to whether a prefix ending indicia is in the word. If so, then the prefix mode word list is built as indicated in FIG. 2C. However, as indicated at decision box 28, if there is no prefix indicia in the word, then a determination is made at decision box 30 if the word is in the dictionary. If it is, as indicated at 32, the word is displayed together with an asterisk indicating that the specific word entered is a valid dictionary word.

However, if the word is not in the dictionary then, as indicated at process box 34, a word list is built. The process box 34 word list is built from both the cross word mode routine and also a phonetic correction routine. While that combined word list is being prepared, the display 11 will as indicated at process box 36, show the term CHECKING and will also indicate a stylized clock with a hand rotating to indicate that the process 34 is ongoing. At the end of this word list building, if there are no words in the list then, as indicated at decision box 38, the terms SORRY CAN'T HELP, are displayed, as indicated at the process box 40. If, however, as is usually, the case, a word list has been developed by the process 34, the first word is displayed as indicated by the process box 42.

Figure 2D:
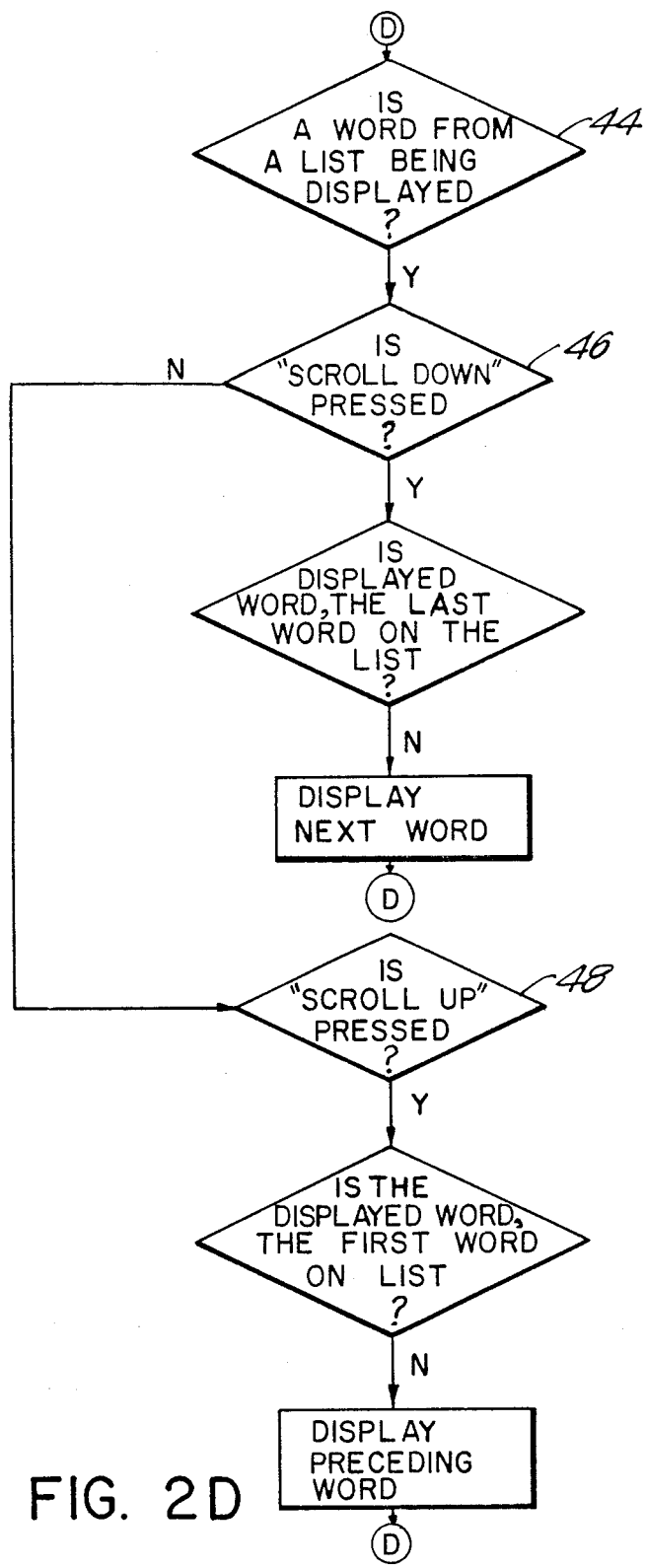
FIG. 2D indicates the routine involved in scrolling through the word lists that are developed by the FIGS. 2A, 2B or 2C routines.

At this point the scroll keys 16 permits the user to scroll back and forth through the word list as indicated in FIG. 2D. If a word from the word list is displayed (decision box 44), then as a function of whether scroll down or scroll up is pressed (decision boxes 46 and 48), the next succeeding word or preceding word is displayed; providing that the displayed word is not the last word on the list when scroll down is pressed and not the first word on the list when scroll up is pressed.

As shown at the decision box 50 in FIG. 2A, if the cross word key 18 is pressed after the validated word is displayed at 32, then the word list building process at 34 occurs as if the valid word were not a word in the dictionary.

The function box 34 in FIG. 2A indicates the function of building a word list from a phonetic correction routine and from a cross word mode. The function box 54 in FIG. 2B refers solely to the function of building a cross word mode word list. And the process box 64 in FIG. 2C refers to the process of building the prefix mode word list.

The features of this invention which provide for the simple, inexpensive, small size and easy to use keyboard 12 include the programming arrangements and relationships shown in FIGS. 2A through 2D. There are four arrangements crucial to providing this result. They are (1) a specific indicia initiated by the cross word key 18 that limits the processing to building a cross word mode word list, (2) a specific indicia initiated by the prefix key 19 which limits the processing to the prefix mode word list, (3) the processing of the phonetic correction and cross word mode combined word list only if the three conditions indicated at decision boxes 26, 28, and 30 are not true, and (4) the display of only word at a time from a word list on the single line display 11 coupled with use of the scroll keys 16 to permit scrolling through each word in the word list.

Attached hereto as Appendix A is a presently preferred listing in Z80 assembly source code together with commentary in C source code. This listing is by way of an example of the routines for accessing an electronic dictionary to implement the combination of routines of this invention. A skilled programmer may implement the invention by means of a different code listing. Code listings for the general operation of the electronic dictionary are not a part of the invention and are not attached.

APPENDIX A

FOR

ELECTRONIC SPELLING MACHINE

INVENTOR: MORTON E. DAVID

McZ80 1.2     Filename: 10.asm                    Page No.     1

```
1:       ;***************************************************
2:       ;This module performs all screen and keyboard I/O;
3:
4:       ;***************************************************
```

```
   5:
1074: 0000                list    1
1075:
1076:          ;**************************************************
1077:
1078: 0000             def     IOInit              void ()
1079:
1080: 0000             def     KeyTest             BOOL ()
1081: 0000             def     KeyTest2            BOOL ()
1082: 0000             def     KeyGet              CHAR (), result in a
1083: 0000             def     KeyGet2             CHAR (), result in a
1084: 0000             def     KeyPut              void (a)
1085: 0000             def     KeyBufferClear      void ()
1086:
1087: 0000             def     DispClear           void ()
1088: 0000             def     DispChar            void (a)
1089: 0000             def     DispString          void (hl)
1090: 0000             def     DispHome            void ()
1091: 0000             def     DispSetColumn       void (a)
1092: 0000             def     DispAdjColumn       void (a)
1093: 0000             def     DispNumber          void (hl)
1094: 0000             def     DispNumber2         void (hl)
1095:
1096: 0000             def     OutString           void (string after call)
1097: 0000             def     OutStringDelay      void (string after call)
1098: 0000             def     NewMode             void (a)
1099:
1100: 0000             def     IncreaseContrast    void ()
1101: 0000             def     DecreaseContrast    void ()
1102: 0000             def     SetContrast         void (a)
1103:
1104: 0000             def     WaitForKeyRelease   void ()
1105: 0000             def     ShowCheckingActivity void ()
1106:
1107: 0000             def     ShutOff             void ()
1108:
1109: 0000             def     Diagnostics         void ()
1110: 0000             def     DisplayWalk         void ()
1111:
1112: 0000             def     ActivityCounter BYTE
1113: 0000             def     Key                 CHAR
1114:
1115:          ;**************************************************
1116:
1117:          ;In Data.asm:
1118:
1119: 0000             ref     Mode                BYTE
1120: 0000             ref     ModeCheck           BYTE
1121: 0000             ref     Random              BYTE[4]
1122: 0000             ref     StatusChar          CHAR
1123:
1124:          ;In CUtils.asm:
1125:
1126: 0000             ref     tolower             CHAR (a), result in a
1127: 0000             ref     toupper             CHAR (a), result in a
1128: 0000             ref     Wait10Milliseconds  void (a)
1129: 0000             ref     Wait1Second         void ()
1130:
1131:          ;In GetTrie.asm:
1132:
1133: 0000             ref     Lexicon             BYTE    (American or British)
1134:
1135:          ;In Main.asm:
1136:
1137: 0000             ref     ClearInterrupt  void ()
1138: 0000             ref     SetupDefaults   void ()
1139: 0000             ref     SpellingCheckerStartup void ()
1140:
1141: 0000             ref     FirstData       ; first data RAM location
1142:
1143:          ;In SpHI.asm:
1144:
1145: 0000             ref     warning             BOOL
1146:
1147:          ;**************************************************
1148:
```

```
1149: 0010           KBUFSIZE        equ     16      size of keyboard buffer
1150:
1151: 0004           SHUTOFFTIMEHI   equ     $04     shutoff timer = 288000 = $046500
1152: 0065           SHUTOFFTIMEMID  equ     $65     (approximately 4 minutes at 4.5 MHZ)
1153: 0000           SHUTOFFTIMELO   equ     $00
1154: 0003           WARNINGTIMEHI   equ     $03     shutoff timer warning value = 252000 = $03
1155: 00D8           WARNINGTIMEMID  equ     $D8     (approximately 3.5 minutes at 4.5 MHZ)
1156: 0060           WARNINGTIMELO   equ     $60
1157:
1158: 000F           REPEATTIME      equ     15      key repeat counter
1159:
1160:                ;*****************************************************
1161:
1162: 0000                           dseg
1163: 0000           Key             ds      CHAR            last key returned by KeyGet
1164: 0001           KeyScan         ds      BYTE            current key being scanned [0...n]
1165: 0002           KeyRow          ds      BYTE            current keybd scan row [0...(NKEC=
1166:
1167: 0003           KbdBuf          ds      KBUFSIZE        keyboard buffer
1168:
1169: 0013           KGetPtr         ds      CHAR_PTR        ptr to next get buffer location
1170: 0015           KPutPtr         ds      CHAR_PTR        ptr to next put buffer location
1171: 0017           KCount          ds      BYTE            number of keys in the buffer
1172:
1173: 0018           Column          ds      BYTE            current display column
1174:
1175: 0019           TimeOutHi       ds      BYTE            shutoff timeout counter
1176: 001A           TimeOutMid      ds      BYTE
1177: 001B           TimeOutLo       ds      BYTE
1178:
1179: 001C           KeyState        ds      BYTE            current keyboard state:
1180: 0000           KSTATE0         equ     0                  waiting for a keypress
1181: 0001           KSTATE1         equ     1                  waiting for a key release
1182:
1183: 001D           RepeatCount     ds      BYTE            counter used to make SC_UP & SC_DN
1184:                ;                                          keys repeat
1185: 001E           RepeatKey       ds      BYTE            the keycode we're repeating
1186:
1187: 001F           ActivityCounter ds      BYTE            used to time display activity
1188:                ;                                           indicator
1189:
1190:                                if      Hardware = Discrete
1191:                SegAddr         ds      BYTE            used if we're running on the disc-
1192:                ;                                       hardware to hold segment address
1193: 0020                           endi
1194:
1195:                                if      Hardware = DotMatrix
1196:                CtrlBuf         ds      BYTE
1197: 0020                           endi
1198:
1199:                ;*****************************************************
1200:
1201: 0020                           rseg
1202:
1203:                ;*****************************************************
1204:                ;Initialize the I/O module:
1205:
1206: 0000                   loc
1207: 0000           IOInit
1208:
1209:                        if      Hardware = Discrete
1210:                ;                               Initialize the SED150 display controller:
1211:                        move    #dWrtEnb,a              enable display writes
1212:                        out     dCtrlReg
1213:
1214:                        move    #$FF,b                  we want I/O address $FF00
1215:                        move    #$00,c
1216:
1217:                ;(Hi byte = FF = command address for display controller.)
1218:                ;(Lo byte = 00 = an unused I/O low byte address so when we
1219:                ;                write to the command address we don't screw
1220:                ;                up anything else.)
1221:                ;(Data = don't care.)
1222:
1223:                        outc    a                       write three FF's
```

```
1224:                              outc    a
1225:                              outc    a
1226:                              moveb   #$FH,b                  now the configuration command
1227:         ;                                                    (7 bits addr, 8 bits data, 1 bus
1228:                              moveb   #dCtrlReg,c             we'll turn off CS at the same time
1229:                              move    #dWrtDsb+$F,a           disable write (CS high)
1230:         ;                                                    ($F to keep contrast at 0)
1231:                              outc    a
1232:
1233:         ;(Hi byte = FA = command address for display controller.)
1234:         ;(Lo byte = dCtrlReg so we can turn off CS.)
1235:         ;(Data   = dWrtDsb = to turn off CS
1236:
1237: 0000                         endi
1238:
1239: 0000   CD1C00                jsr     KeyBufferClear          clear out the keyboard buffer
1240: 0003   CDD101                jsr     DispClear               clear the display
1241:
1242: 0006                         if      Hardware <> Mac
1243: 0006                         moveb   #KSTATE0,KeyState
1244: 000B                         endi
1245:
1246: 000B   C9                    rts
1247:
1248:         ;****************************************************
1249:         ;Setup new mode:
1250:         ;   P: a = new mode byte
1251:         ;
1252: 000C                         loc
1253: 000C   320000      NewMode   move    a,Mode                  store mode byte
1254: 000F   47                    move    a,b                     save it a minute
1255: 0010   EEA5                  eor     #$A5                    calculate and store it's checksum
1256: 0012   320000                move    a,ModeCheck
1257:
1258: 0015                         if      ((Hardware = FSA) or (Hardware = Discrete))
1259: 0015   78                    move    b,a                     now setup FSA control reg
1260: 0016   E60F                  and     #DISP_CONTRAST          mode only contains contrast value
1261: 0018   CD6003                jsr     WriteControlReg
1262: 001B                         endi
1263:
1264: 001B   C9                    rts
1265:
1266:         ;****************************************************
1267:         ;Clear out the keyboard buffer:
1268:
1269: 001C                         loc
1270: 001C         KeyBufferClear
1271: 001C                         clrb    Key                     no key read yet
1272: 0020   321700                move    a,KCount                no keys in buffer yet
1273: 0023                         lea     KbdBuf,hl               init get and put ptrs
1274: 0026   221300                move    hl,KGetPtr                to start of buffer
1275: 0029   221500                move    hl,KPutPtr
1276: 002C   C9                    rts
1277:
1278:         ;****************************************************
1279:         ;Poll the keyboard for any keypresses. Return TRUE
1280:         ;(equal set) if any keys waiting in the keyboard buffer.
1281:
1282: 002D                         loc
1283: 002D         KeyTest
1284: 002D                         if      ((Hardware = FSA) or (Hardware = Discrete))
1285: 002D   0100A0                move    #(RdStatus*256)+$00,bc  do they want to turn off ?
1286: 0030   ED78                  inpc    a
1287: 0032                         assume  OnKey,=,1
1288: 0032   0F                    ror     a
1289: 0033   D2DD02                jcc     ShutOff                 yes - do it
1290: 0036                         endi
1291:
1292: 0036         KeyTest2
1293: 0036                         lea     Random+3,hl             bump random number seed
1294: 0039   34                    inc     (hl)
1295: 003A   200A                  bne     .10
1296: 003C   2B                    dec     hl                      +2
1297: 003D   34                    inc     (hl)
1298: 003E   2006                  bne     .10
```

```
1299: 0040  2B              dec     hl                      +1
1300: 0041  34              inc     (hl)
1301: 0042  2002            bne     .10
1302: 0044  2B              dec     hl                      +0
1303: 0045  34              inc     (hl)
1304:
1305: 0046  CDF000  .10     jsr     PollKeyboard            read any key down
1306:
1307: 0049                  tstb    KCount                  any keys in the buffer ?
1308: 004D  2802            beq     .no                     nope
1309:
1310: 004F                  rtntrue                         yes
1311:
1312: 0051          .no     rtnfalse
1313:
1314:                       ;*****************************************
1315:                       ;Wait for and return the next key pressed:
1316:                       ;Returns the keycode in reg a and 'Key'.
1317:
1318: 0055                  loc
1319: 0055          KeyGet  lea     TimeOutHi,hl            init timeout counter
1320: 0058  3600            move    #0,(hl)
1321: 005A  23              inc     hl
1322: 005B  3600            move    #0,(hl)
1323: 005D  23              inc     hl
1324: 005E  3600            move    #0,(hl)
1325:
1326: 0060                  clrb    warning                 no timeout warning issued yet
1327:
1328: 0064  CD2D00  .loop   jsr     KeyTest                 any keys in the buffer ?
1329: 0067  2853            beq     .get                    yes
1330:
1331: 0069                  lea     TimeOutLo,hl            bump timeout counter - lo
1332: 006C  34              inc     (hl)
1333: 006D  2006            bne     .2
1334: 006F  2B              dec     hl                              - mid
1335: 0070  34              inc     (hl)
1336: 0071  2002            bne     .2
1337: 0073  2B              dec     hl                              - hi
1338: 0074  34              inc     (hl)
1339:
1340: 0075          .2      lea     TimeOutHi,hl            have we timed out ?
1341: 0078  7E              move    (hl),a
1342: 0079  FE04            cmp     #SHUTOFFTIMEHI
1343: 007B  2011            bne     .4                      no
1344: 007D  23              inc     hl
1345: 007E  7E              move    (hl),a
1346: 007F  FE65            cmp     #SHUTOFFTIMEMID
1347: 0081  200B            bne     .4                      no
1348: 0083  23              inc     hl
1349: 0084  7E              move    (hl),a
1350: 0085  FE00            cmp     #SHUTOFFTIMELO
1351: 0087  2005            bne     .4                      no
1352:
1353: 0089  CDDD02          jsr     ShutOff                 yes - timed out - shut off everything
1354: 008C  18D6            bra     .loop                   (we'll never get to here on a real Z80!)
1355:
1356: 008E          .4      lea     TimeOutHi,hl            almost timed out ?
1357: 0091  7E              move    (hl),a
1358: 0092  FE03            cmp     #WARNINGTIMEHI
1359: 0094  20CE            bne     .loop                   no - keep waiting for a key
1360: 0096  23              inc     hl
1361: 0097  7E              move    (hl),a
1362: 0098  FED8            cmp     #WARNINGTIMEMID
1363: 009A  20C8            bne     .loop
1364: 009C  23              inc     hl
1365: 009D  7E              move    (hl),a
1366: 009E  FE60            cmp     #WARNINGTIMELO
1367: 00A0  20C2            bne     .loop
1368:
1369: 00A2  CD0103          jsr     OutString               yes - issue a warning
1370: 00A5  53687574        text    "Shutting Off"
1371: 00B1  21212100        db      SHORT_DASH,SHORT_DASH,SHORT_DASH,0
1372:
1373: 00B5                  moveb   #-1,warning             flag we issued the shut off warning
1374: 00BA  18A8            bra     .loop
```

```
1375:
1376: 00BC                KeyGet2
1377: 00BC   2A1300       .get      move    KGetPtr,h1       yes - get next key from buffer
1378: 00BF   7E                     move    (h1),a
1379: 00C0   CD0000                 jsr     toupper          force uppercase
1380: 00C3   320000                 move    a,Key
1381: 00C6   CDC201                 jsr     BumpKbdPtr       bump the get ptr
1382: 00C9   221300                 move    h1,KGetPtr       and save it
1383:
1384: 00CC                          decb    KCount           one less key in the buffer
1385: 00D0   3A0000                 move    Key,a            return the key in a
1386: 00D3   C9                     rts
1387:
1388:                     ;****************************************************
1389:                     ;Return Keycode passed in reg a to the keyboard buffer:
1390:
1391: 00D4                          loc
1392: 00D4   47           KeyPut    move    a,b              save the returned keycode a minute
1393: 00D5   2A1300                 move    KGetPtr,h1       put in back in front of next key
1394: 00D8   7C                     move    h,a              at start of buffer ?
1395: 00D9   FE00                   cmp     #high (KbdBuf)
1396: 00DB   2008                   bne     .2               no
1397: 00DD   7D                     move    1,a
1398: 00DE   FE00                   cmp     #low (KbdBuf)
1399: 00E0   2003                   bne     .2               no
1400:
1401:                     ;Next key is at start of buffer - put returned key at end of buffer:
1402:
1403: 00E2                          lea     KbdBuf+KBUFSIZE,h1
1404:
1405: 00E5   2B           .2        dec     h1               to previous key location
1406: 00E6                          moveb   b,(h1)           stuff the returned key
1407: 00E8   221300                 move    h1,KGetPtr       update get ptr
1408: 00EB                          incb    KCount           and count
1409: 00EF   C9                     rts
1410:
1411:                     ;****************************************************
1412:                     ;If any key is down, then read it and store it in the buffer:
1413:                     ;Any keypresses that occur when the buffer is full are ignored!
1414:
1415: 00F0                          loc
1416: 00F0                PollKeyboard
1417:                               if      Hardware = Mac
1418:                               inp     $90              any key hit ?
1419:                               tstb    a
1420:                               jeq     .end             no
1421:
1422:                               lea     ..xlat,h1        translate the special function keys
1423:                               move    a,b
1424:                     .2        move    (h1),a
1425:                               tstb    a
1426:                               jeq     AddKey
1427:                               cmp     b
1428:                               beq     .4
1429:                               inc     h1
1430:                               inc     h1
1431:                               bra     .2
1432:
1433:                     .4        inc     h1
1434:                               move    (h1),b
1435:                               move    b,a
1436:                               cmp     #CLEAR
1437:                               jeq     ClearInterrupt
1438:
1439:                               jmp     AddKey
1440:
1441:                     .xlat     dc.b    '1',SC_UP
1442:                               dc.b    '2',SC_DN
1443:                               dc.b    '3',OFF
1444:                               dc.b    '4',ON
1445:                               dc.b    $08,BS
1446:                               dc.b    '5',CLEAR
1447:                               dc.b    $0d,ENTER
1448:                               dc.b    0
1449:
1450: 00F0                          else
```

```
1451: 00F0  3A1C00           move    KeyState,a         what state are we in ?
1452: 00F3  FE00             cmp     #KSTATE0
1453: 00F5  282A             beq     .state0
1454:
1455:                        ;State 1 - waiting for a key to be released:
1456:
1457: 00F7  CD7301   .state1 jsr     ScanMatrix         key still down ?
1458: 00FA                   tstb    a
1459: 00FB  2818             beq     .10                no
1460:
1461: 00FD                   lea     RepeatCount,hl     repeating this key ?
1462: 0100                   tstb    (hl)
1463: 0102  285E             beq     .end               no - keep waiting for key to be released
1464:
1465: 0104  CD8F03           jsr     Wait20             do repeat delay
1466: 0107  35               dec     (hl)               repeat time up ?
1467: 0108  2058             bne     .end               no - keep waiting
1468:
1469: 010A                   moveb   RepeatKey,b        yes - repeat the key
1470: 010E                   moveb   #REPEATTIME,RepeatCount       reset repeat counter
1471: 0113  1838             bra     AddKey             add this key, stay in this state
1472:
1473: 0115  CD8F03   .10     jsr     Wait20             debounce the key release
1474: 0118                   moveb   #KSTATE0,KeyState           and switch to next state
1475: 011D                   clrb    RepeatCount        not repeating any key now
1476:
1477:                        ;State 0 - waiting for a key to be pressed:
1478:
1479: 0121  CD7301   .state0 jsr     ScanMatrix         any keys down ?
1480: 0124                   tstb    a
1481: 0125  283B             beq     .end               no
1482:
1483: 0127  47               move    a,b                yes - save the keycode
1484: 0128  C5               push    bc
1485:
1486: 0129  CD8F03   .loop   jsr     Wait20             wait 20 milliseconds to debounce it
1487: 012C  C1               pop     bc                 get the keycode back
1488: 012D                   moveb   #KSTATE1,KeyState           and switch to next state
1489:
1490: 0132  78               move    b,a                is it SC_UP, SC_DN OR BS ?
1491: 0133  FE01             cmp     #SC_UP
1492: 0135  280E             beq     .rep               yes
1493: 0137  FE02             cmp     #SC_DN
1494: 0139  280A             beq     .rep               yes
1495: 013B  FE05             cmp     #BS
1496: 013D  2806             beq     .rep               yes
1497:
1498: 013F           .norep  clrb    RepeatCount        no - this key doesn't repeat
1499: 0143  1808             bra     AddKey
1500:
1501: 0145  321E00   .rep    move    a,RepeatKey        remember keycode we're repeating
1502: 0148                   moveb   #REPEATTIME,RepeatCount       repeat approx every 1/4 ss
1503:
1504: 014D                   endi
1505:
1506: 014D  3A1700   AddKey  move    KCount,a           is the buffer full ?
1507: 0150  FE10             cmp     #KBUFSIZE
1508: 0152  280E             beq     .end               yes - drop the key
1509:
1510: 0154  2A1500           move    KPutPtr,hl         else put the key into the buffer
1511: 0157  70               move    b,(hl)
1512: 0158  CDC201           jsr     BumpKbdPtr         bump the put ptr
1513: 015B  221500           move    hl,KPutPtr         and save it
1514:
1515: 015E                   incb    KCount             and keep count of # of keys in buffer
1516:
1517: 0162  C9       .end    rts
1518:
1519:                        ;****************************************************
1520:                        ;Wait for a key to be released (until no key is pressed):
1521:
1522: 0163                   loc
1523: 0163           WaitForKeyRelease
1524: 0163                   if      Hardware <> Mac
1525: 0163  CD7301           jsr     ScanMatrix                 any key down ?
1526: 0166                   tstb    a
```

```
1527: 0167  20FA              bne      WaitForKeyRelease    yes - wait
1528:
1529: 0169  CD8F03            jsr      Wait20               avoid any bounces on release
1530: 016C  CD7301            jsr      ScanMatrix
1531: 016F                    tstb     a
1532: 0170  20F1              bne      WaitForKeyRelease
1533: 0172                    endi
1534:
1535: 0172  C9                rts
1536:
1537:                    ;****************************************************
1538:                    ;Scan the keyboard matrix to see if any key is pressed:
1539:                    ;    R: reg a = 0 if no key is pressed
1540:                    ;             = the keycode if a key is pressed
1541:
1542: 0173                    if       Hardware <> Mac
1543: 0173                    loc
1544: 0173         ScanMatrix
1545: 0173                    clrb     KeyScan              init key scan code
1546: 0177                    clrb     KeyRow               init key row
1547:
1548: 017B  3A0200    .loop   move     KeyRow,a             scan this row
1549: 017E  CD9D01            jsr      ScanRow
1550: 0181  D29101            jcc      .press               if a key is down
1551:
1552: 0184                    incb     KeyRow               else to next row
1553: 0188  3A0200            move     KeyRow,a             all rows done ?
1554: 018B  FE06              cmp      #NKBDROWS
1555: 018D  38EC              bcs      .loop                no - scan next row
1556:
1557: 018F                    clrb     a                    yes - no keys pressed - rtn 0
1558: 0190  C9                rts
1559:
1560: 0191         .press    moveb    KeyScan,e             put key scan code into de
1561: 0195                    clrb     d
1562: 0197                    lea      KeyBoardTable,hl     translate it using table
1563: 019A  19                add      de,hl
1564: 019B  7E                move     (hl),a               and return the xlated ASCII keycode
1565: 019C  C9                rts
1566: 019D                    endi
1567:
1568:                    ;****************************************************
1569:                    ;Scan the keyboard row number passed in reg a.
1570:                    ;Increments KeyScan as it looks at each key in the row.
1571:                    ;    R: carry clear if any key down
1572:
1573: 019D                    if       Hardware <> Mac
1574: 019D                    loc
1575: 019D         ScanRow
1576: 019D  CDAC01            jsr      ReadKeyboardColumns  read the column bits
1577: 01A0  0606              move     #NKBDCOLS,b          look at all the column bits
1578: 01A2                    lea      KeyScan,hl           bump KeyScan as we go
1579:
1580: 01A5  0F        .loop   ror      a                    this column down ?
1581: 01A6  D0                rcc                           yes - done
1582:
1583: 01A7  34                inc      (hl)                 else bump key scan code
1584: 01A8  10FB              dbne     .loop                until all columns scanned
1585:
1586: 01AA  37                setc                          carry set for no keys down
1587: 01AB  C9                rts
1588: 01AC                    endi
1589:
1590:                    ;****************************************************
1591:                    ;Read the column bits for the keyboard row number
1592:                    ;passed in reg a.
1593:                    ;    R: a = column bits (XX543210)
1594:
1595: 01AC                    if       Hardware <> Mac
1596: 01AC         ReadKeyboardColumns
1597: 01AC  5F                move     a,e                  save row number
1598:
1599: 01AD                    if       Hardware = FSA
1600: 01AD                    clrb     d                    get proper row driver bits
1601: 01AF                    lea      .table,hl
1602: 01B2  19                add      de,hl
1603: 01B3  7E                move     (hl),a
```

```
1604:
1605: 01B4  CD7803           jsr      WriteInputReg    send the row value to the FSA chip
1606: 01B7  0680             move     #RdKeyColumns,b  read the column data for this row
1607: 01B9  ED78             inpc     a                column bits are in reg a (0 = key down)
1608: 01BB  C9               rts
1609:
1610: 01BC           .table
1611: 01BC  FE               db       %11111110        row 0
1612: 01BD  FD               db       %11111101        row 1
1613: 01BE  FB               db       %11111011        row 2
1614: 01BF  F7               db       %11110111        row 3
1615: 01C0  EF               db       %11101111        row 4
1616: 01C1  DF               db       %11011111        row 5
1617:
1618: 01C2            endi
1619:
1620:                 if       Hardware = Discrete
1621:                 clrb     d                        get proper row driver I/O address
1622:                 lea      .table,hl
1623:                 add      de,hl
1624:                 move     (hl),b                   b = I/O address hi byte
1625:                 clrb     c                        c = I/O address lo byte = 00
1626:                 inpc     a                        a = column bits
1627:                 ror      a                        strip off ASIC and OnKey bits
1628:                 ror      a                        (and position column bits to low order)
1629:                 rts
1630:
1631:         .table  db       dRdRow0
1632:                 db       dRdRow1
1633:                 db       dRdRow2
1634:                 db       dRdRow3
1635:                 db       dRdRow4
1636:                 db       dRdRow5
1637:
1638: 01C2            endi
1639:
1640:                 if       Hardware = DotMatrix
1641:                 clrb     d
1642:                 lea      .table,hl
1643:                 add      de,hl
1644:                 move     (hl),a
1645:                 and      #ROWMASK                 isolate the row driver bits
1646:                 out      WRTROWS                  output the row value
1647:                 jsr      LCDWait
1648:                 inp      RDCOLS                   read the column data for this row
1649:                 rts
1650:
1651:         .table  db       %11111110                row 0
1652:                 db       %11111101                row 1
1653:                 db       %11111011                row 2
1654:                 db       %11110111                row 3
1655:                 db       %11101111                row 4
1656:
1657: 01C2            endi
1658: 01C2            endi
1659:
1660:            ;****************************************************
1661:            ;Bump the keyboard buffer ptr passed in hl. Wrap to
1662:            ;the beginning of the buffer if we pass the end.
1663:
1664: 01C2            loc
1665: 01C2   BumpKbdPtr
1666: 01C2  23               inc      hl                bump the ptr
1667: 01C3  7C               move     h,a               wrap the ptr if past end of buffer
1668: 01C4  FE00             cmp      #high (KbdBuf+KBUFSIZE)
1669: 01C6  2008             bne      .end
1670: 01C8  7D               move     l,a
1671: 01C9  FE00             cmp      #low (KbdBuf+KBUFSIZE)
1672: 01CB  2003             bne      .end
1673: 01CD                   lea      KbdBuf,hl
1674:
1675: 01D0  C9        .end   rts
1676:
1677:            ;****************************************************
1678:            ;Clear the display and set the column to the home position:
1679:
1680: 01D1            loc
```

```
1681: 01D1                DispClear
1682:                         if      Hardware = Mac
1683:                         out     $80                     clear the display
1684:                         move    #DISPSIZE,a             put a vertical bar at end of display
1685:                         out     $83
1686:                         move    #'|',a
1687:                         out     $81
1688:                         clrb    a
1689:                         out     $83
1690:
1691: 01D1                        else
1692: 01D1  CDD802                jsr     DispHome            home the cursor
1693: 01D4  0610                  move    #DISPSIZE,b         b = column counter
1694:
1695: 01D6  C5          .loop     push    bc                  save column counter
1696: 01D7  3E20                  move    #$20,a              display a space
1697: 01D9  CDFA01                jsr     DispChar
1698: 01DC  C1                    pop     bc                  column counter back
1699: 01DD  10F7                  dbne    .loop               until all columns spaced
1700:
1701: 01DF                        endi
1702:
1703: 01DF  C3D802                jmp     DispHome            home the cursor
1704:
1705:                     ;****************************************************
1706:                     ;Show some activity on the display as we're checking
1707:                     ;a word:
1708:
1709: 01E2                        loc
1710: 01E2                ShowCheckingActivity
1711: 01E2  3E0F                  move    #STATUSPOS,a        position to status column
1712: 01E4  CDCE02                jsr     DispSetColumn
1713:
1714: 01E7                        lea     StatusChar,hl       bump to next clock char
1715: 01EA  7E                    move    (hl),a
1716: 01EB  3C                    inc     a
1717: 01EC  E607                  and     #%00000111          modulus 8
1718: 01EE  F600                  or      #CLOCK0
1719: 01F0  77                    move    a,(hl)
1720:
1721: 01F1  CDFA01                jsr     DispChar            display this clock 'face' char
1722:
1723: 01F4                        moveb   #ACTIVITYTIME,ActivityCounter   reset activity timer
1724:
1725: 01F9  C9                    rts
1726:
1727:                     ;****************************************************
1728:                     ;Display the char passed in reg a at the current
1729:                     ;column and bump the column:
1730:
1731:                     ;*** ->> Careful - don't wipe out any registers!
1732:
1733: 01FA                        loc
1734: 01FA                DispChar
1735: 01FA  F5                    push    af                  save regs for caller
1736: 01FB  C5                    push    bc
1737: 01FC  D5                    push    de
1738: 01FD  E5                    push    hl
1739: 01FE  CD0000                jsr     toupper             convert to uppercase
1740:
1741:                             if      Hardware = Mac
1742:                             out     $82                 display the char
1743:                             incb    Column              bump the column
1744:
1745: 0201                        else
1746: 0201                        lea     Column,hl           set a = char, b = column
1747: 0204  46                    move    (hl),b
1748: 0205  34                    inc     (hl)                bump the column
1749: 0206  CD3E03                jsr     FSADispChar         and tell the FSA chip to display it
1750: 0209                        endi
1751:
1752: 0209  E1                    pop     hl                  restore regs for caller
1753: 020A  D1                    pop     de
1754: 020B  C1                    pop     bc
1755: 020C  F1                    pop     af
1756: 020D  C9                    rts
1757:
```

```
1758:                   ;****************************************************
1759:                   ;Display the string pointed to by hl on the display
1760:                   ;starting in the home position. Pads string with spaces
1761:                   ;on right if it doesn't fill the display. Ignores any
1762:                   ;chars over the display size.
1763:
1764: 020E                      loc
1765: 020E              DispString
1766: 020E   CDD802             jsr     DispHome         set column to home position
1767: 0211   0610               move    #DISPSIZE,b      max no of chars in display
1768:
1769: 0213              .loop   tstb    (hl)             end of string ?
1770: 0215   2809               beq     .pad             yes - done
1771:
1772: 0217   C5                 push    bc               else save counter
1773: 0218   CDFA01             jsr     DispChar         display this char
1774: 021B   C1                 pop     bc               restore counter
1775:
1776: 021C   23                 inc     hl               bump to next char in string
1777: 021D   05                 dec     b                DISPSIZE displayed ?
1778: 021E   20F3               bne     .loop            no - continue
1779:
1780: 0220              .pad    tstb    b                DISPSIZE filled yet ?
1781: 0222   2808               beq     .end             yes - done
1782:
1783: 0224   3E20      .padlp   move    #$20,a           else pad with a space
1784: 0226   CDFA01             jsr     DispChar
1785: 0229   05                 dec     b                until display is filled
1786: 022A   20F8               bne     .padlp
1787:
1788: 022C   C9        .end     rts
1789:
1790:                   ;****************************************************
1791:                   ;Convert a number to a decimal string and display it:
1792:                   ;   p: hl = the number
1793:
1794: 022D                      loc
1795: 022D                      begvar
1796: 0000              .num    ds      int
1797: 0002              .digs   ds      BYTE
1798: 0003                      endvar
1799:
1800: 022D              DispNumber2
1801: 022D                      alcvar                   allocate stack space for locals
1802: 0237                      storwiy hl,.num          save number to convert
1803: 023D                      moveb   #2,.digs(iy)     do 2 digits
1804: 0242   1815               bra     .disp
1805:
1806: 0244              DispNumber
1807: 0244                      alcvar                   allocate stack space for locals
1808: 024E                      storwiy hl,.num          save number to convert
1809: 0254                      moveb   #3,.digs(iy)     do 3 digits
1810:
1811: 0259              .disp   moveb   .digs(iy),b      setup digits counter
1812:
1813: 025D              .loop1  loadwiy .num,de          divide n by 10
1814: 0263   210A00             move    #10,hl
1815: 0266   C5                 push    bc               save digit counter
1816: 0267   CDA202             jsr     Divide
1817: 026A   C1                 pop     bc
1818: 026B                      storwiy de,.num          save quotient
1819: 0271   E5                 push    hl               stack the remainder
1820: 0272   10E9               dbne    .loop1           do all three digits
1821:
1822: 0274                      clrb    c                no signif digits yet
1823: 0276                      moveb   .digs(iy),b      digit count again
1824:
1825: 027A   E1        .loop2   pop     hl               unstack a digit (into reg l)
1826: 027B                      tstb    l
1827: 027D   200D               bne     .setsg           if not a zero
1828: 027F                      tstb    c                signif flag set yet ?
1829: 0281   2009               bne     .setsg           yes - output '0'
1830: 0283   78                 move    b,a              last digit ?
1831: 0284   FE01               cmp     #1
1832: 0286   2804               beq     .setsg           yes - force it out
1833:
1834: 0288   3E20               move    #$20,a           else make it a space
```

```
1835: 028A  1806                   bra       .outch
1836:
1837: 028C              .setsg     moveb     #-1,c           set signif flag
1838: 028F  7D                     move      l,a             get digit
1839: 0290  F630                   or        #$30            add ASCII bias
1840:
1841: 0292  CDFA01      .outch     jsr       DispChar        display the digit
1842: 0295  10E3                   dbne      .loop2          until all digits done
1843:
1844: 0297                         exit
1845:
1846:                  ;****************************************************
1847:                  ;Divide de by hl, return de = quotient, hl = remainder:
1848:
1849: 02A2                         loc
1850: 02A2              Divide
1851: 02A2  0610                   move      #16,b           do 16 bits
1852: 02A4  4B                     move      e,c             keep num.lo in c (also quotient)
1853: 02A5  7A                     move      d,a             keep num.hi in a (also quotient)
1854: 02A6  EB                     exg       de,hl           keep den in de
1855: 02A7  210000                 move      #0,hl           keep rem in hl
1856:
1857: 02AA  CB21        .loop      lsl       c               rotate 32-bit rem.num(quot)
1858: 02AC  17                     rolc      a
1859: 02AD  CB15                   rolc      l
1860: 02AF  CB14                   rolc      h
1861: 02B1  DABB02                 jcs       .add            was negative - add
1862:
1863: 02B4  ED52        .sub       sbc       de,hl           rem = rem - num
1864: 02B6  D2C102                 jcc       .mark           if a bit to mark
1865: 02B9  1807                   bra       .4
1866:
1867: 02BB              .add       clc                       rem = rem + num
1868: 02BC  ED5A                   adc       de,hl
1869: 02BE  D2C202                 jcc       .4              no bit to mark
1870:
1871: 02C1  0C          .mark      inc       c               else mark bit in quotient
1872:
1873: 02C2  10E6        .4         dbne      .loop           until all 16 bits done
1874:
1875: 02C4  47                     move      a,b             save quot.hi
1876: 02C5                         tstb      h               negative remainder ?
1877: 02C7  F2CB02                 jpl       .end            no
1878: 02CA  19                     add       de,hl           yes - correct it
1879:
1880: 02CB  59          .end       move      c,e             return quot in de
1881: 02CC  50                     move      b,d
1882: 02CD  C9                     rts
1883:
1884:                  ;****************************************************
1885:                  ;Set the display column to the value passed in reg a:
1886:
1887: 02CE                         loc
1888: 02CE              DispSetColumn
1889: 02CE  321800                 move      a,Column        change our copy
1890:
1891:                              if        Hardware = Mac
1892:                              out       $83             change Mac's copy
1893: 02D1                         endi
1894:
1895: 02D1  C9                     rts
1896:
1897:                  ;****************************************************
1898:                  ;Adjust the column number by the amount (+,-) passed
1899:                  ;in reg a:
1900:
1901: 02D2                         loc
1902: 02D2              DispAdjColumn
1903: 02D2                         lea       Column,hl       adjust column number
1904: 02D5  86                     add       (hl)
1905: 02D6  18F6                   bra       DispSetColumn   then go set to new column
1906:
1907:                  ;****************************************************
1908:                  ;Position the cursor to the home position (column 0):
1909:
1910: 02D8                         loc
1911: 02D8              DispHome
```

```
1912: 02D8                     clrb      Column
1913:
1914:                           if        Hardware = Mac
1915:                           out       $83
1916: 02DC                      endi
1970: 02FF  1801                bra       StringOut
1971:
1972: 0301           OutString
1973: 0301                      clrb      a              flag no delay after
1974:
1975: 0302           StringOut
1976: 0302  322000             move      a,.delay       save delay flag
1977: 0305  E1                 pop       hl             get address of string = return address
1978: 0306  CD0E02             jsr       DispString     display it
1979:
1980: 0309           .2         tstb     (hl)           skip to end of string
1981: 030B  2803                beq      .4                       (so we can return correctly)
1982: 030D  23                  inc      hl
1983: 030E  18F9                bra      .2
1984:
1985: 0310  23      .4          inc      hl             bump past end of string
1986: 0311  E5                  push     hl             and stack new return address
1987:
1988: 0312                      tstb     .delay         any delay required ?
1989: 0316  C40000              cne      Wait1Second    yes - do it
1990:
1991: 0319  C9                  rts
1992:
1993:                  ;****************************************************
1994:                  ;Increase the display contrast:
1995:
1996: 031A              loc
1997: 031A           IncreaseContrast
1998: 031A              if        Hardware <> DotMatrix
1999: 031A  3A0000             move     Mode,a         get old contrast value
2000: 031D  E60F               and      #DISP_CONTRAST are we at max already ?
2001: 031F  FE0F               cmp      #DISP_CONTRAST
2002: 0321  2807               beq      .end           yes - ignore it
2003:
2004: 0323  3A0000             move     Mode,a         else bump it up
2005: 0326  3C                 inc      a
2006: 0327  CD0C00             jsr      NewMode        and set new mode value
2007: 032A              endi
2008:
2009: 032A  C9        .end     rts
2010:
2011:                  ;****************************************************
2012:                  ;Decrease the display contrast:
2013:
2014: 032B              loc
2015: 032B           DecreaseContrast
2016: 032B              if        Hardware <> DotMatrix
2017: 032B  3A0000             move     Mode,a         get old contrast value
2018: 032E  E60F               and      #DISP_CONTRAST are we at min already ?
2019: 0330  2807               beq      .end           yes - ignore it
2020:
2021: 0332  3A0000             move     Mode,a         else dec it down
2022: 0335  3D                 dec      a
2023: 0336  CD0C00             jsr      NewMode        and set new mode value
2024: 0339              endi
2025:
2026: 0339  C9        .end     rts
2027:
2028:                  ;****************************************************
2029:                  ;Set the display contrast value:
2030:                  ;    P: a = new contrast value %0000XXXX
2031:
2032: 033A              loc
2033: 033A           SetContrast
2034: 033A              if      ((Hardware = FSA) or (Hardware = Discrete))
2035: 033A  CD6003             jsr      WriteControlReg
2036: 033D              endi
2037:
2038: 033D  C9                 rts
2039:                  ;
2040:                  ;****************************************************
```

```
2041:                           ;Tell the FSA chip to display a character:
2042:                           ;   P: a = the char (ASCII code)
2043:                           ;      b = the column number [0...(DISPSIZE-1)]
2044:
2045: 033E                              loc
2046: 033E                      FSADispChar
2047: 033E                              if      ((Hardware = FSA) or (Hardware = Discrete))
2048: 033E    87                        add     a               double char code for table index
2049: 033F    5F                        move    a,e             set de = 16-bit char code * 2
2050: 0340                              clrb    d
2051: 0342                              lea     SegmentTable,hl add table base
2052: 0345    19                        add     de,hl           hl = ptr to the two segment data regs for
2053:                           ;                                     this character
2054:
2055: 0346    78                        move    b,a             segment reg number is column times two
2056: 0347    87                        add     a
2057: 0348    F5                        push    af              save segment reg number
2058: 0349    CD6803                    jsr     WriteSegAdrReg  write starting segment number to the FSA
2059: 034C    7E                        move    (hl),a          write first segment data reg to the FSA
2060: 034D    CD7003                    jsr     WriteSegDataReg
2061:
2062: 0350    F1                        pop     af              write 2nd segment number to the FSA
2063: 0351    3C                        inc     a
2064: 0352    CD6803                    jsr     WriteSegAdrReg
2065: 0355    23                        inc     hl              write 2nd segment data reg to the FSA
2066: 0356    7E                        move    (hl),a
2067: 0357    C37003                    jmp     WriteSegDataReg
2068: 035A                              endi
2069:
2070:                                   if      Hardware = DotMatrix
2071:                                   push    af              save the char
2072:                                   move    b,a             build the column setting command
2073:                                   cmp     #8              column < 8 ?
2074:                                   bcs     .0to7           yes
2075:
2076:                           .8to15  sub     #8              shift column over
2077:                                   or      #%11000000
2078:                                   bra     .2
2079:
2080:                           .0to7   or      #%10000000
2081:
2082:                           .2      jsr     WriteCmd        and set the column
2083:                                   pop     af              then write the char
2084:                                   jmp     WriteData
2085: 035A                              endi
2086:
2087:                           ;*****************************************************
2088:                           ;Tell the FSA chip to shutoff the Z80:
2089:
2090: 035A                              loc
2091: 035A                      FSAShutOff
2092: 035A                              if      Hardware = FSA
2093: 035A    3E20                      move    #PowerOff,a     contrast value must be 0000 on shutoff!!
2094: 035C    CD6003                    jsr     WriteControlReg
2095: 035F                              endi
2096:
2097:                                   if      Hardware = Discrete
2098:                                   move    #%01100000,b    Bob says we need this - I don't know why
2099:                                   move    #dPowerOff,c    shut us off
2100:                           ;Hi I/O address = 011xxxxx, Lo I/O address = dPowerOff
2101:                                   outc    a
2102: 035F                              endi
2103:
2104: 035F    C9                        rts                     we'll never get to here on the real hardware
2105:
2106:                           ;*****************************************************
2107:                           ;Write reg a to the FSA chip control register:
2108:
2109: 0360                              if      Hardware = FSA
2110: 0360                              loc
2111: 0360                      WriteControlReg
2112: 0360    CD7803                    jsr     WriteInputReg   write control data to the input reg
2113: 0363    06C0                      move    #LoadCtrlReg,b  transfer input reg to control reg
2114: 0365    ED79                      outc    a
2115: 0367    C9                        rts
2116: 0368                              endi
```

```
2117:
2118:                         if      Hardware = Discrete
2119:                         loc
2120:          WriteControlReg
2121:                         eor     #DISP_CONTRAST    contrast value is reversed!
2122:                         or      #DWrtDsb          Keep display write disabled
2123:                         out     dCtrlReg          and output it
2124:                         rts
2125: 0368                    endi
2126:
2127:          ;****************************************************
2128:          ;Write reg a to the FSA chip segment address register:
2129:
2130: 0368                    if      Hardware = FSA
2131: 0368                    loc
2132: 0368   WriteSegAdrReg
2133: 0368 CD7803             jsr     WriteInputReg     write segment address to the input reg
2134: 036B 0620               move    #LoadSegAdr,b     transfer input reg to segment address reg
2135: 036D ED79               outc    a
2136: 036F C9                 rts
2137: 0370                    endi
2138:
2139:                         if      Hardware = Discrete
2140:                         loc
2141:          WriteSegAdrReg
2142:                         move    a,SegAddr         just save it - we'll use in later in
2143:                         rts                       WriteSegDataReg routine
2144: 0370                    endi
2145:
2146:          ;****************************************************
2147:          ;Write reg a to the FSA chip segment data register:
2148:
2149: 0370                    if      Hardware = FSA
2150: 0370                    loc
2151: 0370   WriteSegDataReg
2152: 0370 CD7803             jsr     WriteInputReg     write segment data to the input reg
2153: 0373 0640               move    #LoadSegData,b    transfer input reg to segment data reg
2154: 0375 ED79               outc    a
2155: 0377 C9                 rts
2156: 0378                    endi
2157:
2158:                         if      Hardware = Discrete
2159:                         loc
2160:          WriteSegDataReg
2161:                         push    bc                save regs bc for caller
2162:                         push    af                save value
2163:                         moveb   SegAddr,b         b = I/O addr hi byte = segment address
2164:                         clrb    c                 c = I/O addr lo byte = 00 (an unused
2165:          ;                                                I/O location)
2166:
2167:                         move    Mode,a            enable display write
2168:                         assume  dWrtEnb,=,0
2169:                         and     #not(dWrtCtrl)
2170:                         eor     #DISP_CONTRAST    contrast value is reversed!
2171:                         out     dCtrlReg
2172:
2173:                         outc    a                 write the segment addr (data bus ignored
2174:
2175:                         pop     af                value back
2176:                         move    a,b               b = I/O addr hi byte = segment data
2177:          ;                                        c = I/O addr lo byte = 00
2178:                         outc    a                 write the segment data (data bus ignored
2179:
2180:                         move    Mode,a            disable display write
2181:                         or      #dWrtDsb
2182:                         eor     #DISP_CONTRAST    contrast value is reversed!
2183:                         out     dCtrlReg
2184:
2185:                         pop     bc                restore caller's bc regs
2186:                         rts
2187: 0378                    endi
2188:
2189:          ;****************************************************
2190:          ;Write reg a to the FSA chip input register:
2191:
```

```
2192: 0378                        if       Hardware = FSA
2193: 0378                        loc
2194: 0378              WriteInputReg
2195: 0378    F5            push     af                    save reg a for caller
2196: 0379    06A0          move     #RstInpCounter,b      reset the input reg counter
2197: 037B    ED40          inpc     b
2198: 037D    0600          move     #WrtInpReg,b          select input register
2199:
2200: 037F    ED79          outc     a                     write bits 1,0
2201:
2202: 0381    0F            ror      a                     write bits 3,2
2203: 0382    0F            ror      a
2204: 0383    ED79          outc     a
2205:
2206: 0385    0F            ror      a                     write bits 5,4
2207: 0386    0F            ror      a
2208: 0387    ED79          outc     a
2209:
2210: 0389    0F            ror      a                     write bit 6
2211: 038A    0F            ror      a
2212: 038B    ED79          outc     a
2213:
2214: 038D    F1            pop      af                    restore reg a
2215: 038E    C9            rts
2216: 038F                  endi
2217:
2218:                 ;***************************************************
2219:                 ;Delay for 20 milliseconds:
2220:
2221: 038F                        loc
2222: 038F    3E02     Wait20  move     #2,a
2223: 0391    C30000           jmp      Wait10Milliseconds
2224:
2225:                 ;***************************************************
2226:
2227:                        if       Hardware = DotMatrix
2228:                        loc
2229:              WriteSetup
2230:                        cmp      #CMDWRITE
2231:                        beq      .cmd
2232:                        cmp      #DATAWRITE
2233:                        bne      .end
2234:
2235:              .data     move     CtrlBuf,a
2236:                        and      #($DF - E1)
2237:                        or       #RS
2238:                        bra      .2
2239:
2240:              .cmd      move     CtrlBuf,a
2241:                        and      #($DF - RS - E1)
2242:
2243:              .2        move     a,CtrlBuf
2244:                        out      WRTROWS
2245:                        jsr      LCDWait
2246:
2247:                        and      #$DF
2248:                        or       #E1
2249:                        move     a,CtrlBuf
2250:
2251:                        out      WRTROWS
2252:                        jsr      LCDWait
2253:
2254:              .end      rts
2255: 0394                  endi
2256:
2257:                 ;***************************************************
2258:
2259:                        if       Hardware = DotMatrix
2260:                        loc
2261:              WriteCmd
2262:                        push     af                    save cmd data
2263:                        move     #CMDWRITE,a           setup for a command write
2264:                        jsr      WriteSetup
2265:                        pop      af                    write the data
2266:                        out      DISPDATA
2267:                        jsr      LCDWait
```

```
2268:
2269:                   move    CtrlBuf,a       turn enables off
2270:                   and     #($DF - E1)
2271:                   move    a,CtrlBuf
2272:                   out     WRTROWS
2273:                   jsr     LCDWait
2274:                   rts
2275: 0394              endi
2276:
2277:           ;****************************************************
2278:
2279:                   if      Hardware = DotMatrix
2280:                   loc
2281:           WriteData
2282:                   push    af              save data
2283:                   move    #DATAWRITE,a    setup for data write
2284:                   jsr     WriteSetup
2285:                   pop     af              write the data
2286:                   out     DISPDATA
2287:                   jsr     LCDWait
2288:
2289:                   move    CtrlBuf,a       turn enables off
2290:                   and     #($DF - E1)
2291:                   move    a,CtrlBuf
2292:                   out     WRTROWS
2293:                   jsr     LCDWait
2294:                   rts
2295: 0394              endi
2296:
2297:           ;****************************************************
2298:
2299:                   if      Hardware = DotMatrix
2300:                   loc
2301:           LCDWait push    af
2302:                   clrb    a
2303:
2304:           .loop   inc     a
2305:                   bne     .loop
2306:
2307:                   pop     af
2308:                   rts
2309: 0394              endi
2310:
2311:           ;****************************************************
2312:
2313:                   if      Hardware = DotMatrix
2314:                   loc
2315:           DispInit
2316:                   moveb   #$DF,CtrlBuf    init the control reg buffer
2317:
2318:                   move    #$38,a          set interface length to 8 bits,
2319:                   jsr     WriteCmd        two display lines, 5X7 chars
2320:
2321:                   move    #$38,a          send twice to force
2322:                   jsr     WriteCmd
2323:
2324:                   move    #$06,a          set entry mode = cursor increment
2325:                   jsr     WriteCmd
2326:
2327:                   move    #$0E,a          display on, no cursor, no cursor blink
2328:                   jsr     WriteCmd
2329:
2330:                   move    #$01,a          clear the display
2331:                   jmp     WriteCmd
2332: 0394              endi
2333:
2334:           ;****************************************************
2335:           ;Keyboard translation table:
2336:
2337: 0394      KeyboardTable
2338:
2339:           ;       ('*' means that position is not used.)
2340:
2341: 0394              if      ((Hardware = FSA) or (Hardware = Discrete))
2342:           ;               col0    col1    col2    col3    col4    col5
2343:           ;RdKeyColumns:  D0      D1      D2      D3      D4      D5
```

```
2344:                 ;
2345: 0394 535A574B  row0    db      'S',    'Z',    'W',    'K',    'O',    '?'
      0398 4F3F
2346: 039A 4101514C  row1    db      'A',    SC_UP,  'Q',    'L',    'P',    '-'
      039E 502D
2347: 03A0 4458454A  row2    db      'D',    'X',    'E',    'J',    'I',    'M'
      03A4 494D
2348: 03A6 46435248  row3    db      'F',    'C',    'R',    'H',    'U',    'N'
      03AA 554E
2349: 03AC 06565447  row4    db      ENTER,  'V',    'T',    'G',    'Y',    'B'
      03B0 5942
2350: 03B2 2A022A2A  row5    db      '*',    SC_DN,  '*',    '*',    '*',    BS
      03B6 2A05
2351: 03B8                   endi
2352:
2353:
2354:                 if      Hardware = DotMatrix
2355:                 ;       col0    col1    col2    col3    col4    col5    col6    col7
2356:                 ;RdKeyColumns:  D0      D1      D2      D3      D4      D5      D6      D7
2357:                 ;
2358:                 row0    db      'Q',    'W',    'E',    'R',    'T',    'Y',    'U',    'I'
2359:                 row1    db      'A',    'S',    'D',    'F',    'G',    'H',    'J',    'K'
2360:                 row2    db      SC_UP,  'Z',    'X',    'C',    'V',    'B',    'N',    'M'
2361:                 row3    db      'O',    '?',    'L',    'P',    '-',    '*',    '*',    '*'
2362:                 row4    db      SC_DN,  '*',    CLEAR,  '*',    ' ',    ' ',    BS,     ENTER
2363: 03B8                   endi
2364:
2365:                 ;*****************************************************
2366:                 ;Table of segment register data values for each ASCII
2367:                 ;character:
2368:
2369: 03B8                   if      ((Hardware = FSA) or (Hardware = Discrete))
2370: 03B8           SegmentTable
2371:
2372:                 ;00-07 are used for the activity timer 'clock':
2373:
2374: 0007           BOXEVEN EQU     SC+SB+SA           the outside of the clock box
2375: 0038           BOXODD  EQU     SF+SE+SD             "        "   "   "     "
2376:
2377: 03B8 0739              DB      BOXEVEN,        BOXODD+SI       00 = CLOCK0
2378: 03BA 073A              DB      BOXEVEN,        BOXODD+SJ       01 = CLOCK1
2379: 03BC 073C              DB      BOXEVEN,        BOXODD+SK       02 = CLOCK2
2380: 03BE 0778              DB      BOXEVEN,        BOXODD+SN       03 = CLOCK3
2381: 03C0 0F38              DB      BOXEVEN+SM,     BOXODD          04 = CLOCK4
2382: 03C2 1738              DB      BOXEVEN+SL,     BOXODD          05 = CLOCK5
2383: 03C4 2738              DB      BOXEVEN+SG,     BOXODD          06 = CLOCK6
2384: 03C6 4738              DB      BOXEVEN+SH,     BOXODD          07 = CLOCK7
2385:
2386:                 ;10-16 are used for the hangman number of tries display:
2387:
2388: 03C8 0000              DB      0,              0                       08 = HANG0
2389: 03CA 0100              DB      SA,             0                       09 = HANG1
2390: 03CC 0300              DB      SA+SB,          0                       0A = HANG2
2391: 03CE 0700              DB      SA+SB+SC,       0                       0B = HANG3
2392: 03D0 0708              DB      SA+SB+SC,       SD                      0C = HANG4
2393: 03D2 0718              DB      SA+SB+SC,       SD+SE                   0D = HANG5
2394: 03D4 0738              DB      SA+SB+SC,       SD+SE+SF                0E = HANG6
2395: 03D6 0739              DB      SA+SB+SC,       SD+SE+SF+SI             0F = HANG7
2396: 03D8 073B              DB      SA+SB+SC,       SD+SE+SF+SJ+SI          10 = HANG8
2397: 03DA 073F              DB      SA+SB+SC,       SD+SE+SF+SJ+SI+SK       11 = HANG9
2398: 03DC 077F              DB      SA+SB+SC,       SD+SE+SF+SJ+SN+SI+SK    12 = HANG:
2399: 03DE 0F7F              DB      SA+SB+SC+SM,    SD+SE+SF+SJ+SN+SI+SK    13 = HANG;
2400: 03E0 1F7F              DB      SA+SB+SC+SL+SM, SD+SE+SF+SJ+SN+SI+SK    14 = HANG<
2401: 03E2 3F7F              DB      SA+SB+SC+SL+SM+SG,   SD+SE+SF+SJ+SN+SI+SK   15 = HANG=
2402: 03E4 7F7F              DB      SA+SB+SC+SL+SH+SM+SG, SD+SE+SF+SJ+SN+SI+SK  16 = HANG>
2403:
2404: 03E6 0000              DB      0,              0               17 = (not used)
2405: 03E8 0000              DB      0,              0               18 = (not used)
2406: 03EA 0000              DB      0,              0               19 = (not used)
2407: 03EC 0000              DB      0,              0               1A = (not used)
2408: 03EE 0000              DB      0,              0               1B = (not used)
2409: 03F0 0000              DB      0,              0               1C = (not used)
2410: 03F2 0000              DB      0,              0               1D = (not used)
2411: 03F4 0000              DB      0,              0               1E = (not used)
2412: 03F6 0000              DB      0,              0               1F = (not used)
2413:
```

```
2414: 03F8   0000              DB    0,                      0                       20 = space
2415: 03FA   0004              DB    0,                      SK                      21 = SHORT_DASH
2416: 03FC   1048              DB    SL,                     SN+SD                   22 = MORE_UP
2417: 03FE   4102              DB    SH+SA,                  SJ                      23 = MORE_DOWN
2418: 0400   0046              DB    0,                      SN+SK+SJ                24 = MORE_LEFT
2419: 0402   7000              DB    SH+SG+SL,               0                       25 = MORE_RIGHT
2420: 0404   514A              DB    SH+SL+SA,               SN+SD+SJ                26 = MORE_UP_AND_DOWN
2421: 0406   0002              DB    0,                      SJ                      27 = '
2422: 0408   7847              DB    SH+SG+SL+SM,            SN+SK+SJ+SI             28 = MATCH
2423: 040A   7F7F              DB    SH+SG+SL+SM+SC+SB+SA,   SN+SF+SE+SD+SK+SJ+SI    29 = ALL_E
2424: 040C   7847              DB    SH+SG+SL+SM,            SN+SK+SJ+SI             2A = *
2425: 040E   504A              DB    SH+SL,                  SN+SD+SJ                2B = MORE_LIST
2426: 0410   2805              DB    SG+SM,                  SK+SI                   2C = WORD_PROMPT
2427: 0412   2004              DB    SG,                     SK                      2D = -
2428: 0414   0040              DB    0,                      SN                      2E = .
2429: 0416   0000              DB    0,                      0                       2F = / (not used)
2430:
2431: 0418   0738              DB    SC+SB+SA,               SF+SE+SD                30 = 0
2432: 041A   0801              DB    SM,                     SI                      31 = 1
2433: 041C   231C              DB    SG+SB+SA,               SE+SD+SK                32 = 2
2434: 041E   270C              DB    SG+SC+SB+SA,            SD+SK                   33 = 3
2435: 0420   2624              DB    SG+SC+SB,               SF+SK                   34 = 4
2436: 0422   252C              DB    SG+SC+SA,               SF+SD+SK                35 = 5
2437: 0424   253C              DB    SG+SC+SA,               SF+SE+SD+SK             36 = 6
2438: 0426   1102              DB    SL+SA,                  SJ                      37 = 7
2439: 0428   273C              DB    SG+SC+SB+SA,            SF+SE+SD+SK             38 = 8
2440: 042A   2724              DB    SG+SC+SB+SA,            SF+SK                   39 = 9
2441:
2442: 042C   0000              DB    0,                      0                       3A = : (not used)
2443: 042E   0000              DB    0,                      0                       3B = ; (not used)
2444: 0430   0000              DB    0,                      0                       3C = < (not used)
2445: 0432   0000              DB    0,                      0                       3D = = (not used)
2446: 0434   0B24              DB    SM+SB+SA,               SF+SK                   3E = QUES_MARK
2447: 0436   0008              DB    0,                      SD                      3F = ? (displayed as _)
2448:
2449: 0438   0000              DB    0,                      0                       40 = @ (not used)
2450: 043A   2734              DB    SG+SC+SB+SA,            SF+SE+SK                41 = A
2451: 043C   0F0D              DB    SM+SC+SB+SA,            SD+SK+SI                42 = B
2452: 043E   0138              DB    SA,                     SF+SE+SD                43 = C
2453: 0440   0F09              DB    SM+SC+SB+SA,            SD+SI                   44 = D
2454: 0442   213C              DB    SG+SA,                  SF+SE+SD+SK             45 = E
2455: 0444   2134              DB    SG+SA,                  SF+SE+SK                46 = F
2456: 0446   053C              DB    SC+SA,                  SF+SE+SD+SK             47 = G
2457: 0448   2634              DB    SG+SC+SB,               SF+SE+SK                48 = H
2458: 044A   0909              DB    SM+SA,                  SD+SI                   49 = I
2459: 044C   0618              DB    SC+SB,                  SE+SD                   4A = J
2460: 044E   2072              DB    SG,                     SN+SF+SE+SJ             4B = K
2461: 0450   0038              DB    0,                      SF+SE+SD                4C = L
2462: 0452   4632              DB    SH+SC+SB,               SF+SE+SJ                4D = M
2463: 0454   4670              DB    SH+SC+SB,               SN+SF+SE                4E = N
2464: 0456   0738              DB    SC+SB+SA,               SF+SE+SD                4F = O
2465:
2466: 0458   2334              DB    SG+SB+SA,               SF+SE+SK                50 = P
2467: 045A   0778              DB    SC+SB+SA,               SN+SF+SE+SD             51 = Q
2468: 045C   2374              DB    SG+SB+SA,               SN+SF+SE+SK             52 = R
2469: 045E   252C              DB    SG+SC+SA,               SF+SD+SK                53 = S
2470: 0460   0901              DB    SM+SA,                  SI                      54 = T
2471: 0462   0638              DB    SC+SB,                  SF+SE+SD                55 = U
2472: 0464   1032              DB    SL,                     SF+SE+SJ                56 = V
2473: 0466   1670              DB    SL+SC+SB,               SN+SF+SE                57 = W
2474: 0468   5042              DB    SH+SL,                  SN+SJ                   58 = X
2475: 046A   4802              DB    SH+SM,                  SJ                      59 = Y
2476: 046C   110A              DB    SL+SA,                  SD+SJ                   5A = Z
2477:
2478: 046E                     endi
2479:
2480:                  ;****************************************************
2481:                  ;Do some simple diagnostics:
2482:
2483: 046E                     loc
2484: 046E              Diagnostics
2485:
2486:                  ;First, turn on all the display segments:
2487:
2488: 046E   CDD802             jsr   DispHome                home the cursor
2489: 0471   0610              move  #DISPSIZE,b             b = column counter
```

```
2490:
2491: 0473  C5            .onlp   push    bc                      save column counter
2492: 0474  3E29                  move    #ALL_SEGS_ON,a          turn 'em all on
2493: 0476  CDFA01                jsr     DispChar
2494: 0479  C1                    pop     bc                      column counter back
2495: 047A  10F7                  dbne    .onlp                   until all columns done
2496:
2497:                     ;Wait for a keypress before continuing:
2498:
2499: 047C  CD5500                jsr     KeyGet
2500:
2501:                     ;Now test RAM:
2502:
2503: 047F  F3                    di                              disable CLEAR interrupts while Mode byte
2504:                     ;                                       is invalid!
2505:
2506: 0480  CDFD02                jsr     OutStringDelay
2507: 0483  54657374              text    "Testing RAM/0"
2508:
2509: 048F  2A0000                move    Mode,hl                 save Mode and ModeCheck in hl'
2510: 0492  D9                    exx
2511:
2512: 0493  11AA55                move    #$55AA,de               test pattern 1
2513: 0496                        lea     .rtn1,ix                (can't use RAM stack!!)
2514: 049A  C35B05                jmp     TestRam
2515:
2516: 049D  1155AA        .rtn1   move    #$AA55,de               test pattern 2
2517: 04A0                        lea     .rtn2,ix
2518: 04A4  C35B05                jmp     TestRam
2519:
2520: 04A7  11FF00        .rtn2   move    #$00FF,de               test pattern 3
2521: 04AA                        lea     .rtn3,ix
2522: 04AE  C35B05                jmp     TestRam
2523:
2524: 04B1  1100FF        .rtn3   move    #$FF00,de               test pattern 4
2525: 04B4                        lea     .rtn4,ix
2526: 04B8  C35B05                jmp     TestRam
2527:
2528:                     ;Now test ROM checksum (on dictionary database only):
2529:                     ;(Code ROM isn't checked to avoid problems of having to change
2530:                     ; the checksum value everytime we reassemble.)
2531:
2532: 04BB  CD0000        .rtn4   jsr     SetupDefaults           restore wiped-out parameters
2533: 04BE  D9                    exx                             restore Mode and ModeCheck bytes
2534: 04BF  220000                move    hl,Mode
2535: 04C2  CD1C00                jsr     KeyBufferClear          re-init the keyboard buffer
2536:
2537: 04C5  CD0103                jsr     OutString
2538: 04C8  54657374              text    "Testing ROM/0"
2539:
2540: 04D4  110000                move    #0,de                   init checksum accumulator
2541: 04D7  3E00                  move    #0,a                    checksum bank 1
2542: 04D9  CD3405                jsr     BankChecksum
2543: 04DC  3E01                  move    #1,a                    checksum bank 2
2544: 04DE  CD3405                jsr     BankChecksum
2545: 04E1  3E02                  move    #2,a                    checksum bank 3
2546: 04E3  CD3405                jsr     BankChecksum
2547:
2548: 04E6  3A0000                move    Lexicon,a               British ?
2549: 04E9  FE01                  cmp     #British
2550: 04EB  280F                  beq     .british                yes
2551:
2552:                     ;else American...
2553:
2554: 04ED                .american
2555: 04ED  3E03                  move    #3,a                    checksum bank 4
2556: 04EF  CD3405                jsr     BankChecksum
2557:
2558: 04F2  21E880                move    #AMERICANCHECKSUM,hl    is checksum correct ?
2559: 04F5                        clc
2560: 04F6  ED52                  sbc     de,hl
2561: 04F8  2022                  bne     rombad                  no
2562: 04FA  1808                  bra     .ramromok               yes
2563:
2564: 04FC                .british
2565: 04FC  219F02                move    #ENGLISHCHECKSUM,hl     is checksum correct ?
```

```
2566: 04FF                       clc
2567: 0500  ED52                 sbc      de,hl
2568: 0502  2018                 bne      rombad              no
2569:
2570:                    ;RAM and ROM are OK - tell them:
2571:
2572: 0504             .ramromok
2573: 0504  CDFD02               jsr      OutStringDelay
2574: 0507  52414D20             text     "RAM and ROM OK/0"
2575: 0516  CD0000               jsr      Wait1Second
2576:
2577:                    ;Diagnostics are done:
2578:
2579: 0519  C30000               jmp      SpellingCheckerStartup   restart everything
2580:
2581: 051C  CD0103      rombad   jsr      OutString
2582: 051F  2A2A2052             text     "** ROM is BAD **/0"
2583:
2584: 0530  FB                   ei                           enable CLEAR interrupts
2585:
2586: 0531                       if       ((Hardware = FSA) or (Hardware = Discrete))
2587: 0531  C33105               jmp      *              stop
2588:
2589:                            else
2590:                            jsr      KeyGet
2591:                            jmp      SpellingCheckerStartup
2592: 0534                       endi
2593:
2594:                    ;***************************************************
2595:                    ;Calculate a 16-bit additive checksum on a ROM bank:
2596:                    ;   P: a = bank number [0,1,2,3]
2597:                    ;      de = checksum accumulator
2598:
2599: 0534                       loc
2600: 0534             BankChecksum
2601:                            if       Hardware = Mac
2602:                            out      BankSelReg          tell Mac which bank
2603: 0534                       endi
2604:
2605: 0534                       if       ((Hardware = FSA) or (Hardware = Discrete))
2606: 0534  3C                   inc      a                   [00,01,10,11] --> [01,10,11,00]
2607: 0535  E603                 and      #%00000011
2608: 0537  06E0                 move     #BankSelReg,b       tell FSA chip which bank
2609: 0539                       clrb     c                   c = 00 = low byte I/O address
2610: 053B  ED79                 outc     a
2611: 053D                       endi
2612:
2613:                            if       Hardware = DotMatrix
2614:                            out      BankSelReg          tell wire wrap which bank
2615: 053D                       endi
2616:
2617: 053D  010080               move     #$8000,bc           bank size
2618: 0540  210080               move     #$8000,hl           bank start address
2619:
2620:                            if       Hardware = Mac
2621:                            cmp      #3                  bank 3 ?
2622:                            bne      .loop               no
2623: 0543                       endi
2624:
2625: 0543                       if       ((Hardware = FSA) or (Hardware = Discrete))
2626: 0543  FE00                 cmp      #0                  bank 3 ?
2627: 0545  2006                 bne      .loop               no
2628: 0547                       endi
2629:
2630:                            if       Hardware = DotMatrix
2631:                            cmp      #3                  bank 3 ?
2632:                            bne      .loop               no
2633: 0547                       endi
2634:
2635: 0547  010020               move     #$8000-ROM3BIAS,bc  yes - adjust things
2636: 054A  2100E0               move     #$8000+ROM3BIAS,hl      (skip over code)
2637:
2638: 054D             .loop
2639:                            if       Hardware = Mac
2640:                    ;Only 'move (de),a' can read banks on the Mac!
2641:                            exg      de,hl
```

```
2642:                          move    (de),a
2643:                          exg     de,hl
2644: 054D                     endi
2645:
2646: 054D                 if      Hardware <> Mac
2647: 054D   7E                move    (hl),a              calculate the checksum
2648: 054E                     endi
2649:
2650: 054E   83                add     e
2651: 054F   5F                move    a,e
2652: 0550   7A                move    d,a
2653: 0551   CE00              adc     #0
2654: 0553   57                move    a,d
2655: 0554   23                inc     hl
2656: 0555   0B                dec     bc
2657: 0556                     tstw    bc
2658: 0558   20F3              bne     .loop
2659:
2660: 055A   C9                rts
2661:
2662:                 ;***************************************************
2663:                 ;Test all of RAM:
2664:                 ;    P: de = two-byte test pattern:
2665:                 ;       ix = return address
2666:
2667: 055B                     loc
2668: 055B            TestRam
2669: 055B                     lea     FirstData,hl    fill even bytes with reg d, odd with reg e
2670: 055E   010004            move    #RAMSIZE/2,bc
2671: 0561   72        .fill   move    d,(hl)
2672: 0562   23                inc     hl
2673: 0563   73                move    e,(hl)
2674: 0564   23                inc     hl
2675: 0565   0B                dec     bc
2676: 0566                     tstw    bc
2677: 0568   20F7              bne     .fill
2678:
2679: 056A                     lea     FirstData,hl    now test it
2680: 056D   010004            move    #RAMSIZE/2,bc
2681: 0570   7A        .test   move    d,a
2682: 0571   BE                cmp     (hl)
2683: 0572   200D              bne     .bad
2684: 0574   23                inc     hl
2685: 0575   7B                move    e,a
2686: 0576   BE                cmp     (hl)
2687: 0577   2008              bne     .bad
2688: 0579   23                inc     hl
2689: 057A   0B                dec     bc
2690: 057B                     tstw    bc
2691: 057D   20F1              bne     .test
2692:
2693: 057F   DDE9              jmp     (ix)
2694:
2695: 0581   CD0000    .bad    jsr     SetupDefaults   restore wiped-out parameters
2696: 0584   D9                exx                     restore Mode and ModeCheck bytes
2697: 0585   220000            move    hl,Mode
2698: 0588   CD1C00            jsr     KeyBufferClear  re-init the keyboard buffer
2699:
2700: 058B   CD0103            jsr     OutString
2701: 058E   2A2A2052          text    "** RAM is BAD **/0"
2702:
2703: 059F   FB                ei                      enable CLEAR interrupts
2704:
2705: 05A0                 if      ((Hardware = FSA) or (Hardware = Discrete))
2706: 05A0   C3A005            jmp     *               stop
2707:
2708:                     else
2709:                         jsr     KeyGet
2710:                         jmp     SpellingCheckerStartup
2711: 05A3                endi
2712:
2713:                 ;***************************************************
2714:                 ;"Walk" through all of the display segments:
2715:
2716: 05A3                     loc
2717: 05A3                     begvar
```

```
2718: 0000              .column  ds       BYTE
2719: 0001                       endvar
2720:
2721: 05A3     DisplayWalk
2722: 05A3              if       ((Hardware = FSA) or (Hardware = Discrete))
2723: 05A3              alcvar                       allocate stack space for locals
2724: 05AD  CDD101      jsr      DispClear           clear the display
2725: 05B0              lea      .table,hl           init segment table ptr
2726:
2727: 05B3  56   .loop1 move     (hl),d              get even seg bits into d
2728: 05B4  23          inc      hl                  get odd seg bits into e
2729: 05B5  5E          move     (hl),e
2730: 05B6  23          inc      hl                  bump to next table entry
2731: 05B7              tstw     de                  end of table ?
2732: 05B9  200B        bne      .2
2733:
2734: 05BB              exit                         else done
2735:
2736: 05C6  FD360000 .2 move     #0,.column(iy)      set to first display column
2737: 05CA  E5          push     hl                  save table ptr
2738:
2739: 05CB  FD7E00 .loop2 move   .column(iy),a       position to this column's even seg bit add
2740: 05CE  87          add      a
2741: 05CF  CD6803      jsr      WriteSegAdrReg
2742: 05D2  7A          move     d,a
2743: 05D3  CD7003      jsr      WriteSegDataReg     write the even segment bits
2744: 05D6  FD7E00      move     .column(iy),a       position to odd seg bit addr
2745: 05D9  87          add      a
2746: 05DA  3C          inc      a
2747: 05DB  CD6803      jsr      WriteSegAdrReg
2748: 05DE  7B          move     e,a
2749: 05DF  CD7003      jsr      WriteSegDataReg     write the odd segment bits
2750:
2751: 05E2  FD3400      inc      .column(iy)         bump to next column
2752: 05E5  FD7E00      move     .column(iy),a       all columns done ?
2753: 05E8  FE10        cmp      #DISPSIZE
2754: 05EA  38DF        bcs      .loop2              no - continue
2755:
2756: 05EC  CD5500      jsr      KeyGet              else wait for a key
2757: 05EF  CDD101      jsr      DispClear           clear the display
2758: 05F2  E1          pop      hl                  restore table ptr
2759: 05F3  C3B305      jmp      .loop1              and do next segment
2760:
2761: 05F6              .table
2762: 05F6  0100        db       SA,0                A
2763: 05F8  0200        db       SB,0                B
2764: 05FA  0400        db       SC,0                C
2765: 05FC  0008        db       0,SD                D
2766: 05FE  0010        db       0,SE                E
2767: 0600  0020        db       0,SF                F
2768: 0602  0001        db       0,SI                I
2769: 0604  0002        db       0,SJ                J
2770: 0606  0004        db       0,SK                K
2771: 0608  0040        db       0,SN                N
2772: 060A  0800        db       SM,0                M
2773: 060C  1000        db       SL,0                L
2774: 060E  2000        db       SG,0                G
2775: 0610  4000        db       SH,0                H
2776: 0612  0000        db       0,0                 end of table
2777: 0614              endi
2778:
2779:                   if       Hardware <> FSA
2780:                   rts
2781: 0614              endi
2782:
2783:                   ;****************************************************
2784:
2785: 0614              end Assembly completed for file IO.asm
Relocatable code size = 1556, Absolute code size = 0, Data ram size = 33
Number of errors = 0, number of warnings = 0
```

```
Mc280 1.2      Filename: SpHi.sm                               P   no.   1

1:                  ;****************************************************
   2:
 962: 0000                     list    1
 963:
 964:                  ;****************************************************
 965:
 966: 0000                     def     AddKey              void ()
 967: 0000                     def     DispStartOfList     void ()
 968: 0000                     def     DispEndOfList       void ()
 969: 0000                     def     DispWord            void ()
 970: 0000                     def     ShowFirstWord       void ()
 971: 0000                     def     ShowNextWord        void ()
 972: 0000                     def     ShowPrevWord        void ()
 973: 0000                     def     ShowString          void (hl)
 974: 0000                     def     ShowWindowWord      void (hl)
 975: 0000                     def     sphimain            void ()
 976:
 977: 0000                     def     numcands            int
 978: 0000                     def     scroll_indx         int
 979: 0000                     def     sys_clear           BOOL
 980: 0000                     def     warning             BOOL
 981: 0000                     def     wb_sow              BYTE
 982: 0000                     def     word_buf            CHAR[WORDBUFSIZE]
 983: 0000                     def     word_size           BYTE
 984:
 985:                  ;For debugging only:
 986:
 987: 0000                     def     wb_sow,do_it_all
 988: 0000                     def     ShowString
 989: 0000                     def     ShowResultWord
 990: 0000                     def     WindowWord,reenter
 991: 0000                     def     doenter,doquest,doscrollup,doscrolldown
 992: 0000                     def     dohyphen,doclear,dospace
 993: 0000                     def     timeon,timeoff
 994:
 995:                  ;****************************************************
 996:
 997:                  ;In Data.asm:
 998:
 999: 0000                     ref     Mode                BYTE
1000: 0000                     ref     ModeCheck           BYTE
1001: 0000                     ref     StatusChar          CHAR
1002:
1003:                  ;In CUtils.asm:
1004:
1005: 0000                     ref     strcmp              BOOL (de, hl)
1006: 0000                     ref     strlen              int (hl), result in hl
1007: 0000                     ref     strmove             void (de, hl)
1008: 0000                     ref     Wait10Milliseconds  void (a)
1009: 0000                     ref     WaitHalfSecond      void ()
1010: 0000                     ref     Wait1Second         void ()
1011:
1012:                  ;In Data.asm:
1013:
1014:                           if      Product = WordWiz
1015:                           ref     UserName            CHAR[NAMESIZE+1]
1016: 0000                     endi
1017:
1018:                  ;In Games.asm:
1019:
1020: 0000                     ref     DoGames             void (a)
1021:
1022:                  ;In Help.asm:
1023:
1024: 0000                     ref     DoHelp              void ()
1025:
1026:                  ;In IO.asm:
1027:
1028: 0000                     ref     KeyGet              CHAR (), result in a
1029: 0000                     ref     KeyGet2             CHAR (), result in a
1030: 0000                     ref     KeyPut              void (a)
1031: 0000                     ref     KeyTest             BOOL ()
```

```
1032: 0000              ref    KeyTest2          BOOL ()
1033:
1034: 0000              ref    DispChar          void (a)
1035: 0000              ref    DispClear         void ()
1036: 0000              ref    DispSetColumn     void (a)
1037: 0000              ref    DispString        void (hl)
1038: 0000              ref    OutString         void (string after call)
1039: 0000              ref    OutStringDelay    void (string after call)
1040:
1041: 0000              ref    IncreaseContrast      void ()
1042: 0000              ref    DecreaseContrast      void ()
1043: 0000              ref    NewMode           void (a)
1044:
1045: 0000              ref    Diagnostics       void ()
1046: 0000              ref    DisplayWalk       void ()
1047:
1048: 0000              ref    Key               CHAR
1049:
1050:           ;In List.asm:
1051:
1052: 0000              ref    MoreList          BYTE
1053:
1054:           ;In PDict.asm:
1055:
1056: 0000              ref    Trie_alt          BOOL ()
1057: 0000              ref    Trie_init         void ()
1058: 0000              ref    Trie_next         BOOL ()
1059: 0000              ref    Trie_word         void (hl)
1060:
1061:           ;In Spell.asm:
1062:
1063: 0000              ref    DoCorrect         int (a, hl), result in hl
1064: 0000              ref    DoMoreSelect      int (), result in hl
1065: 0000              ref    DoMoreTypo        int (), result in hl
1066: 0000              ref    DoNextList        CHAR_PTR (), result in hl
1067: 0000              ref    DoPrevList        CHAR_PTR (), result in hl
1068: 0000              ref    DoSelect          int (hl), result in hl
1069:
1070:           ;****************************************************
1071:           ;Global variable declarations:
1072:
1073: 0000              dseg
1074: 0000    word_buf      ds    CHAR*WORDBUFSIZE    the query word
1075: 001A    word_size     ds    BYTE    size of word in word_buf
1076: 001B    wb_sow        ds    BYTE    first char of word_buf shown on window
1077: 001C    reenter       ds    BOOL    true if we're re-entering a previously
1078:           ;                                  operated on word
1079:
1080: 001D    WindowWord    ds    CHAR*WORDBUFSIZE    the current word displayed
1081:           ;                                  in the window (if any)
1082:
1083:           ;Misc. Boolean flags:
1084:
1085: 0037    warning       ds    BOOL    true if shutoff warning given
1086: 0038    sys_clear     ds    BOOL    true if display should be cleared
1087:
1088:           ;****************************************************
1089:
1090: 0039          rseg
1091:
1092:           ;****************************************************
1093:           ;void sphimain()
1094:           ;(
1095:           ;2      if not KeyTest2
1096:           ;4          OutStringDelay("   FRANKLIN")
1097:           ;6          if not KeyTest2
1098:           ;8              OutStringDelay("   WORD WIZ")
1099:           ;11
1100:           ;11a    reenter = FALSE
1101:           ;12     while (1)
1102:           ;14         warning = FALSE
1103:           ;16         sys_clear = FALSE
1104:           ;17         if reenter = FALSE
1105:           ;18             word_size = 0
1106:           ;20             wb_sow = 0
1107:           ;22             word_buf = ""
```

```
1108:      ;23           reenter = FALSE
1109:      ;23a          StatusChar = NO_STATUS
1110:      ;24           do
1111:      ;26              if word_size == 0
1112:      ;27                 if not KeyTest()
1113:      ;28                    OutString(" Ready for Word")
1114:      ;30                 KeyGet()
1115:      ;32                 switch (Key)
1116:      ;34                    case BS:
1117:      ;36                    case ENTER:
1118:      ;38                    case SC_UP:
1119:      ;38                       IncreaseContrast();
1120:      ;38a                      break;
1121:      ;40                    case SC_DN:
1122:      ;41                       DecreaseContrast();
1123:      ;                         break;
1124:      ;42                    case CLEAR:
1125:      ;44                       break
1126:      ;46                    case QUEST:
1127:      ;48                    case HYPHEN:
1128:      ;50                    case SPCBAR:
1129:      ;52                    default:
1130:      ;54                       AddKey()
1131:      ;56                       DispWord()
1132:      ;58                       break
1133:      ;60              else
1134:      ;62                 KeyGet()
1135:      ;64                 switch (Key)
1136:      ;66                    case BS:
1137:      ;68                       --word_size
1138:      ;70                       word_buf[word_size] = 0
1139:      ;72                       if wb_sow <> 0
1140:      ;74                          wb_sow--
1141:      ;76                       DispWord
1142:      ;78                       break
1143:      ;80                    case ENTER:
1144:      ;82                       DispClear
1145:      ;84                       if strcmp(word_buf,"create-tech") == 0
1146:      ;86                          OutStringDelay("Brought to you")
1147:      ;88                          OutStringDelay("        by")
1148:      ;90                          OutStringDelay("Abe, Bob, Dave,")
1149:      ;92                          OutStringDelay("Ed, George,")
1150:      ;94                          OutStringDelay("Joe, John, and")
1151:      ;96                          OutStringDelay("Pete!")
1152:      ;100                         sys_clear = TRUE
1153:      ;100a                     else if (word_buf[0] == '-')
1154:      ;100b                        if (word_buf[1] == '-')
1155:      ;100c                           switch (word_buf[2])
1156:      ;100d                              case 'X':
1157:      ;100e                                 Diagnostics()
1158:      ;100f                                 break
1159:      ;100g                              case 'Y':
1160:      ;100h                                 DisplayWalk()
1161:      ;100i                                 break
1162:      ;100j                        else if strcmp(word_buf,"-help") == 0
1163:      ;                              DoHelp()
1164:      ;                              sys_clear = TRUE
1165:      ;                              break
1166:      ;                           else
1167:      ;100k                          DoGames(word_buf[1])
1168:      ;100l                          sys_clear = TRUE
1169:      ;100m                         break
1170:      ;102                      else
1171:      ;104                         do_it_all()
1172:      ;106                      break
1173:      ;108                   case SC_UP:
1174:      ;110                   case SC_DN:
1175:      ;112                      break
1176:      ;114                   case CLEAR:
1177:      ;116                      sys_clear = TRUE
1178:      ;118                      break
1179:      ;120                   case HYPHEN:
1180:      ;122                   case QUEST:
1181:      ;124                   case SPCBAR:
1182:      ;126                   default:
```

```
1183:           ;128                    if word_size >= MAXWORD
1184:           ;130                        OutString("No more letters")
1185:           ;131                        WaitHalfSecond()
1186:           ;132                    else
1187:           ;134                        AddKey()
1188:           ;136                        DispWord()
1189:           ;138                    break
1190:           ;140            /* end of switch
1191:           ;142        /* end of else
1192:           ;144      /* end of do
1193:           ;146      while (not (sys_clear || reenter))
1194:           ;148  /* end of while (1)
1195:           ;150/* end of sphimain
1196:
1197:           ;****************************************************
1198:           ;Input registers:
1199:           ;   a = clear interrupt flag (FF means it's a clear interrupt)
1200:           ;Output registers:
1201:           ;   none
1202:
1203: 0000                  loc
1204: 0000          sphimain
1205: 0000                  tstb     a                is it a clear interrupt ?
1206: 0001 C24E00           jne      .11              yes - no signon message
1207:
1208: 0004 CD0000    .2     jsr      KeyTest2         no sign-on if a key has been pressed
1209: 0007 2845            beq      .11
1210:
1211: 0009                  if       Product = SpellMaster
1212: 0009 CD0000           jsr      OutStringDelay
1213: 000C 20202020         text     "    FRANKLIN/0"
1214:
1215: 0019 CD0000           jsr      KeyTest2         abort sign-on if a key has been pressed
1216: 001C 2830             beq      .11
1217:
1218: 001E                  if       ((Hardware = FSA) or (Hardware = Discrete))
1219: 001E 0100A0           move     #(RdStatus*256)+$00,bc  Spelling ACE III ?
1220: 0021 ED78             inpc     a
1221: 0023 E602             and      #ASIC
1222: 0025 2813             beq      .aceiii          yes
1223: 0027                  endi
1224:
1225: 0027 CD0000           jsr      OutStringDelay
1226: 002A 20205350         text     "  SPELLMASTER/0"
1227: 0038 1814             bra      .11
1228:
1229: 003A CD0000   .aceiii jsr      OutStringDelay
1230: 003D 5370656C         text     "Spelling ACE III/0"
1231: 004E                  endi
1232:
1233:                       if       Product = WordWiz
1234:                       tstb     UserName         have they specified their name yet ?
1235:                       beq      .frank           no - show Franklin message
1236:
1237:                       lea      .frankname,de    is the name "FRANKLIN" ?
1238:                       lea      UserName,hl
1239:                       jsr      strcmp
1240:                       beq      .frank           yes - show Franklin message
1241:                       bra      .user
1242:
1243:           .frankname
1244:                       text     "FRANKLIN/0"
1245:
1246:           .user       lea      .hello,de        else display "Hello Name"
1247:                       lea      word_buf,hl
1248:                       jsr      strmove
1249:                       lea      UserName,de
1250:                       lea      word_buf+.hellosize-1,hl
1251:                       jsr      strmove
1252:                       lea      word_buf,hl
1253:                       jsr      DispString
1254:                       jsr      Wait1Second
1255:                       bra      .11
1256:
1257:           .hello      text     "Hello /0"
1258:           .hellosize  equ      *-.hello
```

```
1259:
1260:                   .frank   jsr     OutStringDelay
1261:                            text    "     FRANKLIN/0"
1262: 004E                       endi
1263:
1264: 004E              .11
1265: 004E                       if      ((Hardware = FSA) or (Hardware = Discrete))
1266: 004E  0100A0               move    #(RdStatus*256)+$00,bc   is the ON key still down ?
1267: 0051  ED78                 inpc    a
1268: 0053                       assume  OnKey,=,1
1269: 0053  0F                   ror     a
1270: 0054  30F8                 bcc     .11                      yes - wait 'til they release it
1271:
1272: 0056  3E02                 move    #2,a                     delay 20 milliseconds to debounce the rele
1273: 0058  CD0000               jsr     Wait10Milliseconds
1274:
1275: 005B  0100A0               move    #(RdStatus*256)+$00,bc   is it really up ?
1276: 005E  ED78                 inpc    a
1277: 0060                       assume  OnKey,=,1
1278: 0060  0F                   ror     a
1279: 0061  30EB                 bcc     .11                      no - keep waiting
1280: 0063                       endi
1281:
1282: 0063             .11a      clrb    reenter
1283:
1284: 0067             .12
1285: 0067             .14       clrb    warning
1286: 006B             .16       clrb    sys_clear
1287:
1288: 006F             .17       tstb    reenter
1289: 0073  200E                 bne     .23
1290:
1291: 0075             .18       clrw    word_size
1292: 007B             .20       clrb    wb_sow
1293: 007F             .22       clrb    word_buf
1294:
1295: 0083             .23       clrb    reenter
1296:
1297: 0087             .23a      moveb   #NO_STATUS,StatusChar
1298:
1299: 008C             .24
1300: 008C             .26       tstw    word_size
1301: 0091  C2DB00               jne     .60
1302:
1303: 0094  CD0000     .27       jsr     KeyTest
1304: 0097  2813                 beq     .30
1305:
1306: 0099  CD0000     .28       jsr     OutString
1307: 009C  20526561             text    " Ready for Word/0"
1308:
1309: 00AC  CD0000     .30       jsr     KeyGet
1310:
1311: 00AF  FE05       .34       cmp     #BS
1312: 00B1  CA4402               jeq     .142
1313: 00B4  FE06       .36       cmp     #ENTER
1314: 00B6  CA4402               jeq     .142
1315: 00B9  FE01       .38       cmp     #SC_UP
1316: 00BB  2006                 bne     .40
1317:
1318: 00BD  CD0000               jsr     IncreaseContrast
1319: 00C0  C34402               jmp     .142
1320:
1321: 00C3  FE02       .40       cmp     #SC_DN
1322: 00C5  2006                 bne     .42
1323:
1324: 00C7  CD0000               jsr     DecreaseContrast
1325: 00CA  C34402               jmp     .142
1326:
1327: 00CD  FE07       .42       cmp     #CLEAR
1328: 00CF  CA4402               jeq     .142
1329:
1330: 00D2             .46
1331: 00D2             .48
1332: 00D2             .50
1333: 00D2             .52
```

```
1334: 00D2  CDA505     .54    jsr     AddKey
1335:
1336: 00D5  CDAC06     .56    jsr     DispWord
1337:
1338: 00D8  C34402     .58    jmp     .142
1339:
1340: 00DB             .60
1341: 00DB  CD0000     .62    jsr     KeyGet
1342:
1343: 00DE  FE05       .66    cmp     #BS
1344: 00E0  2022              bne     .80
1345:
1346: 00E2             .68    decb    word_size
1347:
1348: 00E6             .70    clrb    b
1349: 00E8  3A1A00            move    word_size,a
1350: 00EB                    PutTB   word_buf
1351:
1352: 00F4             .72    tstb    wb_sow
1353: 00F8  2804              beq     .76
1354:
1355: 00FA             .74    decb    wb_sow
1356:
1357: 00FE  CDAC06     .76    jsr     DispWord
1358:
1359: 0101  C34402     .78    jmp     .142
1360:
1361: 0104  FE06       .80    cmp     #ENTER
1362: 0106  C20902            jne     .108
1363:
1364: 0109  CD0000     .82    jsr     DispClear
1365:
1366: 010C             .84    lea     word_buf,de
1367: 010F                    lea     .str84,hl
1368: 0112  CD0000            jsr     strcmp
1369: 0115  C2BE01            jne     .100a
1370: 0118  180C              bra     .86
1371:
1372: 011A  43524541   .str84 text    "CREATE-TECH/0"
1373:
1374: 0126  CD0000     .86    jsr     OutStringDelay
1375: 0129  42726F75          text    "Brought to you/0"
1376:
1377: 0138  CD0000     .88    jsr     OutStringDelay
1378: 013B  20202020          text    "     by/0"
1379:
1380: 0144  CD0000     .90    jsr     OutStringDelay
1381: 0147  4162652C          text    "Abe, Barry, Bob,/0"
1382:
1383: 0158  CD0000            jsr     OutStringDelay
1384: 015B  44617665          text    "Dave, Ed,/0"
1385:
1386: 0165  CD0000            jsr     OutStringDelay
1387: 0168  47656F72          text    "George, Greg,/0"
1388:
1389: 0176  CD0000            jsr     OutStringDelay
1390: 0179  486F7761          text    "Howard, Jim,/0"
1391:
1392: 0186  CD0000            jsr     OutStringDelay
1393: 0189  4A6F652C          text    "Joe, John, Minh,/0"
1394:
1395: 019A  CD0000            jsr     OutStringDelay
1396: 019D  4D6F7274          text    "Mort, Pete,/0"
1397:
1398: 01A9  CD0000            jsr     OutStringDelay
1399: 01AC  616E6420          text    "and Peter./0"
1400:
1401: 01B7             .100   moveb   #-1,sys_clear
1402: 01BC  1849              bra     .106
1403:
1404: 01BE  3A0000     .100a  move    word_buf+0,a
1405: 01C1  FE2D              cmp     #'-'
1406: 01C3  203F              bne     .102
1407:
1408: 01C5  3A0100     .100b  move    word_buf+1,a
1409: 01C8  FE2D              cmp     #'-'
```

```
1410: 01CA  2015              bne      .100j
1411:
1412: 01CC  3A0200   .100c    move     word_buf+2,a
1413: 01CF  FE58     .100d    cmp      #'X'
1414: 01D1  2005              bne      .100g
1415:
1416: 01D3  CD0000   .100e    jsr      Diagnostics
1417: 01D6  182A     .100f    bra      .100m
1418:
1419: 01D8  FE59     .100g    cmp      #'Y'
1420: 01DA  2026              bne      .100m
1421:
1422: 01DC  CD0000   .100h    jsr      DisplayWalk
1423: 01DF  1821     .100i    bra      .100m
1424:
1425: 01E1           .100j    lea      word_buf,hl
1426: 01E4                    lea      .str100j,de
1427: 01E7  CD0000            jsr      strcmp
1428: 01EA  200B              bne      .100k
1429:
1430: 01EC  CD0000            jsr      DoHelp
1431: 01EF  180C              bra      .100l
1432:
1433: 01F1  2D48454C .str100j text     "-HELP/0"
1434:
1435: 01F7  3A0100   .100k    move     word_buf+1,a
1436: 01FA  CD0000            jsr      DoGames
1437:
1438: 01FD           .100l    moveb    #-1,sys_clear
1439: 0202  1803     .100m    bra      .106
1440:
1441: 0204           .102
1442: 0204  CD5102   .104     jsr      do_it_all
1443:
1444: 0207  183B     .106     bra      .142
1445:
1446: 0209  FE01     .108     cmp      #SC_UP
1447: 020B  2804              beq      .112
1448:
1449: 020D  FE02     .110     cmp      #SC_DN
1450: 020F  2003              bne      .114
1451:
1452: 0211  C34402   .112     jmp      .142
1453:
1454: 0214  FE07     .114     cmp      #CLEAR
1455: 0216  2007              bne      .120
1456:
1457: 0218           .116     moveb    #-1,sys_clear
1458:
1459: 021D  1825     .118     bra      .142
1460:
1461: 021F           .120
1462: 021F           .122
1463: 021F           .124
1464: 021F           .126
1465: 021F  3A1A00   .128     move     word_size,a
1466: 0222  FE19              cmp      #MAXWORD
1467: 0224  3818              bcs      .132
1468:
1469: 0226  CD0000   .130     jsr      OutString
1470: 0229  4E6F206D          text     "No more letters/0"
1471:
1472: 0239  CD0000   .131     jsr      WaitHalfSecond
1473: 023C  1803              bra      .136
1474:
1475: 023E           .132
1476: 023E  CDA505   .134     jsr      AddKey
1477:
1478: 0241  CDAC06   .136     jsr      DispWord
1479:
1480: 0244           .142                       ;exit from switch
1481:
1482: 0244  3A3800   .146     move     sys_clear,a
1483: 0247                    lea      reenter,hl
1484: 024A  B6                or       (hl)
1485: 024B  CA8C00            jeq      .24
```

```
1486:
1487: 024E  C36700      .148      jmp       .12
1488:
1489:                   ;****************************************************
1490:                   ;Procedures to do it all (after word entered).
1491:                   ;Introduced for notational convenience and clarity.
1492:                   ;****************************************************
1493:
1494:                   ;****************************************************
1495:                   ;void do_it_all ()
1496:                   ;
1497:                   ;       int numcands, scroll_indx
1498:                   ;
1499:                   ;2      scroll_indx = 0
1500:                   ;4      strmove(word_buf,WindowWord)   /* Default result word to query word
1501:                   ;6      OutChecking()
1502:                   ;8      numcands = DoCorrect(TRUE, word_buf)
1503:                   ;10     if numcands > 0
1504:                   ;12         ShowFirstWord()
1505:                   ;14     else
1506:                   ;15         if numcands == 0
1507:                   ;15a            StatusChar = NO_MATCH
1508:                   ;15b        else
1509:                   ;15c            StatusChar = MATCH
1510:                   ;15d        Wait10Milliseconds(10)   /* Delay so it looks like
1511:                   ;15e                                 /* something happened!
1512:                   ;16     ShowResultWord
1513:                   ;18     do
1514:                   ;20         KeyGet
1515:                   ;22         switch (Key)
1516:                   ;24             case ENTER:
1517:                   ;26                 /* Put up original i.e. correct,non hyphenated word
1518:                   ;27                 StatusChar = NO_STATUS
1519:                   ;28                 ShowString(word_buf)
1520:                   ;29                 reenter = TRUE
1521:                   ;30                 break
1522:                   ;32             case QUEST:
1523:                   ;34                 if WindowWord[0] <> 0   /* If we have a result word,
1524:                   ;35                                         /* operate on last result
1525: original          ;40                    strmove(WindowWord,word_buf)  /* Make window word
1526:                   ;42                    OutChecking()
1527:                   ;44                    numcands = DoCorrect(FALSE, word_buf)
1528:                   ;46                    if numcands > 0
1529:                   ;48                        ShowFirstWord
1530:                   ;50                    else
1531:                   ;52                        if numcands == 0
1532:                   ;54                            OutSorry
1533:                   ;56                 else
1534:                   ;58                    KeyPut(QUEST)   /* Put key back so it will be next
1535:                   ;59                    sys_clear = TRUE
1536:                   ;60                 break
1537:                   ;62             case SC_UP:
1538:                   ;64                 if numcands > 0
1539:                   ;66                    if scroll_indx == 1
1540:                   ;68                        OutString("Start of List")
1541:                   ;69                        WaitHalfSecond()
1542:                   ;70                        ShowWindowWord
1543:                   ;72                    else
1544:                   ;74                        ShowPrevWord
1545:                   ;76                 else
1546:                   ;77                    OutString("Start of List")
1547:                   ;77a                   WaitHalfSecond()
1548:                   ;78                    ShowResultWord
1549:                   ;80                 break
1550:                   ;82             case SC_DN:
1551:                   ;84                 if numcands > 0
1552:                   ;86                    if scroll_indx == numcands
1553:                   ;87                        if (MoreList == 0)
1554:                   ;88                            OutString("End of List")
1555:                   ;89                            WaitHalfSecond()
1556:                   ;90                            ShowWindowWord
1557:                   ;91                        else
1558:                   ;91a                           ContinueTheList
1559:                   ;92                    else
1560:                   ;94                        ShowNextWord
```

```
1561:              ;96                  else
1562:              ;97                      OutString("End of List")
1563:              ;97a                     WaitHalfSecond()
1564:              ;98                      ShowResultWord
1565:              ;100                 break
1566:              ;102             case BS:
1567:              ;104                 ShowWindowWord
1568:              ;112                 break
1569:              ;114             case CLEAR:
1570:              ;116                 sys_clear = TRUE
1571:              ;118                 break
1572:              ;120             case HYPHEN:
1573:              ;122                 if WindowWord[0] <> 0    /* If we have a result word,
1574:              ;123                                          /* operate on last result
1575:              ;124                     scroll_indx = 0
1576:              ;128                     OutChecking()
1577:              ;131                     strmove(WindowWord,word_buf)  /* New original word
1578:              ;132                     numcands = DoSelect(WindowWord)
1579:              ;134                     if numcands > 0
1580:              ;135                         /* Delay so it looks like something happened!
1581:              ;135a                        Wait10Milliseconds(10)
1582:              ;136                         ShowFirstWord()
1583:              ;138                     else
1584:              ;140                         OutSorry()
1585:              ;141                 else
1586:              ;141a                    OutSorry
1587:              ;142                 break
1588:              ;144             case SPCBAR:
1589:              ;146                 ShowWindowWord
1590:              ;148                 break
1591:              ;150             default:
1592:              ;151                 KeyPut(Key)
1593:              ;152                 sys_clear = TRUE
1594:              ;154                 break
1595:              ;156         /* end of switch
1596:              ;158     /* end of do loop
1597:              ;160     while (not (sys_clear || reenter))
1598:              ;162/* end of do_it_all
1599:
1600:          —   ;****************************************************
1601:              ;Input registers:
1602:              ;   none
1603:              ;Output registers:
1604:              ;   none
1605:
1606: 0251                                  loc
1607: 0251                                  dseg
1608: 0039             numcands         ds      int
1609: 003B             scroll_indx      ds      int
1610: 003D                              rseg
1611:
1612: 0251             timeon
1613: 0251             do_it_all
1614: 0251             .2          clrw    scroll_indx
1615:
1616: 0257             .4          lea     word_buf,de
1617: 025A                         lea     WindowWord,hl
1618: 025D CD0000                  jsr     strmove
1619:
1620: 0260 CD9606      .6          jsr     OutChecking
1621:
1622: 0263             .8          lea     word_buf,hl
1623: 0266 3EFF                    move    #-1,a           request an Isword operation
1624: 0268 CD0000                  jsr     DoCorrect
1625: 026B 223900                  move    hl,numcands
1626:
1627: 026E             timeoff
1628: 026E             .10         tstb    h
1629: 0270 FA7B02                  jmi     .14
1630: 0273 B5                      or      l
1631: 0274 2805                    beq     .14
1632:
1633: 0276 CD0A06      .12         jsr     ShowFirstWord
1634: 0279 1818                    bra     .18
1635:
1636: 027B             .14
```

```
1637: 0278              .15      tstw      hl
1638: 027D  2007                 bne       .15b
1639:
1640: 027F              .15a     moveb     #NO_MATCH,StatusChar
1641: 0284  180A                 bra       .16
1642:
1643: 0286              .15b
1644: 0286              .15c     moveb     #MATCH,StatusChar
1645:
1646: 0288  3E0A        .15d     move      #10,a
1647: 028D  CD0000               jsr       Wait10Milliseconds
1648:
1649: 0290  CDD405      .16      jsr       ShowResultWord
1650:
1651: 0293              .18
1652: 0293  CD0000      .20      jsr       KeyGet
1653:
1654: 0296  FE06        .24      cmp       #ENTER
1655: 0298  2013                 bne       .32
1656:
1657: 029A              doenter
1658: 029A                       moveb     #NO_STATUS,StatusChar
1659:
1660: 029F              .28      lea       word_buf,hl
1661: 02A2  CD2004               jsr       ShowString
1662:
1663: 02A5              .29      moveb     #-1,reenter
1664:
1665: 02AA  C3BE03      .30      jmp       .158
1666:
1667: 02AD  FE3F        .32      cmp       #QUEST
1668: 02AF  C2EF02               jne       .62
1669:
1670: 02B2              doquest
1671: 02B2              .34      tstb      WindowWord
1672: 02B6  282A                 beq       .56
1673:
1674: 02B8              .40      lea       WindowWord,de
1675: 02BB                       lea       word_buf,hl
1676: 02BE  -CD0000              jsr       strmove
1677:
1678: 02C1  CD9606      .42      jsr       OutChecking
1679:
1680: 02C4              .44      lea       word_buf,hl
1681: 02C7                       clrb      a             no Isword operation
1682: 02C8  CD0000               jsr       DoCorrect
1683: 02CB  223900               move      hl,numcands
1684:
1685: 02CE              .46      tstb      h
1686: 02D0  FADB02               jmi       .50
1687: 02D3  B5                   or        l
1688: 02D4  2805                 beq       .50
1689:
1690: 02D6  CD0A06      .48      jsr       ShowFirstWord
1691: 02D9  1811                 bra       .60
1692:
1693: 02DB              .50
1694: 02DB              .52      tstw      hl
1695: 02DD  CC7806               ceq       OutSorry
1696: 02E0  180A                 bra       .60
1697:
1698: 02E2              .56
1699: 02E2  3E3F        .58      move      #QUEST,a
1700: 02E4  CD0000               jsr       KeyPut
1701:
1702: 02E7              .59      moveb     #-1,sys_clear
1703:
1704: 02EC  C3BE03      .60      jmp       .158
1705:
1706: 02EF  FE01        .62      cmp       #SC_UP
1707: 02F1  202C                 bne       .82
1708:
1709: 02F3              doscrollup
1710: 02F3  2A3900      .64      move      numcands,hl
1711: 02F6                       tstb      h
```

```
1712: 02F8  FA1603              jmi    .76
1713: 02FB  B5                  or     l
1714: 02FC  2818                beq    .76
1715:
1716: 02FE  2A3B00       .66    move   scroll_indx,hl
1717: 0301  110100              move   #1,de
1718: 0304                      clc
1719: 0305  ED52                sbc    de,hl
1720: 0307  2008                bne    .72
1721:
1722: 0309  CDC606       .68    jsr    DispStartOfList
1723:
1724: 030C  CD6C06       .70    jsr    ShowWindowWord
1725: 030F  180B                bra    .80
1726:
1727: 0311               .72
1728:
1729: 0311  CDE105       .74    jsr    ShowPrevWord
1730: 0314  1806                bra    .80
1731:
1732: 0316               .76
1733: 0316  CDC606       .77    jsr    DispStartOfList
1734:
1735: 0319  CDD405       .78    jsr    ShowResultWord
1736:
1737: 031C  C3BE03       .80    jmp    .158
1738:
1739: 031F  FE02         .82    cmp    #SC_DN
1740: 0321  2035                bne    .102
1741:
1742: 0323               doscrolldown
1743: 0323  2A3900       .84    move   numcands,hl
1744: 0326                      tstb   h
1745: 0328  FA4F03              jmi    .96
1746: 032B  B5                  or     l
1747: 032C  2821                beq    .96
1748:
1749: 032E  ED5B3B00     .86    move   scroll_indx,de
1750: 0332                      clc
1751: 0333  ED52                sbc    de,hl
1752: 0335  2013                bne    .92
1753:
1754: 0337               .87    tstb   MoreList
1755: 033B  2008                bne    .91
1756:
1757: 033D  CDDA06       .88    jsr    DispEndOfList
1758:
1759: 0340  CD6C06       .90    jsr    ShowWindowWord
1760: 0343  1810                bra    .100
1761:
1762: 0345  CDC903       .91    jsr    ContinueTheList
1763: 0348  1808                bra    .100
1764:
1765: 034A               .92
1766: 034A  CD3506       .94    jsr    ShowNextWord
1767: 034D  1806                bra    .100
1768:
1769: 034F               .96
1770: 034F  CDDA06       .97    jsr    DispEndOfList
1771:
1772: 0352  CDD405       .98    jsr    ShowResultWord
1773:
1774: 0355  C3BE03       .100   jmp    .158
1775:
1776: 0358  FE05         .102   cmp    #BS
1777: 035A  2005                bne    .114
1778:
1779: 035C               dobackspace
1780: 035C  CD6C06       .104   jsr    ShowWindowWord
1781:
1782: 035F  185D         .112   bra    .158
1783:
1784: 0361  FE07         .114   cmp    #CLEAR
1785: 0363  2007                bne    .120
1786:
```

```
1787: 0365              doclear
1788: 0365        .116      moveb   #-1,sys_clear
1789:
1790: 036A  1852  .118      bra     .158
1791:
1792: 036C  FE2D  .120      cmp     #HYPHEN
1793: 036E  C2AA03          jne     .144
1794:
1795: 0371            dohyphen
1796: 0371      .122        tstb    WindowWord
1797: 0375  CAA503          jeq     .141a
1798:
1799: 0378      .124        clrw    scroll_indx
1800:
1801: 037E  CD9606  .128    jsr     OutChecking
1802:
1803: 0381      .131        lea     WindowWord,de
1804: 0384                  lea     word_buf,hl
1805: 0387  CD0000          jsr     strmove
1806:
1807: 038A      .132        lea     WindowWord,hl
1808: 038D  CD0000          jsr     DoSelect
1809: 0390  223900          move    hl,numcands
1810:
1811: 0393      .134        tstb    h
1812: 0395  FAA503          jmi     .138
1813: 0398  B5              or      l
1814: 0399  280A            beq     .138
1815:
1816: 039B      .135
1817: 039B  3E0A  .135a     move    #10,a
1818: 039D  CD0000          jsr     Wait10Milliseconds
1819:
1820: 03A0  CD0A06  .136    jsr     ShowFirstWord
1821: 03A3  1803            bra     .142
1822:
1823: 03A5      .138
1824: 03A5      .140
1825: 03A5  CD7806  .141a   jsr     OutSorry
1826:
1827: 03A8  1814  .142      bra     .158
1828:
1829: 03AA  FE20  .144      cmp     #SPCBAR
1830: 03AC  2005            bne     .150
1831:
1832: 03AE            dospace
1833: 03AE  CD6C06  .146    jsr     ShowWindowWord
1834:
1835: 03B1  180B  .148      bra     .158
1836:
1837: 03B3      .150
1838: 03B3  3A0000  .151    move    Key,a           return the key to the kybd buffer
1839: 03B6  CD0000          jsr     KeyPut
1840:
1841: 03B9      .152        moveb   #-1,sys_clear
1842:
1843: 03BE      .158                                ;exit from switch
1844:
1845: 03BE  3A3800  .160    move    sys_clear,a
1846: 03C1                  lea     reenter,hl
1847: 03C4  B6              or      (hl)
1848: 03C5  CA9302          jeq     .18
1849:
1850: 03C8  C9    .162      rts
1851:
1852:             ;****************************************************
1853:             ;Continue the word list:
1854:
1855:             ;ContinueTheList ()
1856:             ;
1857:             ;2      OutString("Continuing ...")
1858:             ;4      StatusChar = CLOCK0
1859:             ;6
1860:             ;8      if (MoreList == 1)
1861:             ;10         numcands = DoMoreSelect()
1862:             ;12     else
```

```
1863:                     ;14              numcands = DoMoreTypo()
1864:                     ;16
1865:                     ;18         if numcands > 0
1866:                     ;20             /* Delay so it looks like something happened!
1867:                     ;22             Wait10Milliseconds(10)
1868:                     ;24             ShowFirstWord()
1869:                     ;26         else
1870:                     ;28             OutString("No More Words")
1871:                     ;30             WindowWord[0] = 0
1872:                     ;32             StatusChar = NO_STATUS
1873:                     ;34
1874:
1875:                     ;****************************************************
1876:                     ;Input registers:
1877:                     ;   none
1878:                     ;Output registers:
1879:                     ;   none
1880:
1881: 03C9                          loc
1882: 03C9                ContinueTheList
1883: 03C9   CD0000        .2       jsr      OutString
1884: 03CC   436F6E74               text     "Continuing "
1885: 03D7   21212100               db       SHORT_DASH,SHORT_DASH,SHORT_DASH,0
1886:
1887: 03DB                  .4      moveb    #CLOCK0,StatusChar
1888:
1889: 03E0   3A0000         .8      move     MoreList,a
1890: 03E3   FE01                   cmp      #1
1891: 03E5   2005                   bne      .12
1892:
1893: 03E7   CD0000        .10      jsr      DoMoreSelect
1894: 03EA   1803                   bra      .16
1895:
1896: 03EC   CD0000        .12      jsr      DoMoreTypo
1897:
1898: 03EF   223900        .16      move     h1,numcands
1899: 03F2                          tstw     h1
1900: 03F4   280F                   beq      .26
1901: 03F6                          tstb     h
1902: 03F8  -FA0504                 jmi      .26
1903:
1904: 03FB   3E0A          .22      move     #10,a
1905: 03FD   CD0000                 jsr      Wait10Milliseconds
1906:
1907: 0400   CD0A06        .24      jsr      ShowFirstWord
1908: 0403   181A                   bra      .34
1909:
1910: 0405                 .26
1911: 0405   CD0000        .28      jsr      OutString
1912: 0408   4E6F204D               text     "No More Words/0"
1913:
1914: 0416                 .30      clrb     WindowWord
1915:
1916: 041A                 .32      moveb    #NO_STATUS,StatusChar
1917:
1918: 041F   C9            .34      rts
1919:
1920:                     ;****************************************************
1921:                     ;Show a string on the display that may be longer than
1922:                     ;the number of characters in the display.
1923:
1924:                     ;ShowString (string)   /* Mode B Version */
1925:                     ;      char string[]
1926:                     ;
1927:                     ;      byte len, pos, oldpos, oldlen
1928:                     ;      char temp
1929:                     ;
1930:                     ;2    if (len = strlen(string)) <= (DISPSIZE - 1)
1931:                     ;4        DispString(string)
1932:                     ;5        DispSetColumn(DISPSIZE - 1)
1933:                     ;5a       DispChar(StatusChar)
1934:                     ;6    else
1935:                     ;8        pos = oldpos = 0
1936:                     ;10       while (1)
1937:                     ;12          if pos == 0
```

```
1938:                ;14              DispString(string[pos])
1939:                ;16              DispSetColumn(DISPSIZE - 2)
1940:                ;18              DispChar(MORE_RIGHT)
1941:                ;19              DispChar(StatusChar)
1942:                ;19a             oldpos = pos; oldlen = len
1943:                ;20              pos = pos + (DISPSIZE - 2)
1944:                ;22              len = len - (DISPSIZE - 2)
1945:                ;24          else
1946:                ;26              if len > (DISPSIZE - 2)
1947:                ;28                  temp = string[pos-1]
1948:                ;30                  string[pos-1] = MORE_LEFT
1949:                ;32                  DispString(string[pos-1])
1950:                ;34                  DispSetColumn(DISPSIZE - 1)
1951:                ;36                  DispChar(MORE_RIGHT)
1952:                ;38                  string[pos-1] = temp
1953:                ;39                  oldpos = pos; oldlen = len
1954:                ;40                  pos = pos + (DISPSIZE - 2)
1955:                ;42                  len = len - (DISPSIZE - 2)
1956:                ;44              else
1957:                ;45                  oldpos = pos
1958:                ;49                  oldlen = len; len = 0
1959:                ;50                  temp = string[pos-1]
1960:                ;52                  string[pos-1] = MORE_LEFT
1961:                ;54                  DispString(string[pos-1]
1962:                ;55                  DispSetColumn(DISPSIZE-1)
1963:                ;55a                 DispChar(StatusChar)
1964:                ;56                  string[pos-1] = temp
1965:                ;60          KeyGet()
1966:                ;62          if (Key = CLEAR)
1967:                ;64              sys_clear = TRUE
1968:                ;66              break
1969:                ;67b         else if (Key == BS)
1970:                ;67c             if (oldpos != 0)
1971:                ;67d                 pos = oldpos - 1
1972:                ;67e                 len = oldlen + 1
1973:                ;67f             else
1974:                ;67g                 pos = oldpos
1975:                ;67h                 len = oldlen
1976:                ;67i         else if (Key == ENTER)
1977:                ;67j             if (len == 0)
1978:                ;67ja                KeyPut(SC_DN)
1979:                ;67k                 break
1980:                ;67l             else
1981:                ;67m                 pos = oldpos + 1
1982:                ;67n                 len = oldlen - 1
1983:                ;67o         else if ((Key == SC_UP) || (Key == SC_DN))
1984:                ;67p             break
1985:                ;67q         else if (len == 0)
1986:                ;67r             break
1987:                ;68      /* end of while (1) loop
1988:                ;69      if ((Key == SC_UP) || (Key == SC_DN))
1989:                ;69a         KeyPut(Key)
1990:                ;69b     strmove(string,WindowWord)          /* Save current window word
1991:                ;70 /* end of ShowString
1992:
1993:                ;****************************************************
1994:                ;Input registers:
1995:                ;   hl = string
1996:                ;Output registers:
1997:                ;   none
1998:
1999: 0420              loc
2000: 0420              begvar
2001: 0000          .string  ds     CHAR_PTR
2002: 0002          .len     ds     BYTE
2003: 0003          .pos     ds     BYTE
2004: 0004          .oldpos  ds     BYTE
2005: 0005          .oldlen  ds     BYTE
2006: 0006          .temp    ds     CHAR
2007: 0007              endvar
2008:
2009: 0420          ShowString
2010: 0420              alcvar                   allocate stack space for locals
2011: 042A              storwiy hl,.string       save input parameter
2012:
```

```
2013: 0430  CD0000    .2      jsr     strlen
2014: 0433  7D                move    l,a
2015: 0434  FD7702            move    a,.len(iy)
2016: 0437  FE10              cmp     #DISPSIZE
2017: 0439  3017              bcc     .6
2018:
2019: 043B            .4      loadwiy .string,hl
2020: 0441  CD0000            jsr     DispString
2021:
2022: 0444  3E0F      .5      move    #DISPSIZE-1,a
2023: 0446  CD0000            jsr     DispSetColumn
2024:
2025: 0449  3A0000    .5a     move    StatusChar,a
2026: 044C  CD0000            jsr     DispChar
2027: 044F  C38105            jmp     .69b
2028:
2029: 0452            .6
2030: 0452  FD360300  .8      move    #0,.pos(iy)
2031: 0456  FD360400          move    #0,.oldpos(iy)
2032:
2033: 045A            .10
2034: 045A            .12     tstb    .pos(iy)
2035: 045E  2035              bne     .24
2036:
2037: 0460  CD9805    .14     jsr     .stringposhl    hl = &string[pos]
2038: 0463  CD0000            jsr     DispString
2039:
2040: 0466  3E0E      .16     move    #DISPSIZE-2,a
2041: 0468  CD0000            jsr     DispSetColumn
2042:
2043: 046B  3E25      .18     move    #MORE_RIGHT,a
2044: 046D  CD0000            jsr     DispChar
2045:
2046: 0470  3A0000    .19     move    StatusChar,a
2047: 0473  CD0000            jsr     DispChar
2048:
2049: 0476            .19a    moveb   .pos(iy),.oldpos(iy)
2050: 047C                    moveb   .len(iy),.oldlen(iy)
2051:
2052: 0482  FD7E03    .20     move    .pos(iy),a
2053: 0485  C60E              add     #DISPSIZE-2
2054: 0487  FD7703            move    a,.pos(iy)
2055:
2056: 048A  FD7E02    .22     move    .len(iy),a
2057: 048D  D60E              sub     #DISPSIZE-2
2058: 048F  FD7702            move    a,.len(iy)
2059: 0492  C30B05            jmp     .60
2060:
2061: 0495            .24
2062: 0495  FD7E02    .26     move    .len(iy),a
2063: 0498  FE0F              cmp     #(DISPSIZE-2)+1
2064: 049A  DADB04            jcs     .44
2065:
2066: 049D  CD9805    .28     jsr     .stringposhl    hl = &string[pos]
2067: 04A0  2B                dec     hl
2068: 04A1              moveb   (hl),.temp(iy)
2069:
2070: 04A5  3624      .30     move    #MORE_LEFT,(hl)
2071:
2072: 04A7  CD0000    .32     jsr     DispString
2073:
2074: 04AA  3E0F      .34     move    #DISPSIZE-1,a
2075: 04AC  CD0000            jsr     DispSetColumn
2076:
2077: 04AF  3E25      .36     move    #MORE_RIGHT,a
2078: 04B1  CD0000            jsr     DispChar
2079:
2080: 04B4  CD9805    .38     jsr     .stringposhl    hl = &string[pos]
2081: 04B7  2B                dec     hl
2082: 04B8              moveb   .temp(iy),(hl)
2083:
2084: 04BC            .39     moveb   .pos(iy),.oldpos(iy)
2085: 04C2                    moveb   .len(iy),.oldlen(iy)
2086:
2087: 04C8  FD7E03    .40     move    .pos(iy),a
```

```
2088: 04CB  C60E              add     #DISPSIZE-2
2089: 04CD  FD7703            move    a,.pos(iy)
2090:
2091: 04D0  FD7E02    .42     move    .len(iy),a
2092: 04D3  D60E              sub     #DISPSIZE-2
2093: 04D5  FD7702            move    a,.len(iy)
2094: 04D8  C30B05            jmp     .60
2095:
2096: 04DB            .44
2097: 04DB            .45     moveb   .pos(iy),.oldpos(iy)
2098:
2099: 04E1            .49     moveb   .len(iy),.oldlen(iy)
2100: 04E7  FD360200          move    #0,.len(iy)
2101:
2102: 04EB  CD9805    .50     jsr     .stringposhl    hl = &string[pos]
2103: 04EE  2B                dec     hl
2104: 04EF              moveb   (hl),.temp(iy)
2105:
2106: 04F3  3624      .52     move    #MORE_LEFT,(hl)
2107:
2108: 04F5  CD0000    .54     jsr     DispString
2109:
2110: 04F8  3E0F      .55     move    #DISPSIZE-1,a
2111: 04FA  CD0000            jsr     DispSetColumn
2112:
2113: 04FD  3A0000    .55a    move    StatusChar,a
2114: 0500  CD0000            jsr     DispChar
2115:
2116: 0503  CD9805    .56     jsr     .stringposhl    hl = &string[pos]
2117: 0506  2B                dec     hl
2118: 0507              moveb   .temp(iy),(hl)
2119:
2120: 050B  CD0000    .60     jsr     KeyGet
2121:
2122: 050E  FE07      .62     cmp     #CLEAR
2123: 0510  2007              bne     .67b
2124:
2125: 0512            .64     moveb   #-1,sys_clear
2126: 0517  185A      .66     bra     .69
2127:
2128: 0519  FE05      .67b    cmp     #BS
2129: 051B  2024              bne     .67i
2130:
2131: 051D            .67c    tstb    .oldpos(iy)
2132: 0521  2810              beq     .67f
2133:
2134: 0523  FD7E04    .67d    move    .oldpos(iy),a
2135: 0526  3D                dec     a
2136: 0527  FD7703            move    a,.pos(iy)
2137:
2138: 052A  FD7E05    .67e    move    .oldlen(iy),a
2139: 052D  3C                inc     a
2140: 052E  FD7702            move    a,.len(iy)
2141: 0531  183D              bra     .68
2142:
2143: 0533            .67f
2144: 0533            .67g    moveb   .oldpos(iy),.pos(iy)
2145: 0539            .67h    moveb   .oldlen(iy),.len(iy)
2146: 053F  182F              bra     .68
2147:
2148: 0541  FE06      .67i    cmp     #ENTER
2149: 0543  201D              bne     .67o
2150:
2151: 0545            .67j    tstb    .len(iy)
2152: 0549  2007              bne     .67l
2153:
2154: 054B  3E02      .67ja   move    #SC_DN,a
2155: 054D  CD0000            jsr     KeyPut
2156:
2157: 0550  1821      .67k    bra     .69
2158:
2159: 0552            .67l
2160: 0552  FD7E04    .67m    move    .oldpos(iy),a
2161: 0555  3C                inc     a
2162: 0556  FD7703            move    a,.pos(iy)
```

```
2163:
2164: 0559  FD7E05      .67n    move    .oldlen(iy),a
2165: 055C  3D                  dec     a
2166: 055D  FD7702              move    a,.len(iy)
2167: 0560  180E                bra     .68
2168:
2169: 0562  FE01        .67o    cmp     #SC_UP
2170: 0564  280D                beq     .69
2171: 0566  FE02                cmp     #SC_DN
2172: 0568  2809                beq     .69
2173:
2174: 056A              .67q    tstb    .len(iy)
2175: 056E  2803        .67r    beq     .69
2176:
2177: 0570  C35A04      .68     jmp     .10
2178:
2179: 0573  3A0000      .69     move    Key,a
2180: 0576  FE01                cmp     #SC_UP
2181: 0578  2804                beq     .69a
2182: 057A  FE02                cmp     #SC_DN
2183: 057C  2003                bne     .69b
2184:
2185: 057E  CD0000      .69a    jsr     KeyPut
2186:
2187: 0581              .69b    loadwiy .string,de
2188: 0587                      lea     WindowWord,hl
2189: 058A  CD0000              jsr     strmove
2190:
2191: 058D              .70     exit
2192:
2193:
2194: 0598              .stringposhl
2195: 0598                      loadwiy .string,hl
2196: 059E  FD5E03              move    .pos(iy),e
2197: 05A1                      clrb    d
2198: 05A3  19                  add     de,hl
2199: 05A4  C9                  rts
2200:
2201:                   ;****************************************************
2202:                   ;void AddKey ()
2203:                   ;{
2204:                   ;       word_buf[word_size] = Key;
2205:                   ;       word_size++;
2206:                   ;       word_buf[word_size] = '\0';
2207:                   ;       if (word_size-wb_sow > DISPSIZE)
2208:                   ;               wb_sow++;
2209:                   ;}
2210:
2211: 05A5                      loc
2212: 05A5              AddKey
2213: 05A5                      moveb   Key,b
2214: 05A9  3A1A00              move    word_size,a
2215: 05AC                      PutTB   word_buf
2216:
2217: 05B5                      incb    word_size
2218:
2219: 05B9                      clrb    b
2220: 05BB  3A1A00              move    word_size,a
2221: 05BE                      PutTB   word_buf
2222:
2223: 05C7  3A1A00              move    word_size,a
2224: 05CA                      lea     wb_sow,hl
2225: 05CD  96                  sub     (hl)
2226: 05CE  FE11                cmp     #DISPSIZE+1
2227: 05D0  3801                bcs     .end
2228:
2229: 05D2  34                  inc     (hl)
2230:
2231: 05D3  C9          .end    rts
2232:
2233:                   ;****************************************************
2234:                   ;ShowResultWord ()
2235:                   ;       if (numcands == 0)
2236:                   ;               OutSorry();
2237:                   ;       else
```

```
2238:                        ;              ShowWindowWord();
2239:                        ;)
2240:
2241: 05D4                   loc
2242: 05D4           ShowResultWord
2243: 05D4  2A3900           move    numcands,hl
2244: 05D7                   tstw    hl
2245: 05D9  2003             bne     .2
2246:
2247: 05DB  C37806           jmp     OutSorry
2248:
2249: 05DE  C36C06    .2     jmp     ShowWindowWord
2250:
2251:                  ;****************************************************
2252:                  ;void ShowPrevWord ()
2253:                  ;(
2254:                  ;       strmove(DoPrevList(), WindowWord);
2255:                  ;       scroll_indx--;
2256:                  ;       if scroll_indx == 1
2257:                  ;               StatusChar = MORE_DOWN
2258:                  ;       else
2259:                  ;               StatusChar = MORE_UP_AND_DOWN
2260:                  ;       ShowWindowWord();
2261:                  ;)
2262:
2263: 05E1                   loc
2264: 05E1           ShowPrevWord
2265: 05E1  CD0000           jsr     DoPrevList
2266: 05E4  EB               exg     de,hl
2267: 05E5                   lea     WindowWord,hl
2268: 05E8  CD0000           jsr     strmove
2269:
2270: 05EB                   decw    scroll_indx
2271:
2272: 05F2  110100           move    #1,de
2273: 05F5                   clc
2274: 05F6  ED52             sbc     de,hl
2275: 05F8  2007             bne     .2
2276:
2277: 05FA                   moveb   #MORE_DOWN,StatusChar
2278: 05FF  1805             bra     .4
2279:
2280: 0601           .2      moveb   #MORE_UP_AND_DOWN,StatusChar
2281:
2282: 0606  CD6C06   .4      jsr     ShowWindowWord
2283: 0609  C9               rts
2284:
2285:                  ;****************************************************
2286:                  ;void ShowFirstWord ()
2287:                  ;(
2288:                  ;       strmove(DoNextList(), WindowWord);
2289:                  ;       scroll_indx = 1;
2290:                  ;       if numcands == 1
2291:                  ;               StatusChar = NO_MATCH
2292:                  ;       else
2293:                  ;               StatusChar = MORE_DOWN
2294:                  ;               OutString("Start of List")
2295:                  ;               WaitHalfSecond()
2296:                  ;       ShowWindowWord()
2297:                  ;)
2298:
2299: 060A                   loc
2300: 060A           ShowFirstWord
2301: 060A  CD0000           jsr     DoNextList
2302: 060D  EB               exg     de,hl
2303: 060E                   lea     WindowWord,hl
2304: 0611  CD0000           jsr     strmove
2305:
2306: 0614                   movew   #1,scroll_indx
2307:
2308: 061A  ED5B3900         move    numcands,de
2309: 061E                   clc
2310: 061F  ED52             sbc     de,hl
2311: 0621  2007             bne     .2
2312:
```

```
2313: 0623                          moveb   #NO_MATCH,StatusChar
2314: 0628  1808                    bra     .4
2315:
2316: 062A              .2          moveb   #MORE_DOWN,StatusChar
2317:
2318: 062F  CDC606                  jsr     DispStartOfList
2319:
2320: 0632  C36C06      .4          jmp     ShowWindowWord
2321:
2322:                   ;****************************************************
2323:                   ;void ShowNextWord ()
2324:                   ;{
2325:                   ;       strmove(DoNextList(), WindowWord);
2326:                   ;       scroll_indx++;
2327:                   ;       if scroll_indx == numcands
2328:                   ;               if MoreList
2329:                   ;                       StatusChar = MORE_LIST
2330:                   ;               else
2331:                   ;                       StatusChar = MORE_UP
2332:                   ;       else
2333:                   ;               StatusChar = MORE_UP_AND_DOWN
2334:                   ;       ShowWindowWord();
2335:                   ;}
2336:
2337: 0635                          loc
2338: 0635              ShowNextWord
2339: 0635  CD0000                  jsr     DoNextList
2340: 0638  EB                      exg     de,hl
2341: 0639                          lea     WindowWord,hl
2342: 063C  CD0000                  jsr     strmove
2343:
2344: 063F                          incw    scroll_indx
2345:
2346: 0646  ED5B3900                move    numcands,de
2347: 064A                          clc
2348: 064B  ED52                    sbc     de,hl
2349: 064D  2014                    bne     .2
2350:
2351: 064F                          tstb    MoreList
2352: 0653  2807                    beq     .1
2353:
2354: 0655                          moveb   #MORE_LIST,StatusChar
2355: 065A  180C                    bra     .4
2356:
2357: 065C              .1          moveb   #MORE_UP,StatusChar
2358: 0661  1805                    bra     .4
2359:
2360: 0663              .2          moveb   #MORE_UP_AND_DOWN,StatusChar
2361:
2362: 0668  CD6C06      .4          jsr     ShowWindowWord
2363: 066B  C9                      rts
2364:
2365:                   ;****************************************************
2366:
2367: 066C              ShowWindowWord
2368: 066C                          tstb    WindowWord
2369: 0670  2806                    beq     OutSorry
2370:
2371: 0672                          lea     WindowWord,hl
2372: 0675  C32004                  jmp     ShowString
2373:
2374:                   ;****************************************************
2375:
2376: 0678              OutSorry
2377: 0678                          moveb   #NO_STATUS,StatusChar
2378:
2379: 067D  CD0000                  jsr     OutString
2380: 0680  536F7272                text    "Sorry can't help/0"
2381: 0691                          clrb    WindowWord              no word in window now
2382:
2383: 0695  C9                      rts
2384:
2385:                   ;****************************************************
2386:
2387: 0696              OutChecking
2388: 0696                          moveb   #CLOCK0,StatusChar
```

```
2389: 069B  CD0000              jsr     OutString
2390: 069E  43686563            text    "Checking "
2391: 06A7  21212100            db      SHORT_DASH,SHORT_DASH,SHORT_DASH,0
2392: 06AB  C9                  rts
2393:
2394:                   ;****************************************************
2395:                   ;Display the word in word_buf starting at wb_sow
2396:                   ;and starting at the home position of the display:
2397:
2398: 06AC                      loc
2399: 06AC              DispWord
2400: 06AC                      lea     word_buf,hl
2401: 06AF                      moveb   wb_sow,e
2402: 06B3                      clrb    d
2403: 06B5  19                  add     de,hl           hl = &word_buf+wb_sow
2404:
2405: 06B6  7E                  move    (hl),a          save char in first position
2406: 06B7  F5                  push    af
2407: 06B8  E5                  push    hl              and it's location
2408: 06B9                      tstb    e               is the window shifted ?
2409: 06BB  2802                beq     .2              no
2410:
2411: 06BD  3624                move    #MORE_LEFT,(hl) yes - show the shift
2412:
2413: 06BF  CD0000      .2      jsr     DispString      display a window's worth
2414:
2415: 06C2  E1                  pop     hl              restore char in first position
2416: 06C3  F1                  pop     af
2417: 06C4  77                  move    a,(hl)
2418: 06C5  C9                  rts
2419:
2420:                   ;****************************************************
2421:
2422: 06C6              DispStartOfList
2423: 06C6  CD0000              jsr     OutString
2424: 06C9  53746172            text    "Start of List/0"
2425: 06D7  C30000              jmp     WaitHalfSecond
2426:
2427: 06DA              DispEndOfList
2428: 06DA  CD0000              jsr     OutString
2429: 06DD  456E6420            text    "End of List/0"
2430: 06E9  C30000              jmp     WaitHalfSecond
2431:
2432:                   ;****************************************************
2433:
2434: 06EC                      end Assembly completed for file SpHI.asm
Relocatable code size = 1772, Absolute code size = 0, Data ram size = 61
Number of errors = 0, number of warnings = 0

1:                  ;****************************************************
   2:                  ;Initialize everything and start running:
   3:
   4:                  ; *** --> Must be first module linked!!!
   5:
   6:                  ;****************************************************
   7:
 861: 0000                     list    1
 862:
 863:                  ;****************************************************
 864:
 865: 0000                     def     ClearInterrupt  void ()
 866: 0000                     def     SetupDefaults   void ()
 867: 0000                     def     SpellingCheckerStartup  void ()
 868:
 869: 0000                     def     FirstData       first data RAM location
 870:
 871: 0000                     def     context         S_CONTEXT*(MAXWORD+5)
 872:
 873: 0000                     def     tally           CHAR[256]
 874: 0000                     def     phbuffer        CHAR[MAXWORD+2]
 875: 0000                     def     phessence       UCHAR[MAXWORD]
 876: 0000                     def     phtwochar       UCHAR[MAXWORD*2+1]
 877: 0000                     def     phfullenc       UCHAR[MAXWORD*3+1]
 878: 0000                     def     phon_stack      PHSTACK[MAXWORD+1]
 879:
```

```
880: 0000                def    AnagramList      CHAR[]
881: 0000                def    CState           BYTE[15]
882: 0000                def    EndAnagramList   CHAR[]
883: 0000                def    EndWordList      CHAR[]
884: 0000                def    PhonList         CHAR[MAXCANDS*CANDSIZE]
885: 0000                def    ScanPtr          CHAR_PTR
886: 0000                def    WordList         CHAR[]
887: 0000                def    WordCount        int
888: 0000                def    WordListPtr      CHAR_PTR
889: 0000                def    WordListBeg      CHAR_PTR
890: 0000                def    WordListEnd      CHAR_PTR
891:
892:             ;****************************************************
893:
894:             ;In Data.asm:
895:
896: 0000                ref    AnagramSize      BYTE
897: 0000                ref    HangTries        BYTE
898: 0000                ref    LastClrData      one past address of last data RAM to clear
899: 0000                ref    Mode             BYTE
900: 0000                ref    ModeCheck        BYTE
901: 0000                ref    NumberSize       BYTE
902: 0000                ref    RandomWordSize   BYTE
903:
904:                     if     Product = WordWiz
905:                     ref    UserName         CHAR[NAMESIZE+1]
906: 0000                endi
907:
908: 0000                if     Product = SpellMaster
909: 0000                ref    MaxLotto         BYTE
910: 0000                ref    NumDice          BYTE
911: 0000                ref    MinAnagramSize   BYTE
912: 0000                ref    JumbleSize       BYTE
913: 0000                endi
914:
915:             ;In GameSubs.asm:
916:
917:                     if     Product = WordWiz
918:                     ref    InitCodeWord     void ()
919: 0000                endi
920:
921:             ;In IO.asm:
922:
923: 0000                ref    IOInit           void ()
924: 0000                ref    NewMode          void (a)
925: 0000                ref    WaitForKeyRelease void ()
926: 0000                ref    SetContrast      void (a)
927:
928:             ;In SpHI.asm:
929:
930: 0000                ref    sphimain         void ()
931:
932:             ;****************************************************
933:             ;Interrupt vector for CLEAR key:
934:
935: 0038        ClearInterruptVector    equ      $0038
936:
937:             ;****************************************************
938:             ;Setup address of first RAM data item
939:
940: 0000                       dseg
941: 0000        FirstData      equ      *
942:
943:             ;****************************************************
944:             ;The tally table is used in the Numerics.asm module, but we
945:             ;want to insure that it starts on a page boundary so we
946:             ;place it as the first data item. This means that the link
947:             ;origin for all data must be on a page boundary!!!
948:
949: 0000        tally          equ      *    CHAR*256       theta/qtheta tally RAM
950:
951:             ;****************************************************
952:             ;The anagram list can share the tally and context buffers:
953:
954:             ;But the combination state array must be on a page boundary:
955:
```

```
 956: 0000              CState      ds      byte*15           high nibble = used[],
 957:                               ;                         low nibble  = pos[]
 958:
 959: 000F              AnagramList equ     *
 960:
 961:                   ;****************************************************
 962:                   ;The context stack used in the Pcorrect routine in Correct.asm
 963:                   ;is defined here so that it can share the ram used for the
 964:                   ;tally buffer.
 965:
 966: 000F              context     ds      S_CONTEXT*(MAXWORD+5)
 967:
 968:                   ;****************************************************
 969:                   ;The start of our list of result words:
 970:
 971: 0069              WordList    equ     *
 972:
 973:                   ;****************************************************
 974:
 975: 0100                          align   256               fill out the page for the tally buffer
 976:
 977:                   ;****************************************************
 978:                   ;These next four buffers are used in the Phoncorrect routine.
 979:                   ;We want to insure that none of them cross a page boundary
 980:                   ;so we have to put them here. (The code assumes that each of
 981:                   ;these buffers is contained in one page.)
 982:
 983: 0100                          align   256
 984: 0100              phbuffer    ds      CHAR*(MAXWORD+2)
 985: 011B              phessence   ds      UCHAR*MAXWORD
 986: 0134              phtwochar   ds      UCHAR*(MAXWORD*3+1)
 987: 0180              phfullenc   ds      UCHAR*(MAXWORD*3+1)
 988: 01CC                          assume  (*-phbuffer),<,256     make sure they fit on a pa
 989:
 990:                   ;****************************************************
 991:                   ;The stack used by the Phoncorrect routine in Zcorrect.asm:
 992:
 993: 01CC              phon_stack  ds      PHSTACK*(MAXWORD+1)
 994:
 995:                   ;****************************************************
 996:                   ;Some more room for the word list:
 997:
 998: 029C                          ds      170
 999:
1000: 0346              EndWordList equ     *                 end of the WordList
1001:
1002:                   ;****************************************************
1003:                   ;The list of phonetic candidate corrections:
1004:
1005: 0346              PhonList    ds      MAXCANDS*CANDSIZE     the phonetic candidates li
1006:
1007:                   ;****************************************************
1008:                   ;The anagram list can share the PhonList:
1009:
1010: 047A              EndAnagramList equ  *
1011:
1012:                   ;****************************************************
1013:                   ;Things that control the word list:
1014:
1015: 047A              ScanPtr     ds      CHAR_PTR          current position in WordList
1016:                               ;                         (points to start of current word)
1017:
1018: 047C              WordCount   ds      int               number of words in the list
1019: 047E              WordListPtr ds      CHAR_PTR          ptr to 00 WordList ender
1020:
1021: 0480              WordListBeg ds      CHAR_PTR          ptr to start of word list
1022: 0482              WordListEnd ds      CHAR_PTR          ptr to end of word list
1023:
1024:                   ;****************************************************
1025:                   ;The stack:
1026:
1027: 0484              stack       ds      64
1028: 04C3              StackTop    equ     *-1
1029: 04C4                          rseg
1030:
1031:                   ;****************************************************
```

```
1032:
1033: 0000                         loc
1034: 0000               SpellingCheckerStartup
1035: 0000    F3                   di                           disable interrupts
1036: 0001    ED56                 im      1                    set up interrupt mode
1037: 0003                         lea     StackTop,sp          init stack ptr
1038:
1039: 0006                         if      ((Hardware = FSA) or (Hardware = Discrete))
1040: 0006                         clrb    a                    turn display contrast to minimum value so
1041: 0007    CD0000               jsr     SetContrast                  no garbage appears on the display
1042: 000A                         endi                                 before we clear it
1043:
1044: 000A                         clrb    a                    flag not a clear interrupt
1045:
1046: 000B               Restart   lea     StackTop,sp          re-init stack ptr
1047: 000E    08                   exg     af                   save clear interrupt flag in a'
1048: 000F    D9                   exx
1049:
1050:                   ;Clear all of our data RAM:
1051:
1052: 0010                         lea     LastClrData,hl       calculate data RAM size to clear
1053: 0013                         lea     FirstData,de
1054: 0016                         clc
1055: 0017    ED52                 sbc     de,hl
1056: 0019    E5                   push    hl                   and put it in bc
1057: 001A    C1                   pop     bc
1058: 001B    0B                   dec     bc                   one less because we clear the first byte
1059:                     ;                                         manually
1060:
1061: 001C                         lea     FirstData,hl         init source ptr
1062: 001F                         clrb    (hl)                 clear first byte
1063: 0021                         lea     FirstData+1,de       destination ptr = start + 1
1064: 0024    EDB0                 bmvir                        move the first byte through the block
1065: 0026    C34600               jmp     Skip                 skip over interrupt vector
1066:
1067:                   ;****************************************************
1068:                   ;The vector that handles CLEAR key interrupts:
1069:
1070:                         if      (* - SpellingCheckerStartup) > ClearInterruptVector
1071:                         error   "Code before interrupt vector too big!!"
1072: 0029                    endi
1073:
1074: 0038                         align   ClearInterruptVector
1075: 0038               ClearInterrupt
1076: 0038    CD0000               jsr     WaitForKeyRelease    wait until CLEAR key is released
1077:
1078:                   ;If we're running on the wire wrap under the emulator, then we
1079:                   ;have to restore the contrast value after a shut off (because
1080:                   ;we write a contrast value of 0 to the control register along
1081:                   ;with the power-off bit when we shut off.) Since we don't
1082:                   ;actually power-off on the emulated wire wrap, the contrast
1083:                   ;value never gets reset. We'll use the CLEAR key to do that...
1084:
1085: 003B    3A0000               move    Mode,a
1086: 003E    CD0000               jsr     NewMode
1087:
1088: 0041    3EFF                 move    #-1,a                flag it's a clear interrupt
1089: 0043    C30B00               jmp     Restart              and restart everything
1090:
1091:                   ;****************************************************
1092:                   ;Do our spelling checker thing:
1093:
1094: 0046    CD0000     Skip      jsr     IOInit               initialize the I/O module
1095:
1096: 0049    3A0000               move    Mode,a               have we setup mode yet ?
1097: 004C    EEA5                 eor     #$A5                       (if ModeCheck == Mode XOR $A5)
1098: 004E                         lea     ModeCheck,hl
1099: 0051    BE                   cmp     (hl)
1100: 0052    C46300               cne     SetupDefaults        no - setup default parameters
1101:
1102: 0055    3A0000               move    Mode,a               restore mode from last session
1103: 0058    CD0000               jsr     NewMode
1104:
1105: 005B    FB                   ei                           enable interrupts now
1106: 005C    08                   exg     af                   clear interrupt flag back into primary reg
1107: 005D    CD0000               jsr     sphimain
```

```
1108:
1109: 0060  76           AllDone halt
1110: 0061  18FD                 bra    AllDone
1111:
1112:                    ;****************************************************
1113:                    ;Setup default RAM parameters:
1114:
1115: 0063              SetupDefaults
1116:                           if     Product = WordWiz
1117:                           jsr    InitCodeWord    setup default code word
1118:                           clrb   UserName        no user name yet
1119:                           moveb  #10,AnagramSize default size of anagram words
1120: 0063                      endi
1121:
1122: 0063                      if     Product = SpellMaster
1123: 0063                      moveb  #7,AnagramSize  default size of anagram words
1124: 0068                      moveb  #40,MaxLotto    default max lotto number
1125: 006D                      moveb  #2,NumDice      default number of dice
1126: 0072                      moveb  #3,MinAnagramSize    default minimum anagram list word
1127: 0077                      moveb  #6,JumbleSize   default Jumble word size
1128: 007C                      endi
1129:
1130: 007C                      moveb  #10,HangTries   default number of hangman tries
1131: 0081                      moveb  #5,NumberSize   default size of random numbers
1132: 0086                      moveb  #6,RandomWordSize    default size of random words
1133:
1134: 008B                      moveb  #$53,Mode       display contrast = 3,
1135:                    ;                             hangman word size = 5
1136: 0090  C9                  rts
1137:
1138:                    ;****************************************************
1139:                    ;The GetTrie.asm module gets linked next and we must
1140:                    ;make sure it starts on a page boundary:
1141:
1142: 0100                      align  256
1143:
1144:                    ;****************************************************
1145:
1146: 0100                      end Assembly completed for file Main.asm
Relocatable code size = 130, Absolute code size = 0, Data ram size = 1220
Number of errors = 0, number of warnings = 0
```

```
  1:              ;****************************************************
  2:              ;"C" utility functions.
  3:
  4:              ;****************************************************
  5:
762: 0000                list   1
763:
764:              ;****************************************************
765:
766: 0000                def    strcat          void (de, hl)
767: 0000                def    strcmp          BOOL (de, hl)
768: 0000                def    strlen          int (hl), result in hl
769: 0000                def    strmove         PTR (de, hl), result in hl
770: 0000                def    strncmp         BOOL (de, hl, a)
771: 0000                def    tolower         CHAR (a), result in a
772: 0000                def    toupper         CHAR (a), result in a
773: 0000                def    Wait10Milliseconds    void (a)
774: 0000                def    Wait1Second     void ()
775: 0000                def    WaitHalfSecond  void ()
776:
777:              ;****************************************************
778:
779:              ;In IO.asm:
780:
781: 0000                ref    KeyTest2        BOOL ()
782:
783:              ;****************************************************
784:
```

```
785: 0000                     rseg
786:
787:                  ;**************************************************
788:                  ;Delay for 1/2 second:
789:
790: 0000                     loc
791: 0000            WaitHalfSecond
792: 0000   0632             move    #50,b
793:
794: 0002   C5       .loop   push    bc
795: 0003   3E01             move    #1,a
796: 0005   CD2400           jsr     Wait10Milliseconds
797: 0008   C1               pop     bc
798: 0009   10F7             dbne    .loop
799:
800: 000B   C9               rts
801:
802:                  ;**************************************************
803:                  ;Delay for 1 second, stop if a key is pressed:
804:
805: 000C                    loc
806: 000C            Wait1Second
807: 000C   0664             move    #100,b
808:
809: 000E   C5       .loop   push    bc
810: 000F   3E01             move    #1,a
811: 0011   CD2400           jsr     Wait10Milliseconds
812: 0014   C1               pop     bc
813:
814: 0015   78               move    b,a         test keyboard every 80 milliseconds
815: 0016   E607             and     #%00000111
816: 0018   2007             bne     .2
817:
818: 001A   C5               push    bc
819: 001B   CD0000           jsr     KeyTest2
820: 001E   C1               pop     bc
821: 001F   2802             beq     .end
822:
823: 0021   10EB     .2      dbne    .loop
824:
825: 0023   C9       .end    rts
826:
827:                  ;**************************************************
828:                  ;Delay for 10 milliseconds times value passed in reg a:
829:
830: 0024                    loc
831: 0024            Wait10Milliseconds
832: 0024   4F               move    a,c
833:
834:                  .loop1  if      Hardware = Mac
835:                          move    #1,b
836: 0025                     else
837: 0025   060C              move    #12,b
838: 0027                     endi
839:
840: 0027            .loop2  clrb    a
841: 0028   3C       .loop3  inc     a           4
842: 0029   20FD             bne     .loop3      12    (16 X 256) = 4096
843: 002B   10FA             dbne    .loop2            (4096 X 12) = 49,152
844:                  ;                                49,152 25MHZ = .0098
845: 002D   0D               dec     c
846: 002E   20F5             bne     .loop1
847: 0030   C9               rts
848:
849:                  ;**************************************************
850:                  ;void strcat(s,t)
851:                  ;  char s[], t[];
852:                  ;{
853:                  ;  int i, j;
854:                  ;
855:                  ;  i = j = 0;
856:                  ;  while (s[i] != '\0') i++;
857:                  ;  while ((s[i++] = t[j++]) != '\0') ;
858:                  ;}
859:
```

```
860:                    ;**************************************************
861:                    ;Add string2 to end of string1:
862:                    ;Input registers:
863:                    ;   de = string1
864:                    ;   hl = string2
865:                    ;Output registers:
866:                    ;   none
867:
868: 0031                      loc
869: 0031  E5      strcat  push    hl         save string2
870: 0032  EB              exg     de,hl      hl = string1
871: 0033  CD4A00          jsr     strlen     set de = ptr to one past 00 at end of string1
872: 0036  1B              dec     de         de now points to 00 at end of string1
873: 0037  E1              pop     hl         hl = string2
874:
875: 0038          .loop   moveb   (hl),(de)      now move string2 to end of string1
876: 003A  13              inc     de
877: 003B  23              inc     hl
878: 003C            tstb    a          until we move the 00 ender
879: 003D  20F9            bne     .loop
880:
881: 003F  C9              rts
882:
883:                    ;**************************************************
884:                    ;Move string1 to string2:
885:                    ;Input registers:
886:                    ;   de = string1
887:                    ;   hl = string2
888:                    ;Output registers:
889:                    ;   de = ptr to null at end of string1
890:                    ;   hl = ptr to null at end of new string2
891:
892: 0040                      loc
893: 0040          strmove moveb   (de),(hl)   move a byte
894: 0042            tstb    a          last byte moved ?
895: 0043  2804            beq     .end       yes - done
896:
897: 0045  23              inc     hl         no - bump ptrs
898: 0046  13              inc     de
899: 0047  18F7            bra     strmove
900:
901: 0049  C9      .end    rts
902:
903:                    ;**************************************************
904:                    ;int strlen(s)
905:                    ;  char *s;
906:                    ;(
907:                    ;  int n;
908:                    ;
909:                    ;  for (n=0; *s != '\0'; s++) n++;
910:                    ;  return(n);
911:                    ;)
912:
913:                    ;**************************************************
914:                    ;Input registers:
915:                    ;   hl = s
916:                    ;Output registers:
917:                    ;   hl = string length
918:                    ;   de = ptr to one past 00 ender
919:
920: 004A                      loc
921: 004A          strlen
922: 004A                  clrw    bc         init length counter
923: 004D                  clrb    a          scan until we find 00 ender
924: 004E  EDB1            cmpir
925: 0050  EB              exg     de,hl      de = ptr to one past 00 ender
926: 0051                  clrw    hl         calc length = -bc + 1
927: 0054  37              setc
928: 0055  ED42            sbc     bc,hl
929: 0057  C9              rts
930:
931:                    ;**************************************************
932:                    ;Compare two strings:
933:                    ;Input registers:
934:                    ;   de = string1 ptr
```

```
935:                  ;   hl = string2 ptr
936:                  ;Output registers:
937:                  ;   Equal set if strings are equal
938:
939: 0058                     loc
940: 0000             .str1   requ    de
941: 0000             .str2   requ    hl
942:
943: 0058             strcmp
944: 0058 1A          .loop   move    (.str1),a       byte from first
945: 0059 BE                  cmp     (.str2)         equal to second ?
946: 005A 2007                bne     .end            no - done - they're not equal
947:
948: 005C                     tstb    a               end of both ?
949: 005D 2804                beq     .end            yes - done - they're equal
950:
951: 005F 13                  inc     .str1
952: 0060 23                  inc     .str2
953: 0061 18F5                bra     .loop
954:
955: 0063 C9          .end    rts
956:
957:                  ;****************************************************
958:                  ;Compare two strings, only n chars significant:
959:                  ;Input registers:
960:                  ;   a  = n (length)
961:                  ;   de = string1 ptr
962:                  ;   hl = string2 ptr
963:                  ;Output registers:
964:                  ;   Equal set if strings are equal
965:
966: 0064                     loc
967: 0000             .str1   requ    de
968: 0000             .str2   requ    hl
969:
970: 0064 47          strncmp move    a,b             save length
971:
972: 0065 1A          .loop   move    (.str1),a       byte from first
973: 0066 BE                  cmp     (.str2)         equal to second ?
974: 0067 2007                bne     .end            no - done - they're not equal
975:
976: 0069 05                  dec     b               end of test ?
977: 006A 2804                beq     .end            yes - done - they're equal
978:
979: 006C 13                  inc     .str1
980: 006D 23                  inc     .str2
981: 006E 18F5                bra     .loop
982:
983: 0070 C9          .end    rts
984:
985:                  ;****************************************************
986:                  ;Convert a character to lowercase:
987:                  ;Input registers:
988:                  ;   a = char
989:                  ;Output registers:
990:                  ;   a = converted char
991:
992: 0071                     loc
993: 0071 FE41        tolower cmp     #'A'
994: 0073 3806                bcs     .end            if a < 'A'
995: 0075 FE5B                cmp     #'Z'+1
996: 0077 3002                bcc     .end            if a > 'Z'
997: 0079 F620                or      #$20
998: 007B C9          .end    rts
999:
1000:                 ;****************************************************
1001:                 ;Convert a character to uppercase:
1002:                 ;Input registers:
1003:                 ;   a = char
1004:                 ;Output registers:
1005:                 ;   a = converted char
1006:
1007: 007C                    loc
1008: 007C FE61       toupper cmp     #'a'
1009: 007E 3806               bcs     .end            if a < 'a'
```

```
1010: 0080  FE7B              cmp       #'z'+1
1011: 0082  3002              bcc       .end            if a > 'z'
1012: 0084  E6DF              and       #$DF
1013: 0086  C9        .end    rts
1014:
1015:                         ;****************************************************
1016:
1017: 0087                    end Assembly completed for file CUtils.asm
Relocatable code size = 135, Absolute code size = 0, Data ram size = 0
Number of errors = 0, number of warnings = 0

1:                          ;****************************************************
  2:
361: 0000                     list      1
362:
363:                          ;****************************************************
364:
365: 0000                     def       HelpTable       CHAR[]
366:
367:                          ;****************************************************
368:
369: 0000                     rseg
370:
371:                          ;****************************************************
372:
373:                  help     macro     &1
374:                           text      &1
375:                           db        0
376: 0000                      endm
377:
378: 0000  00                  db        0
379: 0001          HelpTable
380: 0001                      help      "Scroll down for"
381: 0011                      help      "a list of cmds.."
382: 0022                      help      "-A plays anagram"
383: 0033                      help      "game with a"
384: 003F                      help      "random word."
385: 004C                      help      "-AU plays"
386: 0056                      help      "anagram game"
387: 0063                      help      "with a user"
388: 006F                      help      "word."
389: 0075                      help      "-AS selects size"
390: 0086                      help      "of anagram root"
391: 0096                      help      "word."
392:
393: 009C                      if        Product = SpellMaster
394: 009C                      help      "-AW selects"
395: 00A8                      help      "minimum size of"
396: 00B8                      help      "words in an"
397: 00C4                      help      "anagram list."
398: 00D2                      endi
399:
400: 00D2                      help      "-B builds an"
401: 00DF                      help      "anagram list"
402: 00EC                      help      "using a user"
403: 00F9                      help      "root word."
404:
405:                           if        Product = WordWiz
406:                           help      "-D decodes an"
407:                           help      "encrypted word."
408:                           help      "-E encodes a"
409:                           help      "word."
410: 0104                      endi
411:
412: 0104                      help      "-H plays hang-"
413: 0113                      help      "man game with a"
414: 0123                      help      "random word."
415: 0130                      help      "-HU plays hang-"
416: 0140                      help      "man game with a"
417: 0150                      help      "user word."
418: 015B                      help      "-HS selects size"
419: 016C                      help      "of hangman word."
420: 017D                      help      "-HT selects the"
421: 018D                      help      "number of tries"
```

```
422: 019D              help     "in hangman game."
423:
424: 01AE              if       Product = SpellMaster
425: 01AE              help     "-J plays word"
426: 01BC              help     "jumble game."
427: 01C9              help     "-JS selects size"
428: 01DA              help     "of word jumble"
429: 01E9              help     "words."
430: 01F0              endi
431:
432:                   if       Product = WordWiz
433:                   help     "-K allows you to"
434:                   help     "specify your"
435:                   help     "code word."
436: 01F0              endi
437:
438: 01F0              help     "-L displays"
439: 01FC              help     "random letters."
440:
441:                   if       Product = WordWiz
442:                   help     "-N allows you to"
443:                   help     "specify your "
444:                   help     "name."
445: 020C              endi
446:
447: 020C              help     "-P displays"
448: 0218              help     "random numbers."
449: 0228              help     "-PS selects the"
450: 0238              help     "number of digits"
451: 0249              help     "in random"
452: 0253              help     "numbers."
453:
454: 025C              help     "-W displays"
455: 0268              help     "random words."
456: 0276              help     "-WS selects size"
457: 0287              help     "of random words."
458:
459: 0298              if       Product = SpellMaster
460: 0298              help     "-X displays dice"
461: 02A9              help     "numbers."
462: 02B2              help     "-XS selects the"
463: 02C2              help     "number of dice."
464: 02D2              help     "-Y displays"
465: 02DE              help     "lotto numbers."
466: 02ED              help     "-YS selects"
467: 02F9              help     "maximum lotto"
468: 0307              help     "number."
469: 030F              endi
470:
471:                   if       Product = WordWiz
472:                   help     "-? displays the"
473:                   help     "code word."
474: 030F              endi
475:
476: 030F              help     "--X performs"
477: 031C              help     "some diagnostic"
478: 032C              help     "tests."
479: 0333              help     "--Y performs a"
480: 0342              help     "display test."
481:
482: 0350 FF           db       -1
483:
484:                   ;**************************************************
485:
486: 0351              end Assembly completed for file HelpText.asm
Relocatable code size = 849, Absolute code size = 0, Data ram size = 0
Number of errors = 0, number of warnings = 0
 Mc280 1.2    Filename: Help.as-                        Page no.    1

1:                  ;**************************************************
   2:
```

```
759: 0000                       list    1
760:
761:                  ;*****************************************************
762:
763: 0000                       def     DoHelp          void ()
764:
765:                  ;*****************************************************
766:                  ;External references:
767:
768:                  ;In HelpText.asm:
769:
770: 0000                       ref     HelpTable       CHAR[]
771:
772:                  ;In IO.asm:
773:
774: 0000                       ref     DispString      void (hl)
775: 0000                       ref     KeyGet          CHAR (), result in a
776:
777: 0000                       ref     Key             CHAR
778:
779:                  ;In SpHI.asm:
780:
781: 0000                       ref     DispStartOfList void ()
782: 0000                       ref     DispEndOfList   void ()
783:
784:                  ;*****************************************************
785:
786: 0000                       rseg
787:
788:                  ;*****************************************************
789:                  ;void DoHelp()
790:                  ;10(
791:                  ;20     char *lp, temp
792:                  ;30
793:                  ;40     lp = HelpTable
794:                  ;50     OutString("Start of List")
795:                  ;60     WaitHalfSecond()
796:                  ;70
797:                  ;80     while (1)
798:                  ;90             DispString(lp)
799:                  ;100            Key = KeyGet()
800:                  ;110            if (Key == SC_UP)
801:                  ;120                    if (lp != HelpTable)
802:                  ;130                            lp -= 2
803:                  ;140                            while (*lp != 0)
804:                  ;150                                    lp--
805:                  ;160                            lp++
806:                  ;170                    else
807:                  ;180                            OutString("Start of List")
808:                  ;190                            WaitHalfSecond()
809:                  ;200
810:                  ;210            else if (Key == SC_DN)
811:                  ;220                    temp = lp
812:                  ;230                    while (*lp != 0)
813:                  ;240                            lp++
814:                  ;250                    lp++
815:                  ;260                    if (*lp == -1)
816:                  ;270                            OutString("End of List")
817:                  ;280                            WaitHalfSecond
818:                  ;290                            lp = temp
819:                  ;300    )
820:                  ;310)
821:
822:                  ;*****************************************************
823:
824: 0000                       loc
825: 0000                       dseg
826: 0000            .lp        ds      CHAR_PTR
827: 0002                       rseg
828:
829: 0000            DoHelp
830: 0000            .40        movea   HelpTable,.lp
831:
832: 0006 CD0000     .50        jsr     DispStartOfList
833:
```

```
834: 0009                .80
835: 0009  2A0000        .90     move    .lp,hl
836: 000C  CD0000                jsr     DispString
837:
838: 000F  CD0000        .100    jsr     KeyGet
839:
840: 0012  FE01          .110    cmp     #SC_UP
841: 0014  2022                  bne     .210
842:
843: 0016  2A0000        .120    move    .lp,hl
844: 0019                        lea     HelpTable,de
845: 001C                        clc
846: 001D  ED52                  sbc     de,hl
847: 001F  2812                  beq     .170
848:
849: 0021  2A0000        .130    move    .lp,hl
850: 0024  2B                    dec     hl
851: 0025  2B                    dec     hl
852:
853: 0026                .140    tstb    (hl)
854: 0028  2803                  beq     .160
855:
856: 002A  2B            .150    dec     hl
857: 002B  18F9                  bra     .140
858:
859: 002D  23            .160    inc     hl
860: 002E  220000                move    hl,.lp
861: 0031  1826                  bra     .300
862:
863: 0033                .170
864: 0033  CD0000        .180    jsr     DispStartOfList
865: 0036  1821                  bra     .300
866:
867: 0038  FE02          .210    cmp     #SC_DN
868: 003A  201D                  bne     .300
869:
870: 003C  2A0000        .220    move    .lp,hl
871: 003F  E5                    push    hl              keep temp in bc
872: 0040  C1                    pop     bc
873:
874: 0041                .230    tstb    (hl)
875: 0043  2803                  beq     .250
876:
877: 0045  23            .240    inc     hl
878: 0046  18F9                  bra     .230
879:
880: 0048  23            .250    inc     hl
881: 0049  220000                move    hl,.lp
882:
883: 004C  7E            .260    move    (hl),a
884: 004D  FEFF                  cmp     #-1
885: 004F  2008                  bne     .300
886:
887: 0051  C5            .270    push    bc              save temp
888: 0052  CD0000                jsr     DispEndOfList
889:
890: 0055  E1            .290    pop     hl
891: 0056  220000                move    hl,.lp
892:
893: 0059  C30900        .300    jmp     .80
894:
895:                             ;****************************************************
896:
897: 005C                        end Assembly completed for file Help.asm
Relocatable code size = 92, Absolute code size = 0, Data ram size = 2
Number of errors = 0, number of warnings = 0 cZ80 1.2    Filename: Data.asm                                    Page no.    1.

1:                     ;****************************************************
 2:                     ;Misc. data RAM used by all modules:
 3:
 4:                     ; *** --> Must be the last module linked!!!
```

```
  5:
  6:              ;*********************************************
  7:
  8: 0000         incl    "SpellEqu.asm"
  9:              ;*********************************************
 10:              ;Hardware configuration assembly control:
 11:
 12: 0000         Mac         equ     0           Macintosh emulation
 13: 0001         FSA         equ     1           FSA chip version
 14: 0002         DotMatrix   equ     2           dot matrix wirewrap version
 15: 0003         Discrete    equ     3           discrete backup hardware
 16:
 17: 0001         Hardware    equ     FSA         set to one of the above
 18:
 19:              ;*********************************************
 20:              ;Product type assembly control:
 21:
 22: 0000         WordWiz     equ     0           all children's games
 23: 0001         SpellMaster equ     1           misc. changes to above
 24:
 25: 0001         Product     equ     SpellMaster set to one of the above
 26:
 27:              ;*********************************************
 28:              ;Database types (kept in Lexicon variable in GetTrie.asm):
 29:
 30: 0000         American    equ     0
 31: 0001         British     equ     1
 32:
 33:              ;*********************************************
 34:              ;Configuration equates:
 35:
 36: 0019         MAXWORD     equ     25          maximum size of a word
 37:              ;                                (actually 24 - one to be safe!)
)38: 001A         WORDBUFSIZE equ     MAXWORD+1   size of word buffers (for 00 at en
 39:
 40: 0010         DISPSIZE    equ     16          number of display characters
 41: 000F         STATUSPOS   equ     DISPSIZE-1  status char position in display
 42:
 43: 0008         CODEWORDSIZE equ    8           size of a code word
 44:
 45: 000B         MAXCANDS    equ     11          maximum number of candidate
 46:              ;                                           correction words
 47: 001C         CANDSIZE    equ     MAXWORD+3   size of a word in the candidate
 48:              ;                                           word list
 49:
 50: 000A         NAMESIZE    equ     10          max size of user's name
 51:
 52: 0800         RAMSIZE     equ     2048        size of RAM
 53:
m 54: 80E8        AMERICANCHECKSUM equ $80E8      dictionary 16-bit additive checksu
m 55: 029F        ENGLISHCHECKSUM  equ $029F      dictionary 16-bit additive checksu
 56:              ;                                (Must be hand-calculated everytime
 57:              ;                                  the database changes)
 58:                          if      Hardware = Mac
or59:             ACTIVITYTIME equ    64          timer for display activity indicat
 60: 0000                     else
 61: 00FF        ACTIVITYTIME equ     255
 62: 0000                     endi
 63:
 64:              ;*********************************************
 65:              ;Misc. constants:
 66:
 67: 0000         FALSE       equ     0
 68: 0001         TRUE        equ     1
 69: 0000         NULL        equ     0
 70:
 71:              ;*********************************************
 72:              ;Data types used in this code:
 73:
 74: 0004         LONG        equ     4           18 bit unsigned integer (4 bytes)
 75: 0002         INT         equ     2           15 bit unsigned integer (2 bytes)
 76: 0001         SBYTE       equ     1           8 bit signed integer (1 byte)
 77: 0001         BYTE        equ     1           7 bit unsigned integer (1 byte)
 78: 0001         UBYTE       equ     1           8 bit unsigned integer (1 byte)
 79: 0001         CHAR        equ     1           8 bit character (1 byte)
```

```
 80: 0001          BOOL        equ      1         1 bit unsigned integer (1 byte)
 81: 0002          USHORT      equ      2         16 bit unsigned integer (2 bytes)
 82: 0001          UCHAR       equ      UBYTE     7 bit unsigned char ?? (1 byte)
 83:
 84:               ;New types for assembly:
 85:
 86: 0002          PTR         equ      2         16-bit ptr to anything
 87: 0002          BYTE_PTR    equ      PTR       16-bit ptr to a BYTE
 88: 0002          CHAR_PTR    equ      PTR       16-bit ptr to a CHAR
 89: 0002          UBYTE_PTR   equ      PTR       16-bit ptr to a UBYTE
 90: 0002          UCHAR_PTR   equ      PTR       16-bit ptr to a UCHAR
 91:
 92:
 93:               item    macrox            used in dsec's to bump pc by one
 94:                       ds       1
 95: 0000                  endm
 96:
 97:               ;****************************************************
 98:               ;Z-80 alternate register bank usage:
 99:               ;
100:               ;      a'
101:               ;      f'
102:               ;      b'       Trie Index bits 17,16 = ROM bank number [0,1,2]
103:               ;      c'       Trie Index bit 0 (nibble number)
104:               ;      de'      Trie Index bits 15-1 (byte number)
105:               ;      h'       used by get_byte and get_nibble routines
106:               ;      hl'      used by GetTB macro for table indexing
107:               ;
108:
109: 0000          Index.bank      requ    b       rom bank number [0,1,2]
110: 0000          Index.nibble    requ    c       nibble number (0 = high, 1 = low)
111: 0000          Index.byte      requ    de      byte number [0000...7FFF]
112: 0000          Index.byte.hi   requ    d
113: 0000          Index.byte.lo   requ    e
114: 0000          Index.scratch   requ    h       used in get_byte and get_nibble routines
115: 0000          GetTBScratch    requ    hl
116:
117:               ;****************************************************
118:               ;Key code definitions:
119:
120: 0000                  dsec     0
121: 0000          NOKEY   ds.b     1
122: 0001          SC_UP   ds.b     1
123: 0002          SC_DN   ds.b     1
124: 0003          OFF     ds.b     1
125: 0004          ON      ds.b     1
126: 0005          BS      ds.b     1
127: 0006          ENTER   ds.b     1
128: 0007          CLEAR   ds.b     1
129: 0008                  dend
130:
131: 002D          HYPHEN   equ     '-'
132: 003F          QUEST    equ     '?'
133: 0020          SPCBAR   equ     ' '
134:
135:               ;Special display characters:
136:
137:                             if        Hardware = Mac
138:          SHORT_DASH          equ      '.'
139:          MORE_UP             equ      '^'
140:          MORE_DOWN           equ      '_'
141:          MORE_LEFT           equ      '<'
142:          MORE_RIGHT          equ      '>'
143:          MORE_UP_AND_DOWN    equ      '+'
144:          MORE_LIST           equ      '$'
145:          MATCH               equ      '*'
146:          NO_MATCH            equ      '-'
147:          NO_STATUS           equ      ' '
148:          ALL_SEGS_ON         equ      '#'
149:          WORD_PROMPT         equ      '>'
150:          QUES_MARK           equ      '?'
151: 0000                        endi
152:
153: 0000                        if        ((Hardware = FSA) or (Hardware = Discrete))
154: 0021      SHORT_DASH         equ      $21
```

```
155: 0022          MORE_UP              equ      $22
156: 0023          MORE_DOWN            equ      $23
157: 0024          MORE_LEFT            equ      $24
158: 0025          MORE_RIGHT           equ      $25
159: 0026          MORE_UP_AND_DOWN equ          $26
160: 002B          MORE_LIST            equ      $2B
161: 0028          MATCH                equ      $28
162: 002D          NO_MATCH             equ      '-'
163: 0020          NO_STATUS            equ      ' '
164: 0029          ALL_SEGS_ON          equ      $29
165: 002C          WORD_PROMPT          equ      $2C
166: 003E          QUES_MARK            equ      $3E
167: 0000                               endi
168:
169:                           if       Hardware = DotMatrix
170:               SHORT_DASH           equ      '.'
171:               MORE_UP              equ      $5E
172:               MORE_DOWN            equ      $DA
173:               MORE_LEFT            equ      $7F
174:               MORE_RIGHT           equ      $7E
175:               MORE_UP_AND_DOWN equ          $FD
176:               MORE_LIST            equ      '$'
177:               MATCH                equ      $2A
178:               NO_MATCH             equ      '-'
179:               NO_STATUS            equ      ' '
180:               ALL_SEGS_ON          equ      '#'
181:               WORD_PROMPT          equ      '>'
182:               QUES_MARK            equ      '?'
183: 0000                               endi
184:
185:               ;The activity 'clock' characters:
186:
187:                           if       ((Hardware = Mac) or (Hardware = DotMatrix))
188:               CLOCK0    equ        $30
189:               CLOCK1    equ        $31
190:               CLOCK2    equ        $32
191:               CLOCK3    equ        $33
192:               CLOCK4    equ        $34
193:               CLOCK5    equ        $35
194:               CLOCK6    equ        $36
195:               CLOCK7    equ        $37
196: 0000                     endi
197:
198: 0000                     if        ((Hardware = FSA) or (Hardware = Discrete))
199: 0000          CLOCK0    equ        $00
200: 0001          CLOCK1    equ        $01
201: 0002          CLOCK2    equ        $02
202: 0003          CLOCK3    equ        $03
203: 0004          CLOCK4    equ        $04
204: 0005          CLOCK5    equ        $05
205: 0006          CLOCK6    equ        $06
206: 0007          CLOCK7    equ        $07
207: 0000                     endi
208:
209:               ;The 'hangman' characters:
210:
211:                          if        ((Hardware = Mac) or (Hardware = DotMatrix))
212:               HANG0     equ        'A'
213:               HANG1     equ        'B'
214:               HANG2     equ        'C'
215:               HANG3     equ        'D'
216:               HANG4     equ        'E'
217:               HANG5     equ        'F'
218:               HANG6     equ        'G'
219:               HANG7     equ        'H'
220:               HANG8     equ        'I'
221:               HANG9     equ        'J'
222:               HANG10    equ        'K'
223:               HANG11    equ        'L'
224:               HANG12    equ        'M'
225:               HANG13    equ        'N'
226:               HANG14    equ        'O'
227:
228: 0000                     else
229: 0008          HANG0     equ        $08
230: 0009          HANG1     equ        $09
```

```
231: 000A          HANG2     equ    $0A
232: 000B          HANG3     equ    $0B
233: 000C          HANG4     equ    $0C
234: 000D          HANG5     equ    $0D
235: 000E          HANG6     equ    $0E
236: 000F          HANG7     equ    $0F
237: 0010          HANG8     equ    $10
238: 0011          HANG9     equ    $11
239: 0012          HANG10    equ    $12
240: 0013          HANG11    equ    $13
241: 0014          HANG12    equ    $14
242: 0015          HANG13    equ    $15
243: 0016          HANG14    equ    $16
244: 0000                    endi
245:
246:              ;****************************************************
247:              ;The status codes returned:
248:
249: FFFA         FIRSTSTATUS  equ   -6
250: FFFA         ENDWORD      equ   -6       No words in list                  0
251: FFFB         ENOSCAN      equ   -5       No scan function called           1
252: FFFE         E2LONG       equ   -2       Word too long                     4
253: FFFF         EINVCHR      equ   -1       Invalid character in word         5
254: 0000         NOWORD       equ    0       Zero length word                  6
255: 0001         INVWORD      equ    1       Invalid word                      7
256: 0002         VALPREF      equ    2       Valid word prefix                 8
257: 0003         VALWORD      equ    3       Valid word                        9
258: 0005         DUPWORD      equ    5       Word already valid               11
259: 0006         ADDED        equ    6       Word added to dictionary         12
260: 0007         DELETED      equ    7       Word deleted for dict            13
261: 0008         MOVED        equ    8       Word moved in LRU order          14
262: 000A         PARTLIST     equ   10       Partial list                     16
263: 000B         FULLLIST     equ   11       Complete list                    17
264: 000C         HAVEWORD     equ   12       Have a word from the list        18
265: 000C         LASTSTATUS   equ   12                                        18
266:
267: 0000         ERROR_LIMIT  equ    0       errors < this, noword = this
268:
269:              ;****************************************************
270:              ;Definitions needed for flags:
271:
272:              ;Define the types of apostophes we strip from end of words.
273:              ;Currently three cases, none, ', 's, and 'S are handled, with
274:              ;a dot optionaly after any of them. APOS_DOTS is ORed in to
275:              ;APOS_END, APOS_LS, or APOS_US when needed.
276:
277: 0000                      dsec   0
278: 0000         APOS_NONE    item
279: 0001         APOS_END     item                  '
280: 0002         APOS_LS      item                  's
281: 0003         APOS_US      item                  'S
282: 0004         APOS_DOT     item                  . on any of END, LS and US
283: 0005                      dend
284:
285:              ;****************************************************
286:              ;Define the valid flag masks & values:
287:
288: 001F         F_ALL        equ   $1F
289: 0003         F_CASE       equ   $03
290: 0000         FC_COMMON    equ   $00
291: 0001         FC_PROPER    equ   $01
292: 0002         FC_ACRONYM   equ   $02
293: 0003         FC_SPECIAL   equ   $03
294: 0004         NUM_CFLAGS   equ   $04       4 legal case flags
295: 000C         F_DOTS       equ   $0C
296: 0000         FD_NONE      equ   $00
297: 0004         FD_END       equ   $04
298: 0008         FD_ALL       equ   $08
299: 000C         FD_SPECIAL   equ   $0C
300: 0004         NUM_DFLAGS   equ   $04       4 legal dot flags
301: 0010         NUM_FLAGS    equ   $10       16 legal flags 0 - 15
302: 0002         SHIFT_DOTS   equ    2        shift to right justify bits
303:
304:              ;A special flag used in the anagram word list:
305:
```

```
306: 0010              A_PLAYED        equ     $10     word has been played
307:
308:                   ;****************************************************
309:                   ;This is used to hold the state of a decompression of a TRIE state:
310:
311: 0000                              dsec    0
312: 0000              d_scan_node     ds      LONG
313: 0004              d_char          ds      CHAR
314: 0005              d_flags         ds      UBYTE
315: 0006                              ds      8-*             two bytes of pad - this makes
316:                   ;                                       DECODE a multiple of 2 (8) which
317:                   ;                                       speeds up indexing
318: 0008              DEECODE         equ     *
319: 0008                              dend
320:
321:
322:                   ;****************************************************
                       ;The context used in the Pcorrect routine in Correct.asm
323:                   ;to scan a word, and keep the current state for the state machine.
324:
325:                   ;struct CONTEXT (
326:                   ;       BYTE    c_state;                /* state machine state */
327:                   ;       BYTE    c_decode_pos;           /* index into 'decode' */
328:                   ;       BYTE    c_word_scan;            /* index into query    */
329:                   ;);
330:
331: 0000                              dsec    0
332: 0000              c_state         ds      BYTE
333: 0001              c_decode_pos    ds      BYTE
334: 0002              c_word_scan     ds      BYTE
335: 0003              S_CONTEXT       equ     *
336: 0003                              dend
337:
338:                   ;****************************************************
339:                   ;Information needed to to handle character type checking & setting:
340:
341:                   ;Character type checking:
342:                   ;You may add your own flags, DIGIT is an example (we never use it).
343:
344: 0001              C_VALID         equ     $01     valid character in a word
345: 0002              C_UPPER         equ     $02     indicates character is upper
346: 0004              C_LOWER         equ     $04     indicates lower
347: 0008              C_DOT           equ     $08     indicates dot '.'
348: 0010              C_DIGIT         equ     $10     indicates digit
349:
350: 0006              C_BOTH          equ     $06     both upper & lower case
351:
352: 0001              CM_VALID        equ     $01     valid
353: 0003              CM_UPPER        equ     $03     valid & upper case
354: 0005              CM_LOWER        equ     $05     valid & lower case
355: 0007              CM_BOTH         equ     $07     valid & upper & lower case
356: 0009              CM_DOT          equ     $09     valid & dot
357: 0011              CM_DIGIT        equ     $11     valid & digit
358:
359:                   ;****************************************************
360:                   ;Bits used in Mode byte:
361:
362: 000F              DISP_CONTRAST   equ     %00001111       contrast value
363: 00F0              HANGMAN_SIZE    equ     %11110000       size of words in hangman game
364:
365:
366:                   ;****************************************************
367:
368: 0000                              def     AnagramSize     BYTE
369: 0000                              def     Decode          DEECODE[MAXWORD+2]
370: 0000                              def     HangTries       BYTE
371: 0000                              def     LastClrData     one past address of last data RAM to clear
372: 0000                              def     Mode            BYTE
373: 0000                              def     ModeCheck       BYTE
374: 0000                              def     NumberSize      BYTE
375: 0000                              def     Random          BYTE[4]
376: 0000                              def     RandomWordSize  BYTE
377: 0000                              def     Reg.r_status    SBYTE
378: 0000                              def     Reg.r_word      CHAR_PTR
379: 0000                              def     StatusChar      CHAR
380: 0000                              def     TreeWordBuffer  CHAR[WORDBUFSIZE]
381: 0000                              def     WorkWord        CHAR[WORDBUFSIZE]
```

```
382:
383:                    if      Product = WordWiz
384:                    def     CodeWord        CHAR[CODEWORDSIZE+1]
385:                    def     UserName        CHAR[NAMESIZE+1]
386: 0000               endi
387:
388: 0000               if      Product = SpellMaster
389: 0000               def     MaxLotto        BYTE
390: 0000               def     NumDice         BYTE
391: 0000               def     MinAnagramSize  BYTE
392: 0000               def     JumbleSize      BYTE
393: 0000               endi
394:
395:            ;*************************************************
396:
397: 0000               dseg
398:
399:            ;*************************************************
400:            ;The Decode stack:
401:            ;(Also used as a stack by the FastIsWord routine in
402:            ;       the Games module.)
403:
404:            ;struct DEECODE Decode[MAXWORD+2];
405:
406: 0000      Decode   ds      DEECODE*(MAXWORD+2)
407:
408:            ;*************************************************
409:
410: 00D8      Reg.r_status    ds      SBYTE
411: 00D9      Reg.r_word      ds      CHAR_PTR
412:
413:            ;*************************************************
414:            ;Buffer used to fetch tree words from the decode stack:
415:
416: 00DB      TreeWordBuffer  equ     *
417:
418:            ;Also used to encode/decode words:
419:
420: 00DB      WorkWord        ds      CHAR*(WORDBUFSIZE)
421:
422:            ;*************************************************
423:            ;The status character we display in the status position
424:            ;if we're in mode B:
425:
426: 00F5      StatusChar      ds      CHAR
427:
428:            ;*************************************************
429:            ;All RAM before here will be cleared on startup:
430:
431: 00F6      LastClrData     equ     *       last RAM data address to clear
432:
433:            ;All RAM after here will not be cleared on startup:
434:
435:            ;*************************************************
436:            ;Current operating mode:
437:            ; ***--) These two must be in this order!!
438:
439: 00F6      Mode            ds      BYTE
440:
441:            ;Bits 7-4: unused
442:            ;Bits 3-0: current contrast value
443:
444: 00F7      ModeCheck       ds      BYTE    Should equal Mode XOR $A5 - used to
445:            ;                                      determine if we've ever initialized Mode
446:
447:            ;*************************************************
448:            ;Number of tries allowed in hangman game:
449:
450: 00F8      HangTries       ds      BYTE
451:
452:            ;*************************************************
453:            ;Size of anagram root words:
454:
455: 00F9      AnagramSize     ds      BYTE
456:
```

```
457:                  ;****************************************
458:                  ;Size of random words:
459:
460: 00FA             RandomWordSize  ds      BYTE
461:
462:                  ;****************************************
463:                  ;Size of random numbers (number of digits):
464:
465: 00FB             NumberSize      ds      BYTE
466:
467:                  ;****************************************
468:                  ;Maximum lotto random number:
469:
470: 00FC                             if      Product = SpellMaster
471: 00FC             MaxLotto        ds      BYTE
472: 00FD                             endi
473:
474:                  ;****************************************
475:                  ;Number of dice in display dice command:
476:
477: 00FD                             if      Product = SpellMaster
478: 00FD             NumDice         ds      BYTE
479: 00FE                             endi
480:
481:                  ;****************************************
482:                  ;Minimum size of anagram list words:
483:
484: 00FE                             if      Product = SpellMaster
485: 00FE             MinAnagramSize  ds      BYTE
486: 00FF                             endi
487:
488:                  ;****************************************
489:                  ;Size of Jumble words:
490:
491: 00FF                             if      Product = SpellMaster
492: 00FF             JumbleSize      ds      BYTE
493: 0100                             endi
494:
495:                  ;****************************************
496:                  ;The code word for encoding/decoding:
497:
498:                                  if      Product = WordWiz
499:                  CodeWord        ds      CHAR*CODEWORDSIZE+1
500: 0100                             endi
501:
502:                  ;****************************************
503:                  ;The user's name:
504:
505:                                  if      Product = WordWiz
506:                  UserName        ds      CHAR*NAMESIZE+1
507: 0100                             endi
508:
509:                  ;****************************************
510:                  ;Random number counter:
511:
512: 0100             Random          ds      BYTE*4
513:
514:                  ;****************************************
515:
516: 0104                             end
```

Assembly completed for file Data.asm
Relocatable code size = 0, Absolute code size = 0, Data ram size = 260
Number of errors = 0, number of warnings = 0

I claim:

1. A portable, hand held, machine spelling matching dictionary comprising:

power means to provide enabling power, a keyboard having a plurality of keys for entering an input word, said keyboard including an enter key to initiate an entry function when an input word has been designated by said keys, read only memory means having a word list memory, said read only memory means being responsive to said enabling power to provide coupling between said keyboard and said read only memory means in direct response to enabling power, said keyboard having a dedicated key for each letter to permit entry by an operator of a first type of input word composed of a set of letters, validity checking means responsive to the entry of said first type of input word to provide an indication that said first type of input word does or does not match one of the words in said word list memory, to designate said first type of input word as a vallid word or as an invalid word, spelling pattern first matching means to compare said first type of input word when designated as an invalid word against said word list memory to build a first set of selected words meeting a predetermined phonetic spelling matching function, operator actuated override means to override said validity means to provide a phonetic spelling match of a valid input word against the memory, as if said valid input word were not valid, storage means to store said first set of words as selected by said first matching means, a display screen for displaying in sequence each of said words in said storage means, and dedicated scroll key means to scroll through said words in said storage means to display each of said words in sequence on said display screen.

2. The machine spelling dictionary of claim 1 further comprising:

a place indicia representing a variable in at least one place of an input word, the other places of the input word having definitive letters, a place indicia key on said keyboard to provide said place indicia at the place or places selected by an operator to permit entry by an operator of a second type of input word composed of letters and place indicia, second matching means responsive to said place indicia to provide a match of said second type of input word containing said place indicia against the words in said word list memory having (i) each input definite letter at its place and having (ii) any letter in those places held by said place indicia, to provide a second set of selected words, and sequencing means responsive to said place indicia to override said validity checking means and said spelling pattern matching means in response to said place indicia, said storage means storing said second set of words as selected by said second matching means.

3. The machine spelling dictionary of claim 1 further comprising:

a prefix ending indicia for indicating the end of an input set of letters, a prefix ending key on said keyboard to provide said prefix ending indicia as selected by an operator to permit entry by an operator of a third type of input word composed of letters and said prefix ending indicia, third matching means responsive to said prefix ending indicia to provide a match of said set of letters that are terminated by said prefix ending indicia against each word in said word list memory having said set as its initial set of letters to provide a third set of selected words, and sequencing means responsive to said prefix ending indicia to override said validity checking means and said spelling pattern matching means in response to said prefix ending indicia, said storage means storing said third set of words as selected by said third matching means.

4. The machine spelling dictionary of claim 1 further comprising:

a place indicia representing a variable in at least one place of an input word, the other places of the input word having definitive letters, a place indicia key on said keyboard to provide said place indicia at the place or places selected by an operator to permit entry by an operator of a second type of input word composed of letters and place indicia, second matching means responsive to said place indicia to provide a match of said second type of input word containing said place indicia against the words in said word list memory having (i) each input definite letter at its place and having (ii) any letter in those places held by said place indicia, to provide a second set of selected words, a prefix ending indicia for indicating the end of an input set of letters, a prefix ending key on said keyboard to provide said prefix ending indicia as selected by an operator to permit entry by an operator of a third type of input word composed of letters and said prefix ending indicia, third matching means responsive to said prefix ending indicia to provide a match of said set of letters that are terminated by said prefix ending indicia against each word in said word list memory having said set as its initial set of letters to provide a third set of selected words, and sequencing means responsive to said place indicia or said prefix ending indicia to override said validity checking means and said spelling pattern matching means in response to said place indicia or said prefix ending indicia, said storage means storing said second or third set of words as selected by said second or third matching means.

5. A portable, hand held, machine spelling pattern matching dictionary comprising:

power means to provide enabling power, a keyboard having a plurality of keys for entering an input word, said keyboard including an enter key to initiate an entry function when an input word has been designated by said keys, read only memory means having a word list memory, said read only memory means being responsive to said enabling power to provide coupling between said keyboard and said read only memory means in direct response to enabling power, said keyboard having a dedicated key for each letter to permit entry by an operator of a first type of input word composed of a set of letters, validity checking means responsive to the entry of said first type of input word to provide an indication that said first type of input word does or does not match one of the words in said word list memory, to designate said first type of input word as a valid word or as an invalid word, spelling pattern first matching means to compare said first type of input word when designated as an invalid word against said word list memory to build a first set of selected words meeting a predetermined phonetic spelling matching function, a place indicia representing a variable in at least one place of an input word, the other places of the input word having definitive letters, a place indicia key on said keyboard to provide said place indicia at the place or places selected by an operator to permit entry by an operator of a second type of input word composed of letters and place indicia, second matching means responsive to said place indicia to provide a match of said second type of input word against the words in said word list memory having (i) each input definite letter at its place and having (ii) any letter in those places held by said place indicia, to provide a second set of selected words, a prefix ending indicia for indicating the end of an input set of letters, a prefix ending key on said keyboard to provide said prefix ending indicia as selected by an operator to permit entry by an operation of a third type of input word composed of letters and said prefix ending indicia, third matching means responsive to said prefix ending indicia to provide a match of said set of letters that are terminated by said prefix ending indicia against each word in said word list memory having said set as its initial set of letters to provide a third set of selected words, sequencing means responsive to said place indicia or said prefix ending indicia to override said validity checking means and said spelling pattern matching means in response to said place indicia or said prefix ending indicia, storage means to store said first, second or third set of words as selected by said first, second or third matching means, a display screen for displaying said words in said storage means, and dedicated scroll key means to scroll through said words in said storage means to display each of said words in sequence on said display screen.

* * * * *

UNITED STATES PATENT AND TRADEMARK OFFICE
CERTIFICATE OF CORRECTION

PATENT NO. : 4,830,618

DATED : May 16, 1989

INVENTOR(S) : Morton E. David, James M. Simons, Peter N. Yianilos

Page 1 of 2

It is certified that error appears in the above-identified patent and that said Letters Patent is hereby corrected as shown below:

Column 4, line 48, after the "." add the following as per attached sheet.

Signed and Sealed this

Sixth Day of February, 1990

*Attest:*

JEFFREY M. SAMUELS

*Attesting Officer*  *Acting Commissioner of Patents and Trademarks*

UNITED STATES PATENT AND TRADEMARK OFFICE
CERTIFICATE OF CORRECTION

PATENT NO. : 4,830,618
DATED : May 16, 1989
INVENTOR(S) : Morton E. David; James M. Simons, Peter N. Yianilos It is certified that error appears in the above—identified patent and that said Letters Patent is hereby corrected as shown below:

-- The foregoing material as indicated on said Appendix A is proprietary information covered by a copyright registration owned by Franklin Computer Corporation --

Appendix - Please add as page 1 of the Appendix --

APPENDIX

TITLE PAGE

| FILE NAME | NO. OF PAGES |
| --- | --- |
| Data.asm | 10 |
| Main.asm | 6 |
| 10.asm | 33 |
| SpHi.asm | 28 |
| CUtils.asm | 6 |
| HelpText.asm | 3 |
| Help.asm | 3 |

Copyright © 1987 by Franklin Computer Corporation --